United States Patent
Takada et al.

(10) Patent No.: US 9,588,324 B2
(45) Date of Patent: Mar. 7, 2017

(54) ZOOM LENS AND IMAGE PICKUP APPARATUS USING THE SAME

(71) Applicant: OLYMPUS CORPORATION, Tokyo (JP)

(72) Inventors: Keisuke Takada, Tokyo (JP); Takashi Fujikura, Tokyo (JP)

(73) Assignee: Olympus Corporation, Tokyo (JP)

( * ) Notice: Subject to any disclaimer, the term of this patent is extended or adjusted under 35 U.S.C. 154(b) by 12 days.

(21) Appl. No.: 14/927,729

(22) Filed: Oct. 30, 2015

(65) Prior Publication Data

US 2016/0048007 A1    Feb. 18, 2016

Related U.S. Application Data

(63) Continuation of application No. PCT/JP2014/062226, filed on May 7, 2014.

(30) Foreign Application Priority Data

May 30, 2013 (JP) ................. 2013-114618

(51) Int. Cl.
G02B 15/14  (2006.01)
G02B 15/20  (2006.01)
(Continued)

(52) U.S. Cl.
CPC ............ G02B 15/20 (2013.01); G02B 15/17 (2013.01); G02B 15/173 (2013.01);
(Continued)

(58) Field of Classification Search
CPC ...... G02B 13/0045; G02B 9/60; G02B 13/18; G02B 15/20; G02B 13/009; G02B 5/005;
(Continued)

(56) References Cited

U.S. PATENT DOCUMENTS 5,508,847 A    4/1996  Suzuki et al.
5,781,348 A *  7/1998  Ohtake ............... G02B 15/173
                                                    359/557
(Continued)

FOREIGN PATENT DOCUMENTS

JP    05-224123    9/1993
JP    08-220438    8/1996
(Continued)

OTHER PUBLICATIONS

International Preliminary Report on Patentability, dated Dec. 10, 2015, issued in corresponding International Application No. PCT/JP2014/062226.
(Continued)

*Primary Examiner* — Evelyn A Lester
(74) *Attorney, Agent, or Firm* — Andrews Kurth Kenyon LLP

(57) ABSTRACT

A zoom lens having a plurality of lens units comprises in order from an object side, a first lens unit G1 having a positive refractive power, a second lens unit G2 having a negative refractive power, and a rearmost lens unit having a negative refractive power, and the rearmost lens unit is positioned nearest to an image in the plurality of lens units, and at the time of zooming from a wide angle end to a telephoto end, distances between the lens units change, and the first lens unit G1 moves toward the object side, and following conditional expression (1) is satisfied:

$$0.2 < (\beta_L/\beta_{Lw})/(f_t/f_w) < 0.7 \qquad (1).$$

20 Claims, 38 Drawing Sheets

(51) Int. Cl.

| | | |
|---|---|---|
| *G02B 15/17* | (2006.01) | |
| *G02B 15/173* | (2006.01) | |
| *G02B 27/00* | (2006.01) | |
| *G02B 5/00* | (2006.01) | |
| *G02B 13/00* | (2006.01) | |
| *G02B 9/60* | (2006.01) | |
| *G02B 15/163* | (2006.01) | |
| *G02B 15/22* | (2006.01) | |
| *G02B 13/18* | (2006.01) | |

(52) U.S. Cl.
CPC .......... *G02B 27/0025* (2013.01); *G02B 5/005* (2013.01); *G02B 9/60* (2013.01); *G02B 13/009* (2013.01); *G02B 13/0015* (2013.01); *G02B 13/0045* (2013.01); *G02B 13/18* (2013.01); *G02B 15/14* (2013.01); *G02B 15/163* (2013.01); *G02B 15/22* (2013.01)

(58) Field of Classification Search
CPC .. G02B 15/163; G02B 15/14; G02B 13/0015; G02B 15/22
USPC ........ 359/676, 683–686, 688, 714, 763, 764
See application file for complete search history.

(56) References Cited

U.S. PATENT DOCUMENTS

| | | |
|---|---|---|
| 5,946,145 A | 8/1999 | Ohtake |
| 6,002,526 A | 12/1999 | Okada et al. |
| 6,266,189 B1 | 7/2001 | Konno et al. |
| 6,449,433 B2 | 9/2002 | Hagimori et al. |
| 8,194,317 B2 | 6/2012 | Adachi et al. |
| 2011/0080653 A1* | 4/2011 | Kimura ................ G02B 15/173 359/683 |
| 2011/0141577 A1* | 6/2011 | Kimura ................ G02B 15/173 359/683 |
| 2012/0087017 A1* | 4/2012 | Fujisaki ............... G02B 13/009 359/687 |
| 2013/0033759 A1* | 2/2013 | Takano ................. G02B 15/17 359/684 |
| 2013/0169846 A1* | 7/2013 | Yanai .................... G02B 15/14 348/240.1 |
| 2013/0242169 A1* | 9/2013 | Okubo ................ G02B 15/173 348/345 |
| 2014/0313592 A1* | 10/2014 | Ito ....................... G02B 15/173 359/687 |

FOREIGN PATENT DOCUMENTS

| | | |
|---|---|---|
| JP | 09-230239 | 9/1997 |
| JP | 09-243910 | 9/1997 |
| JP | 10-062688 | 3/1998 |
| JP | 2000-056222 | 2/2000 |
| JP | 2001-356266 | 12/2001 |
| JP | 3598971 | 9/2004 |
| JP | 2009-122620 | 6/2009 |
| JP | 2009-265654 | 11/2009 |

OTHER PUBLICATIONS

International Search Report, dated Jul. 29, 2014, issued in corresponding International Application No. PCT/JP2014/062226.

* cited by examiner

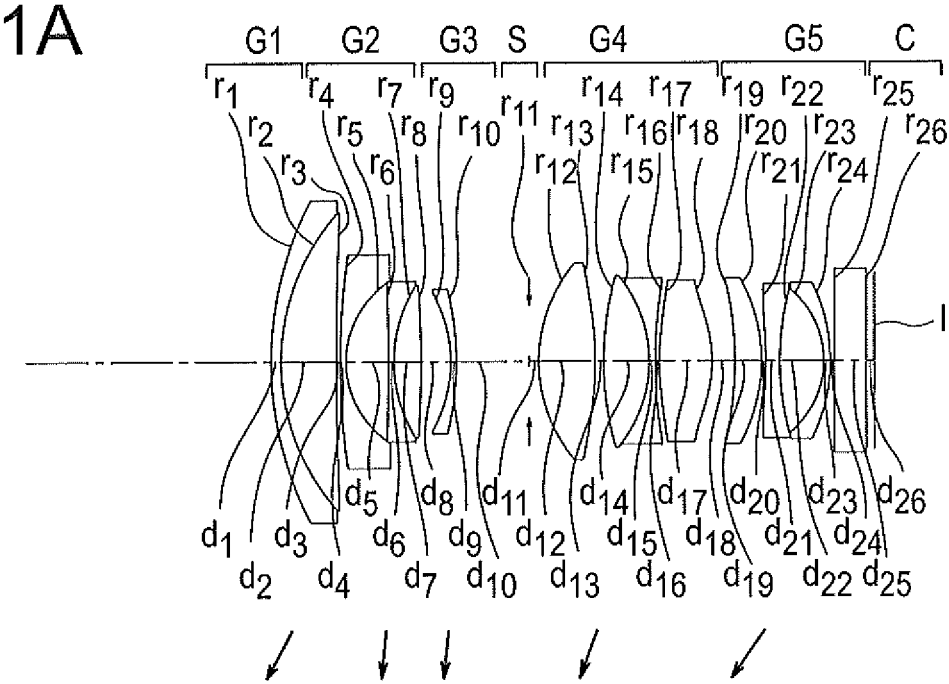
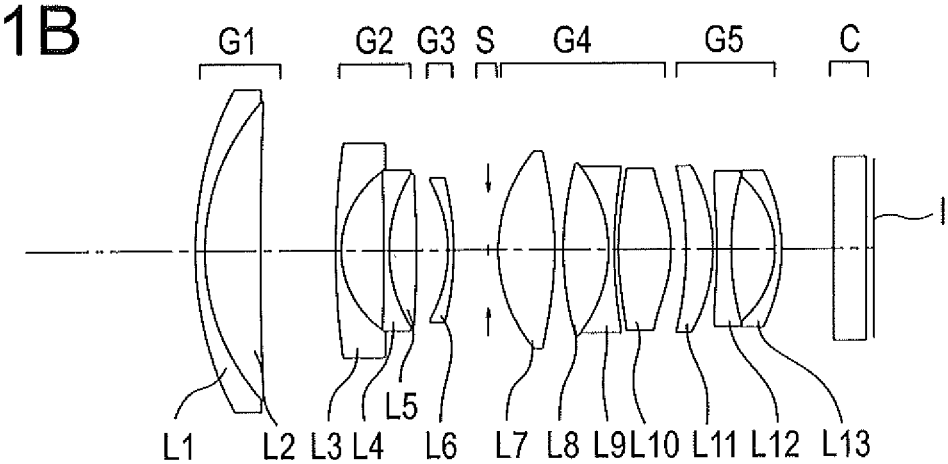
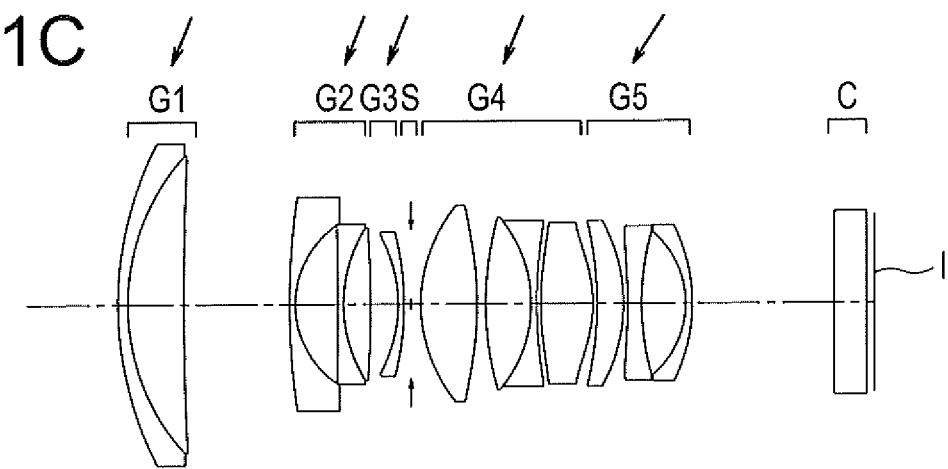

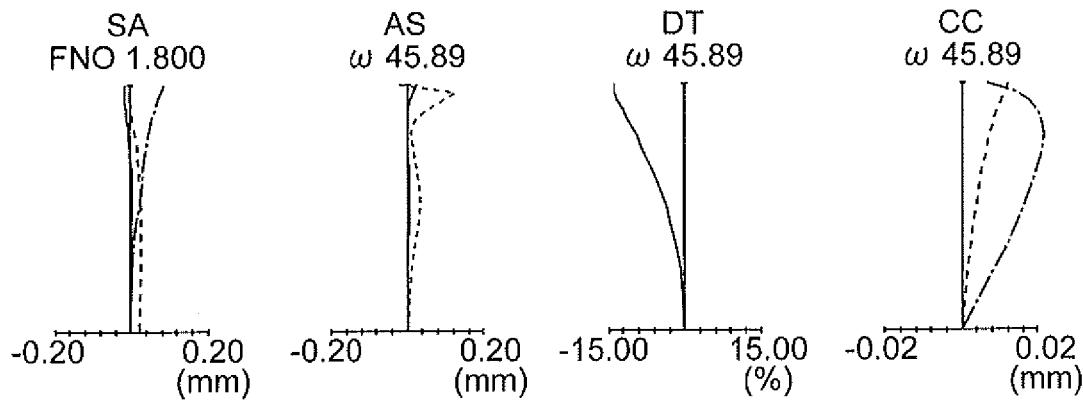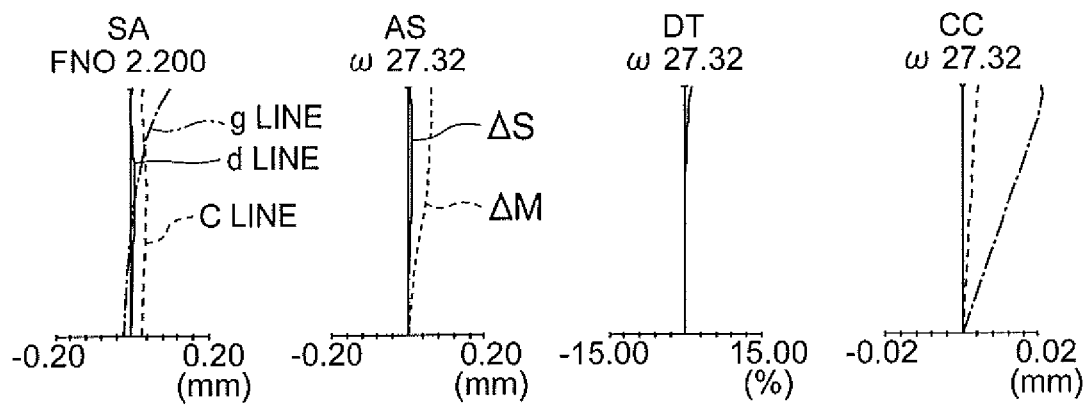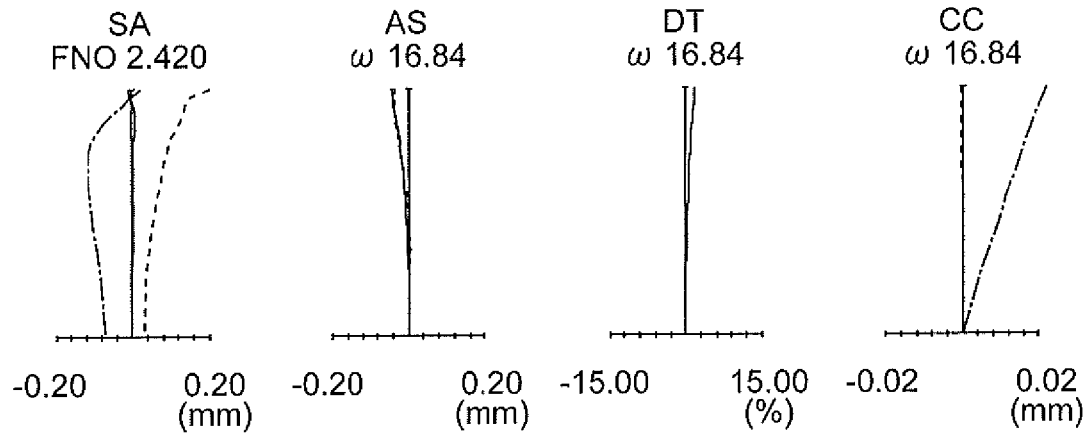

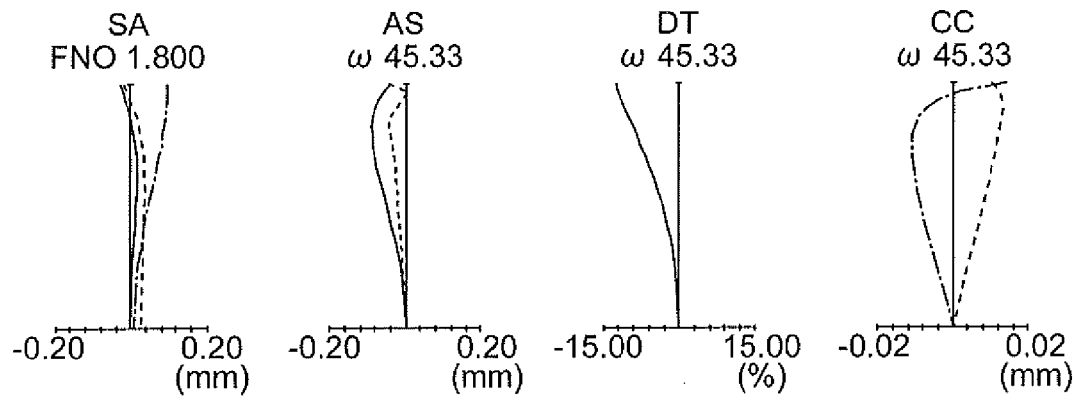
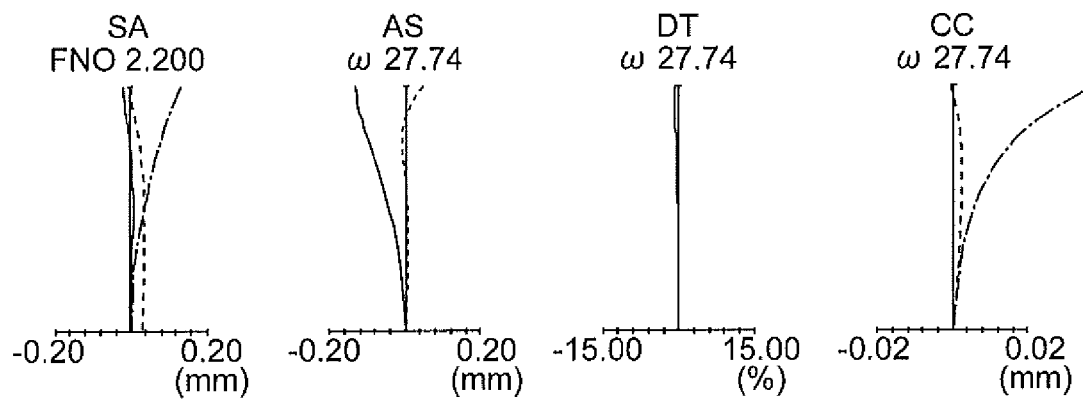
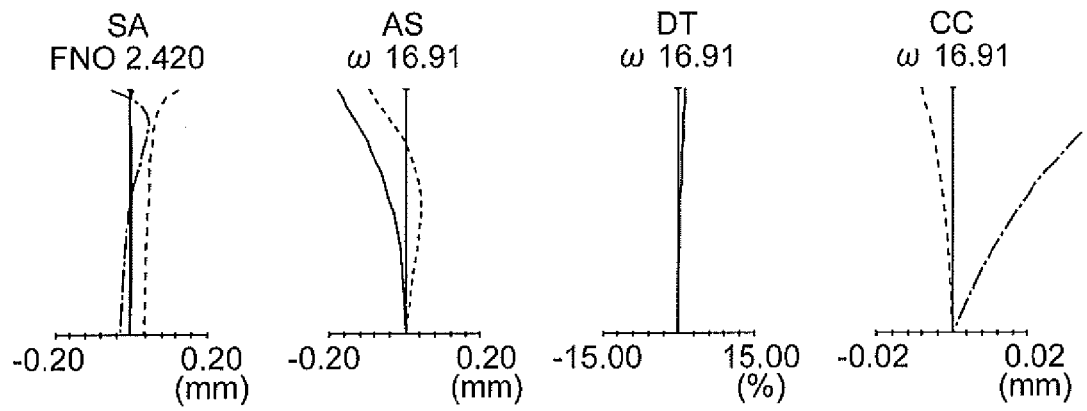

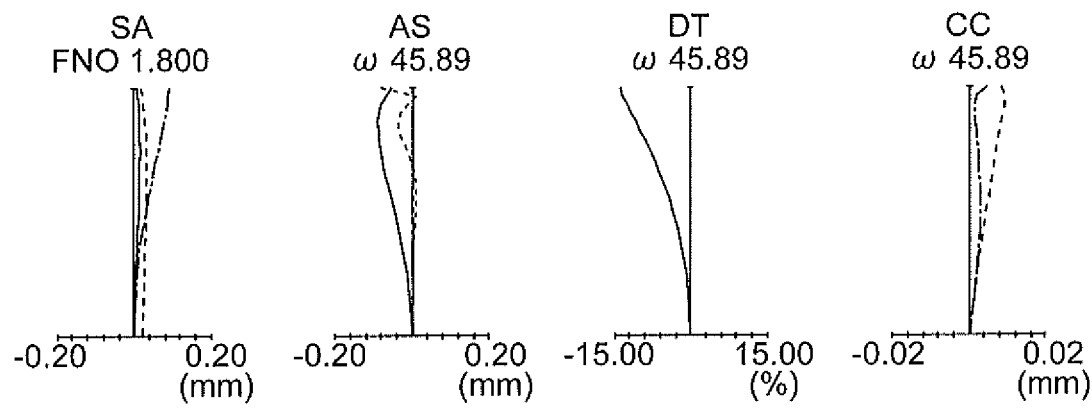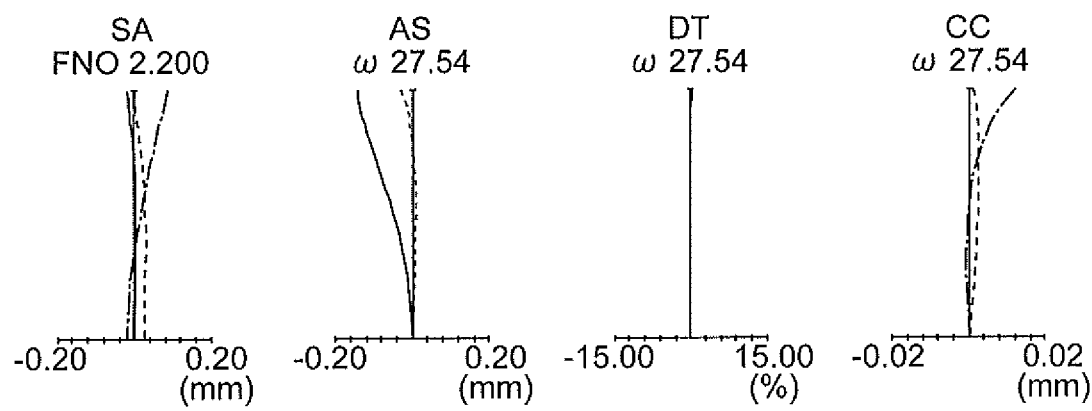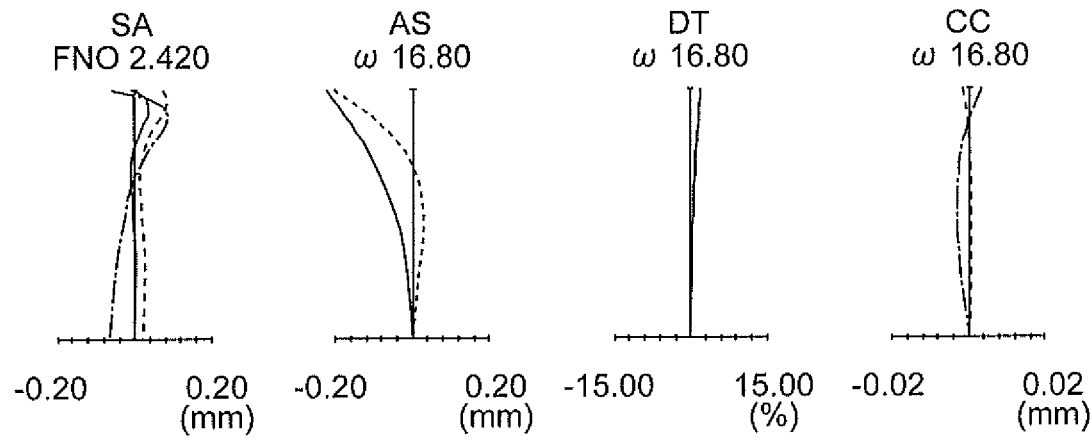

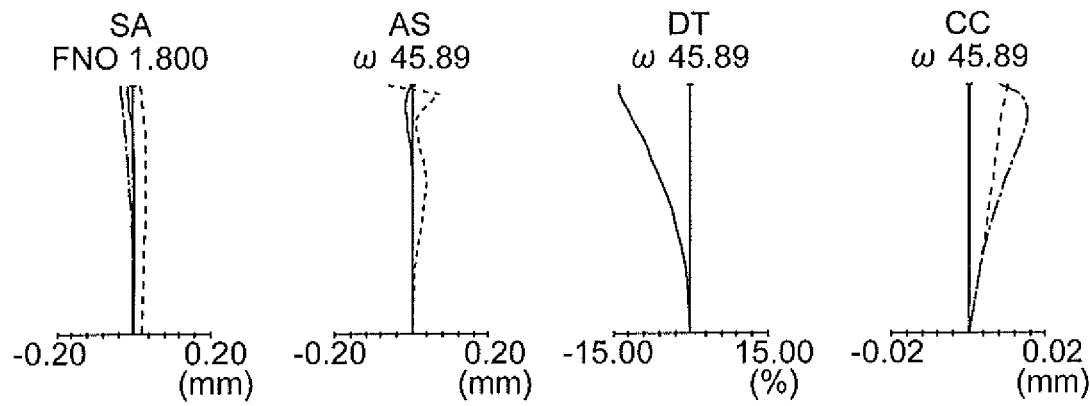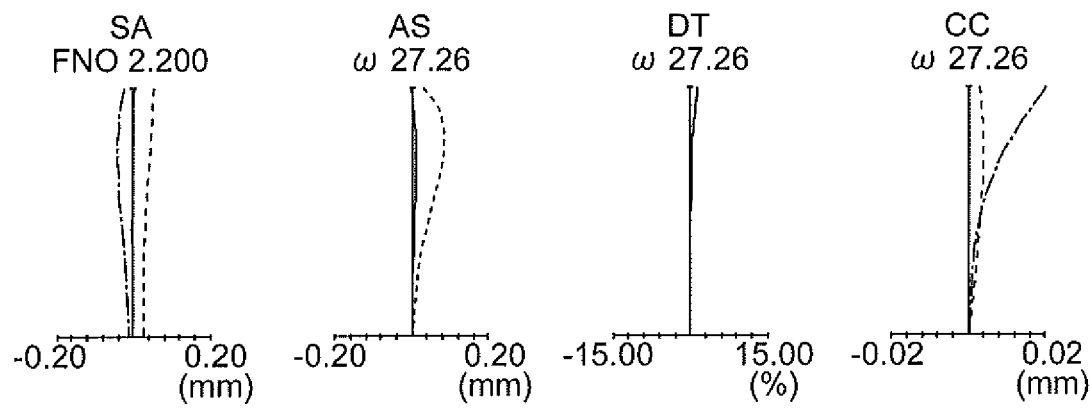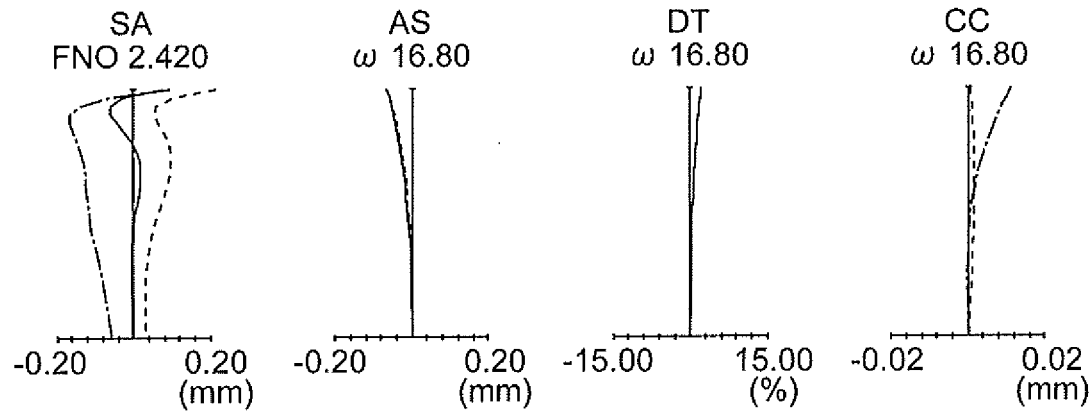

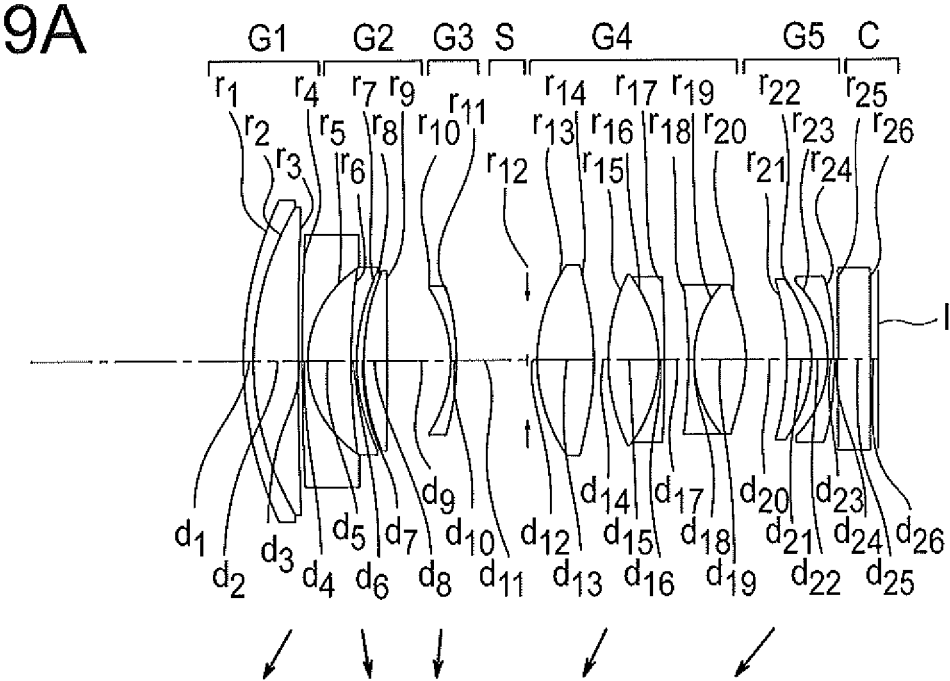
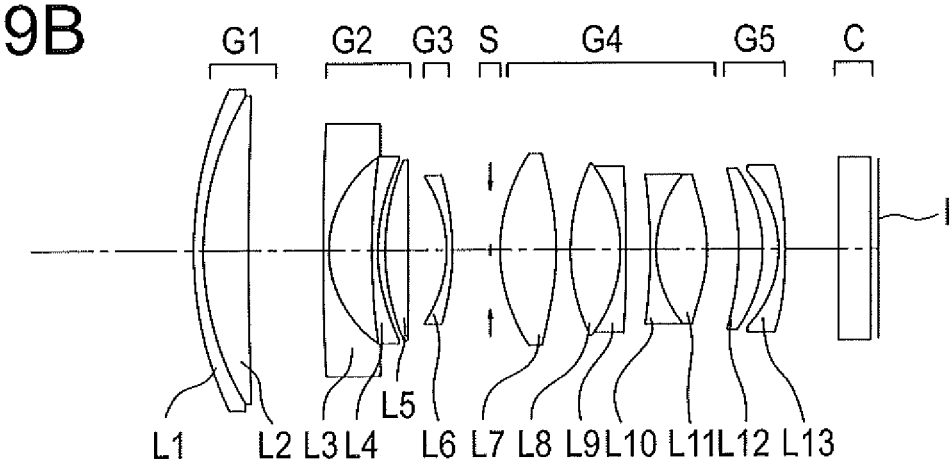
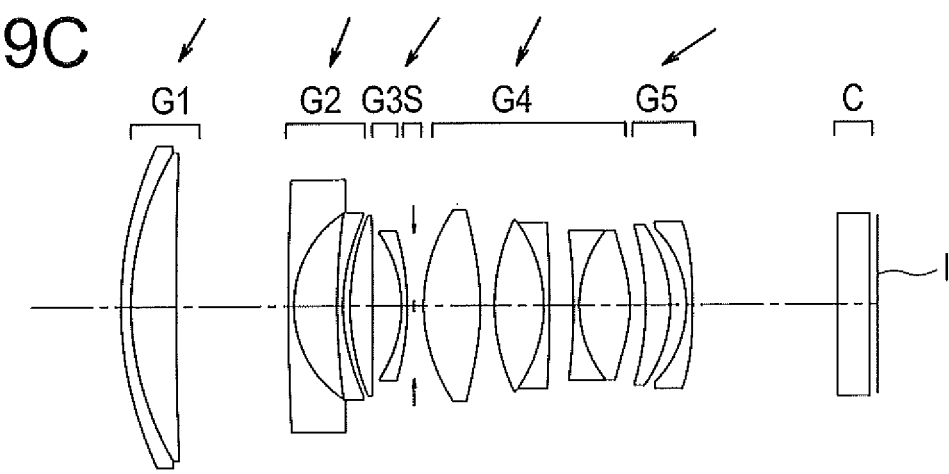

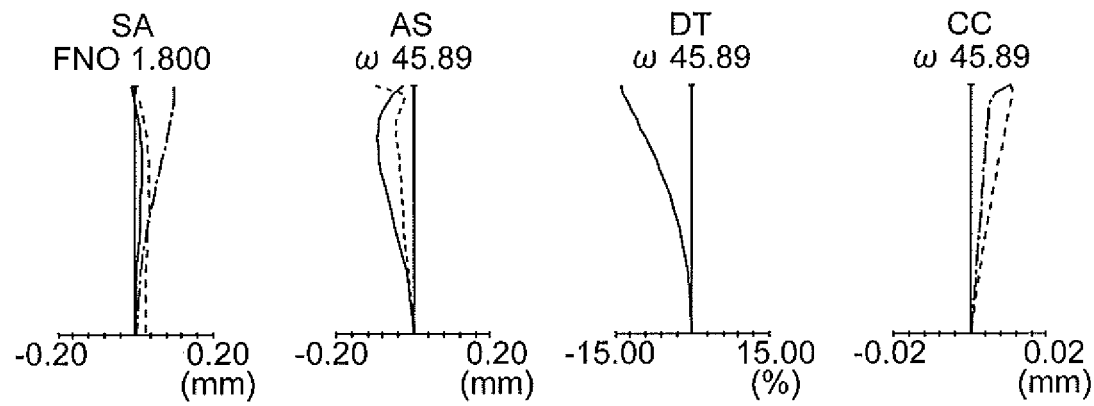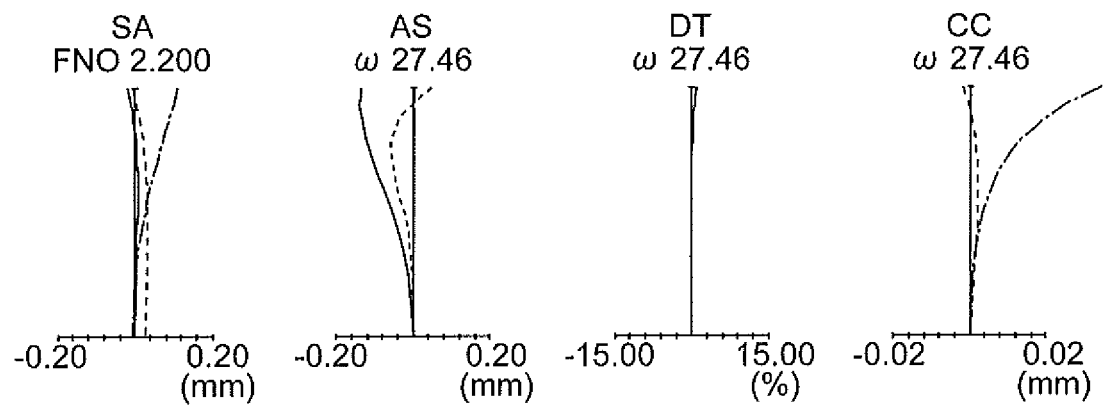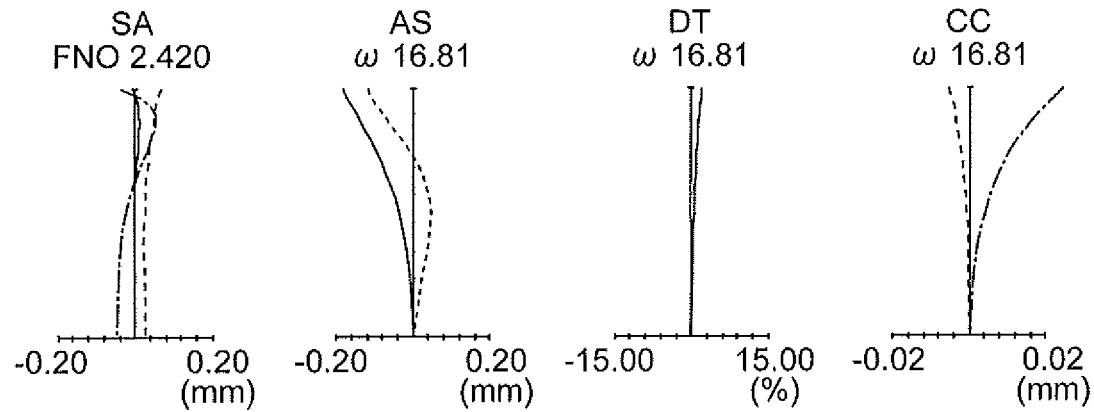

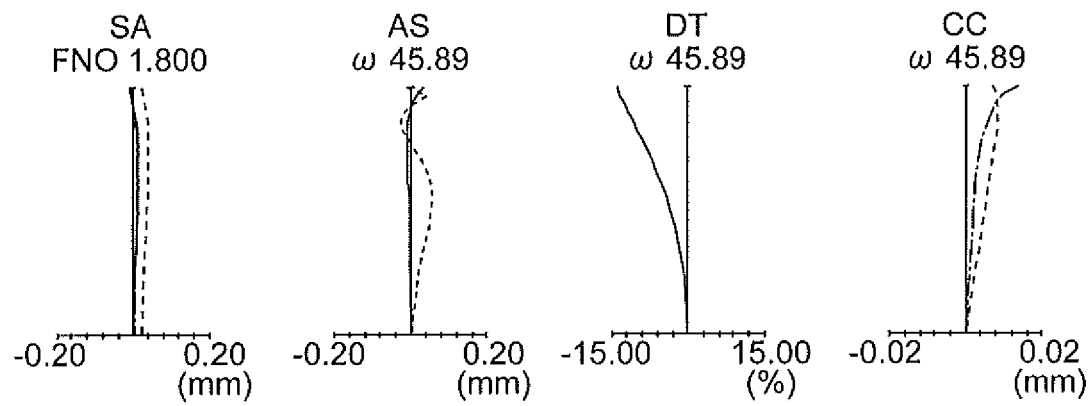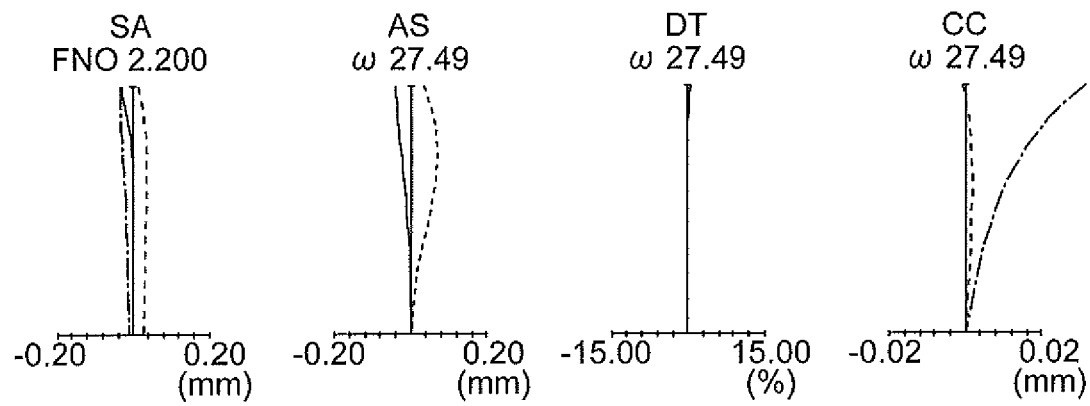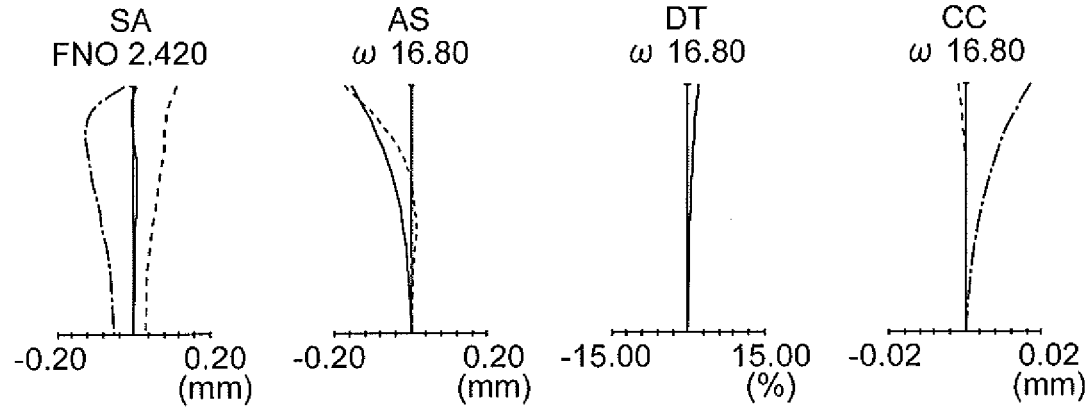

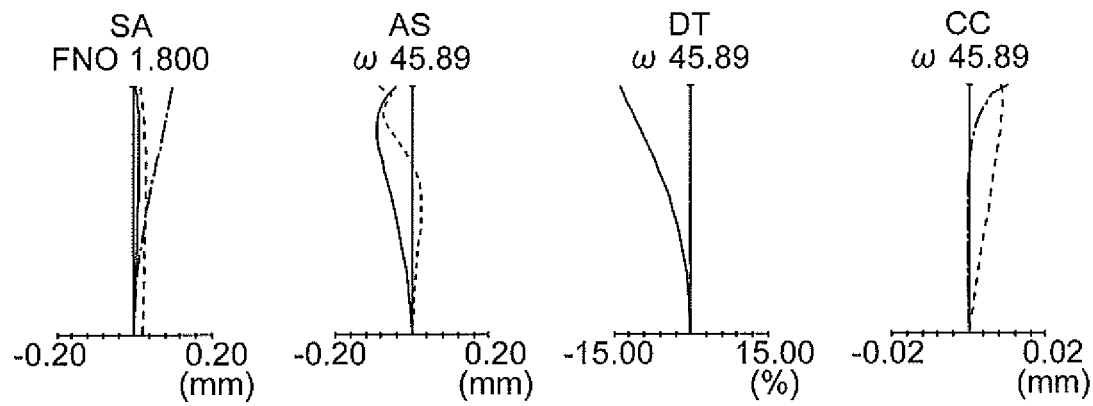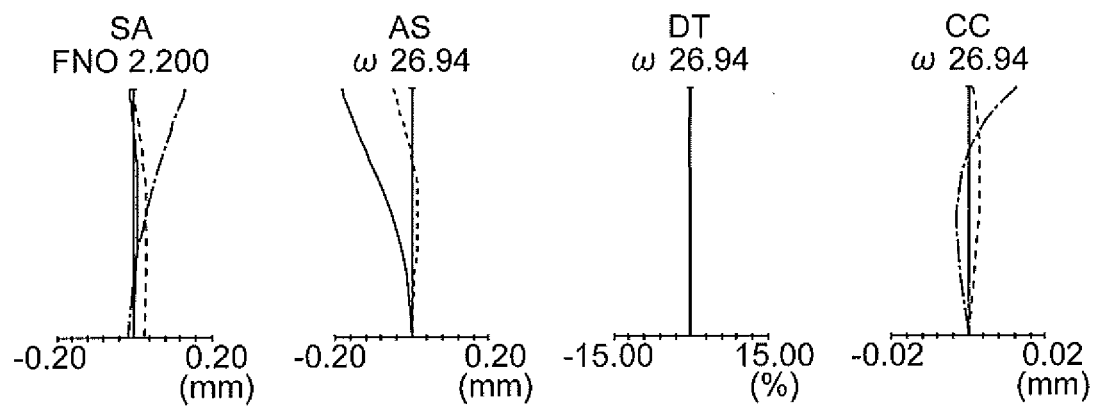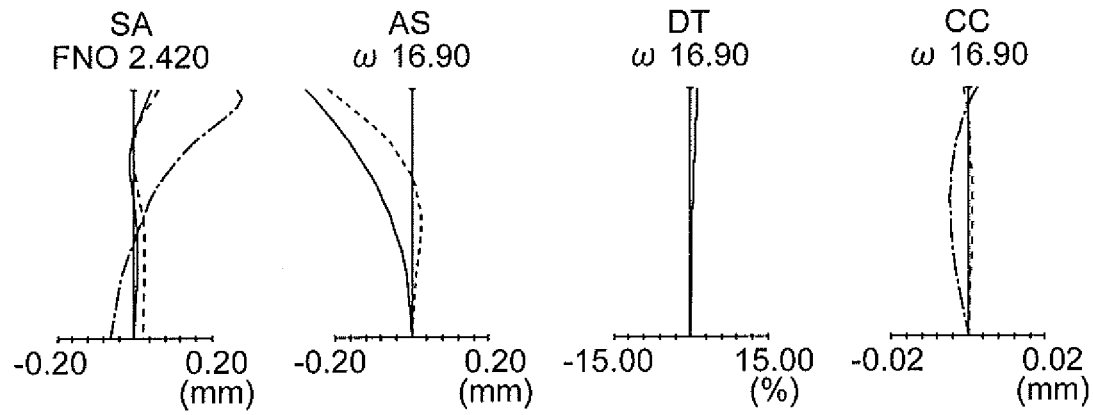

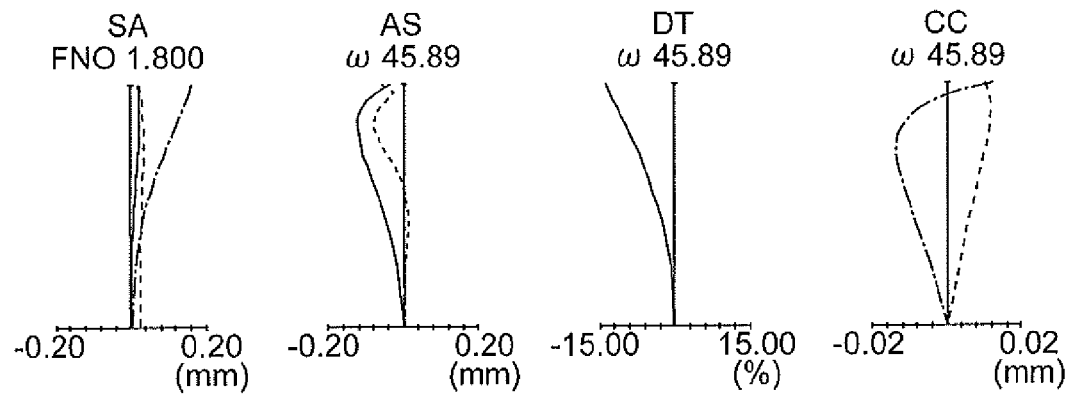
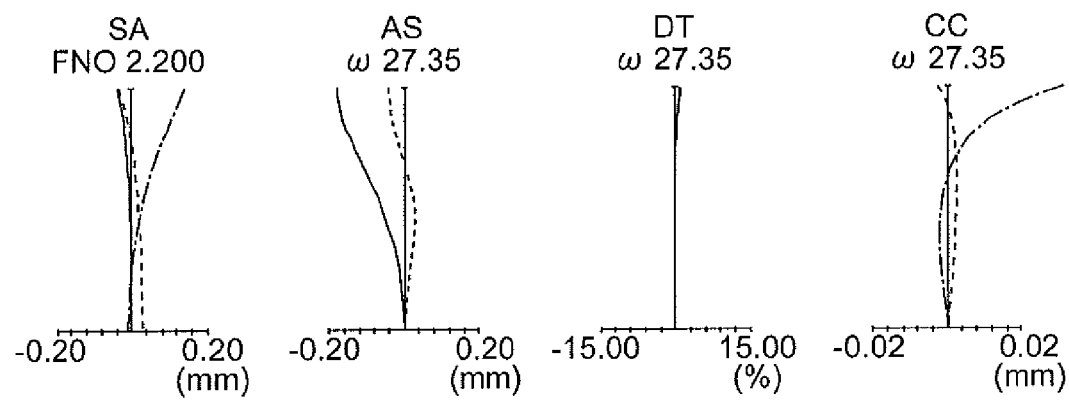
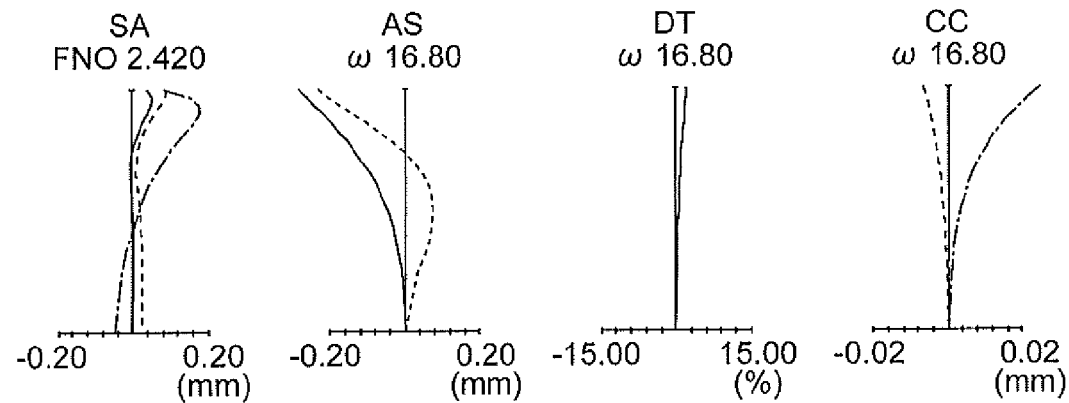

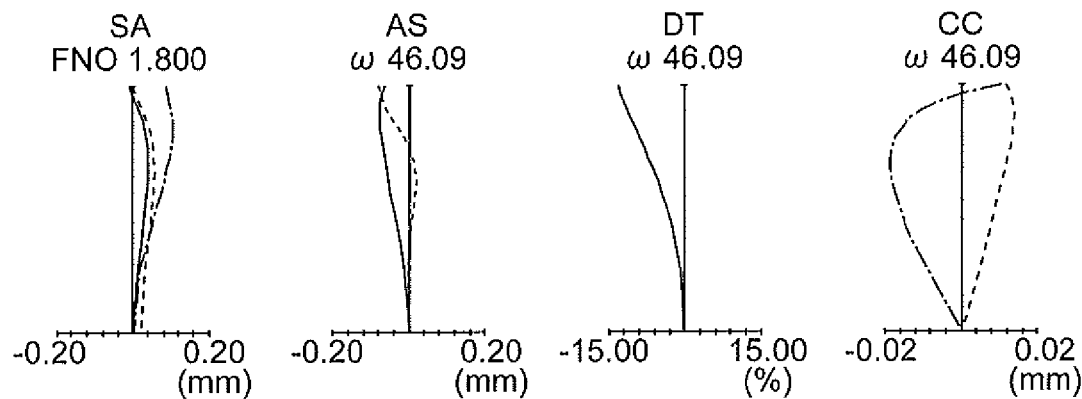
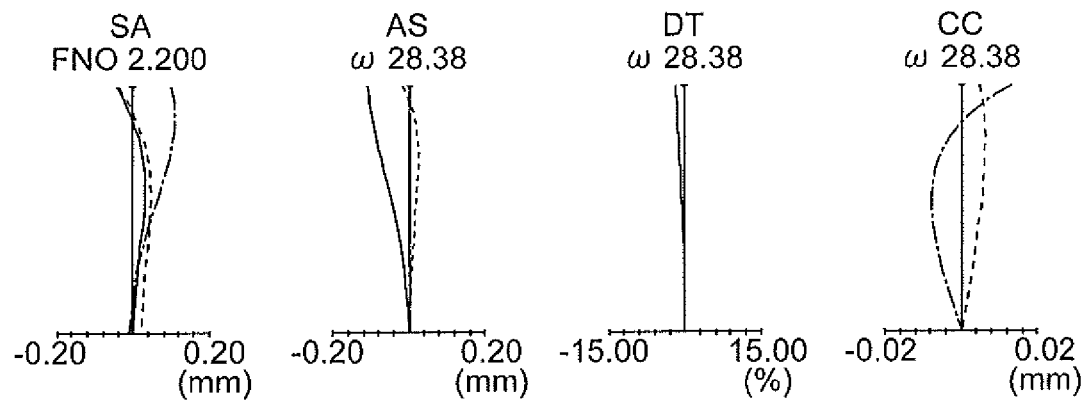
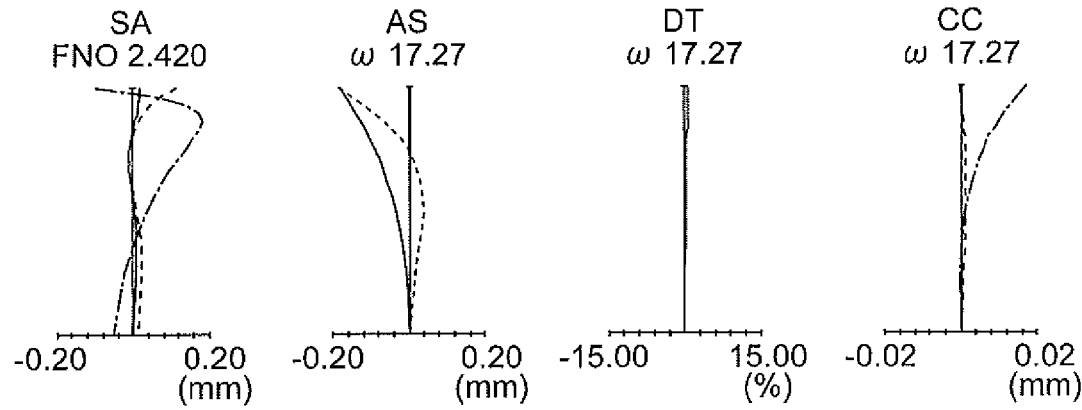

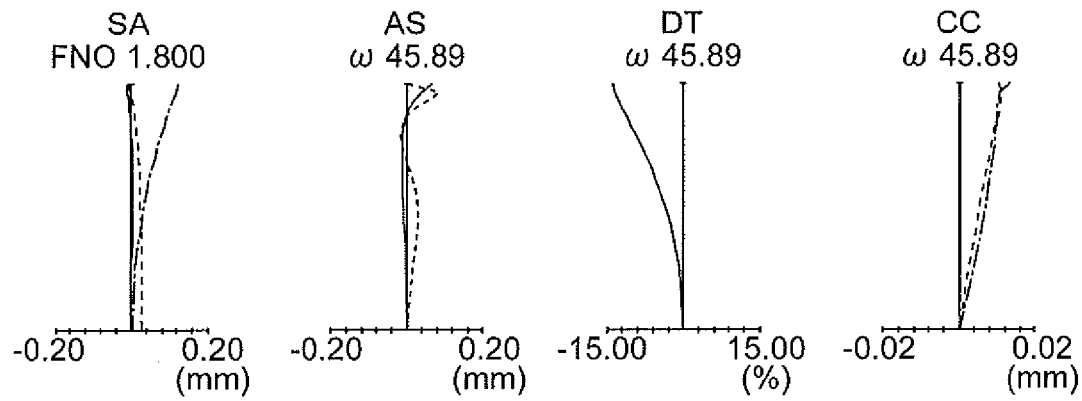
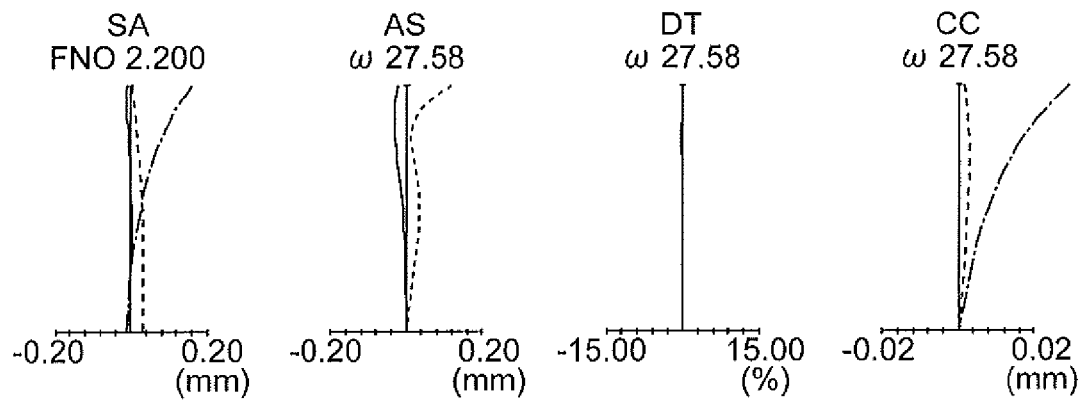
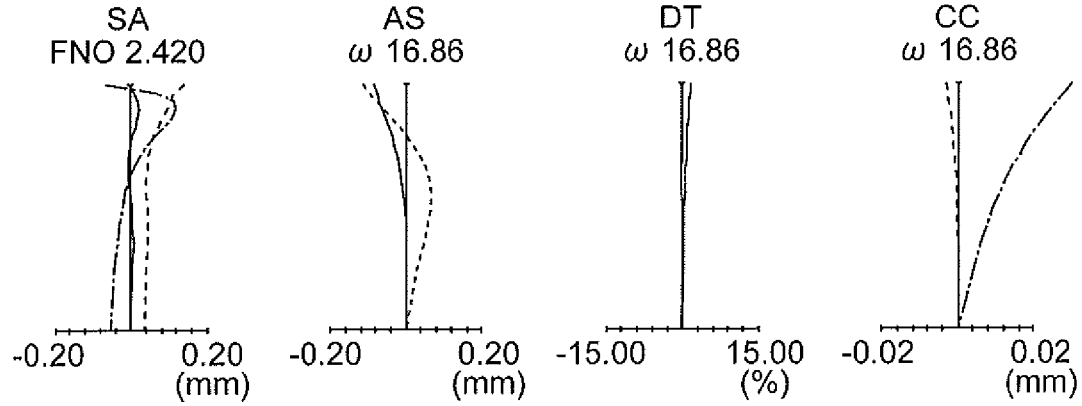

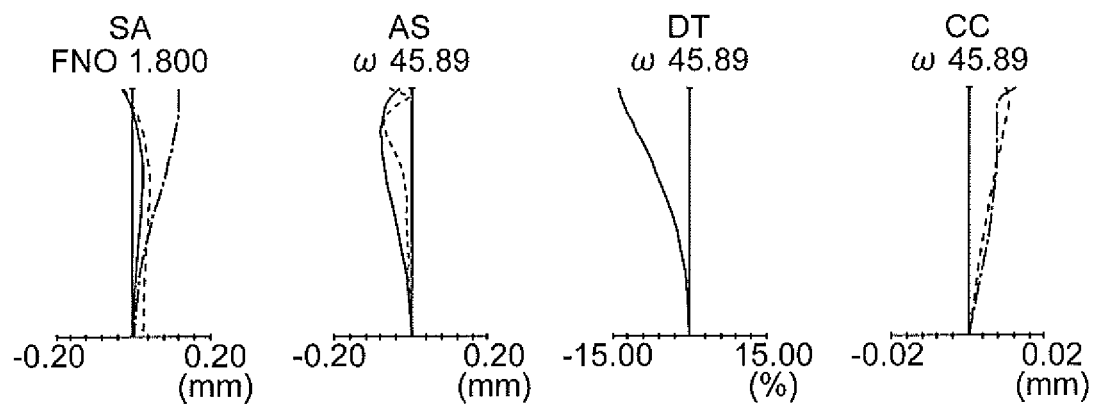
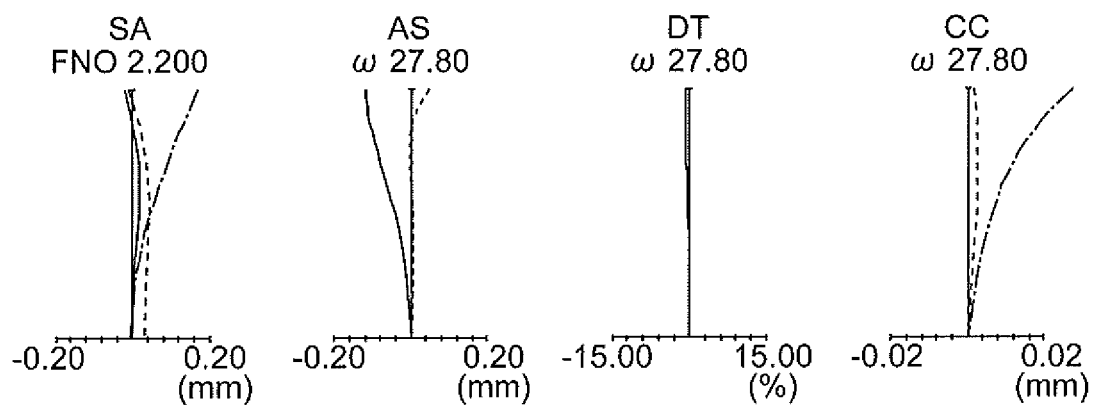
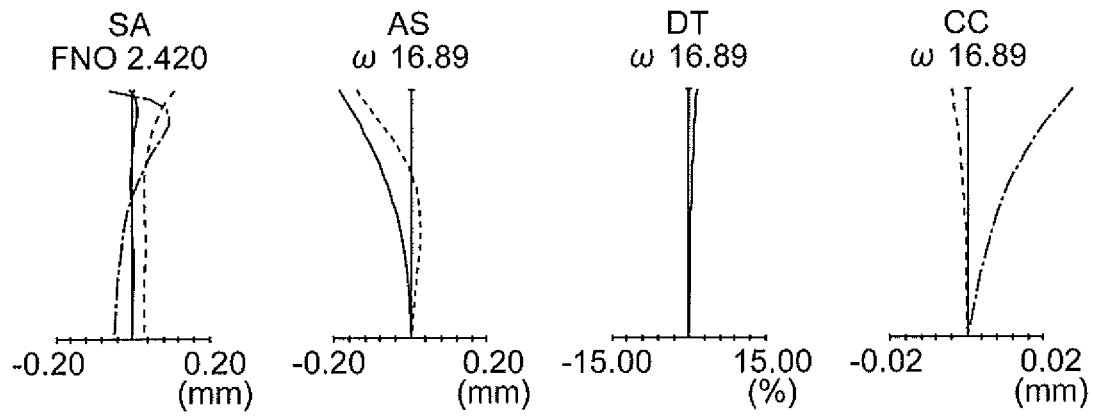

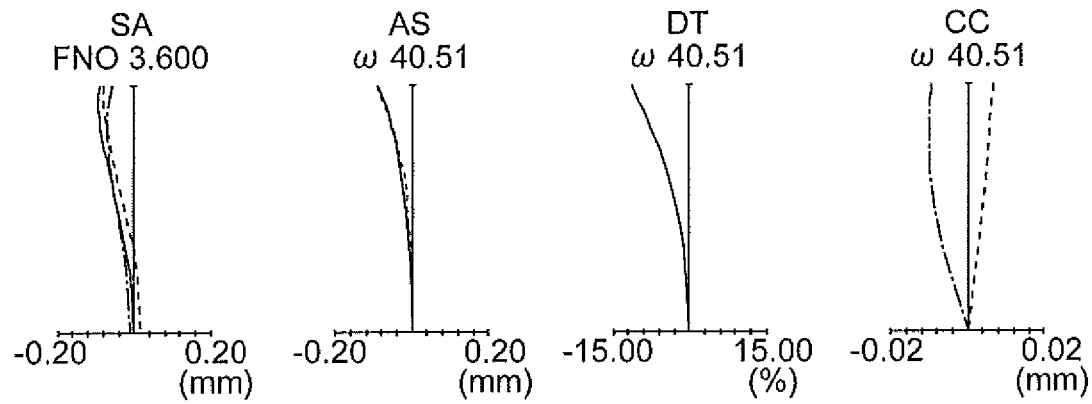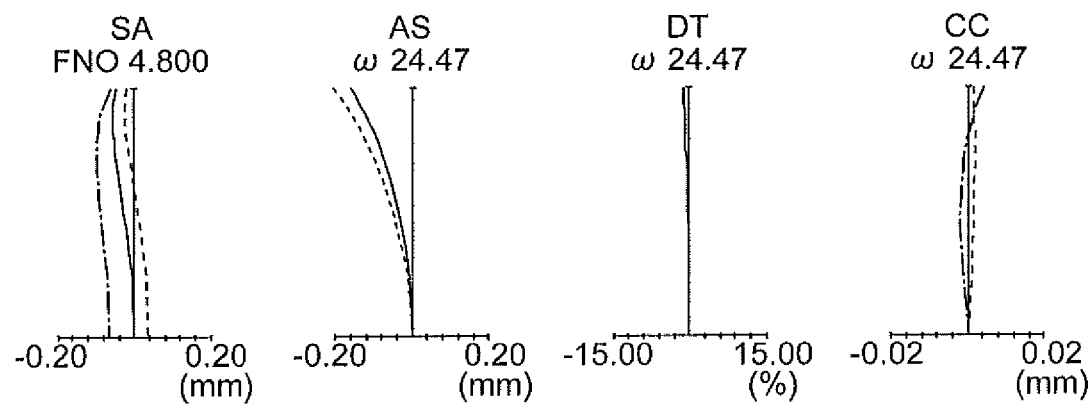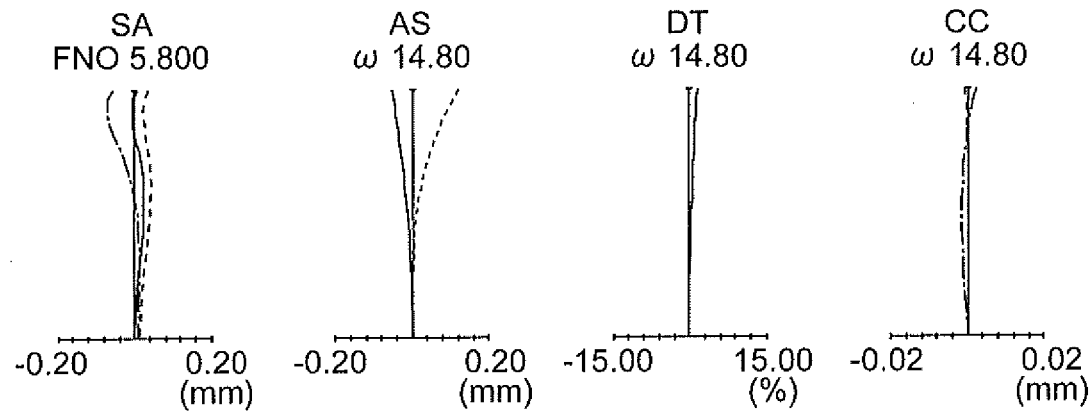

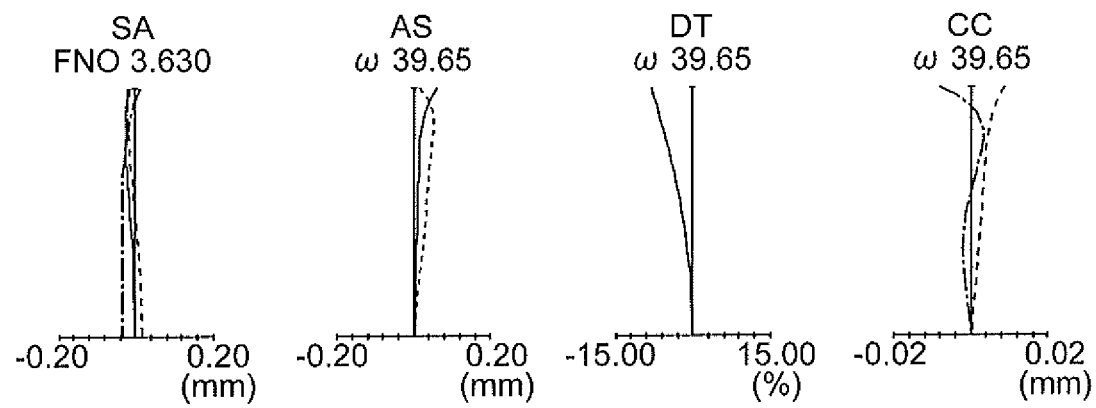
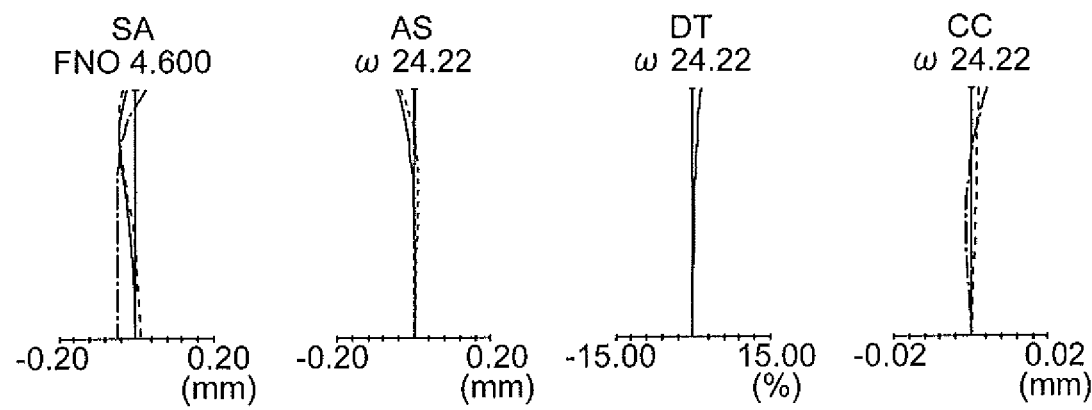
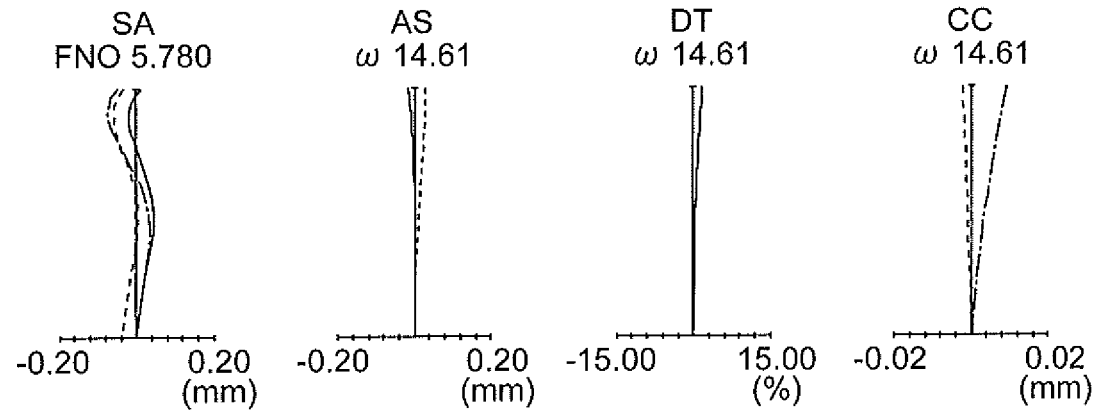

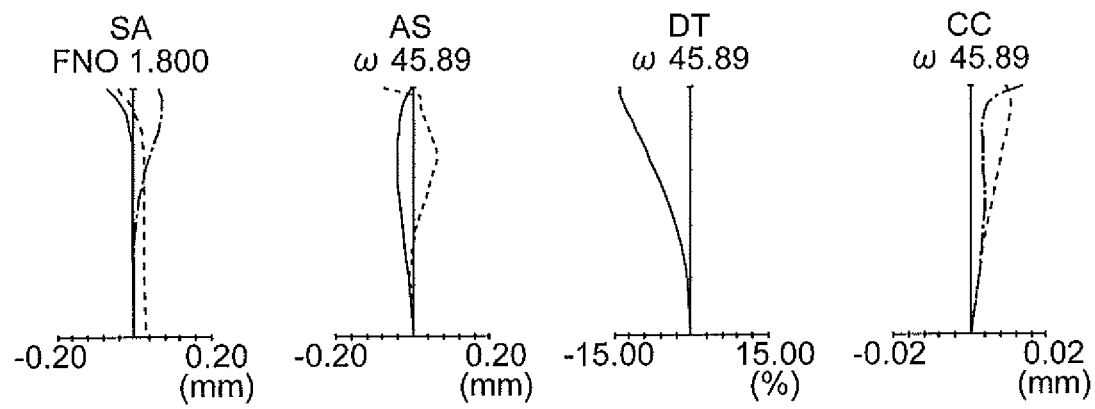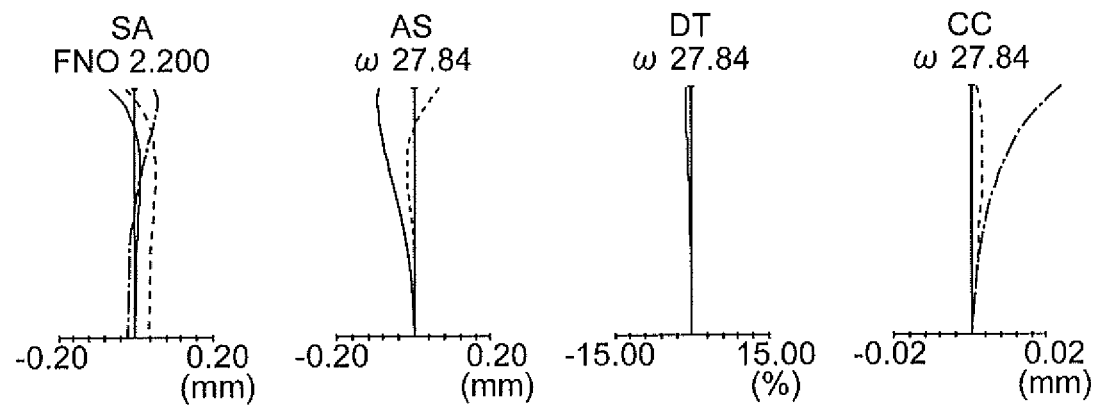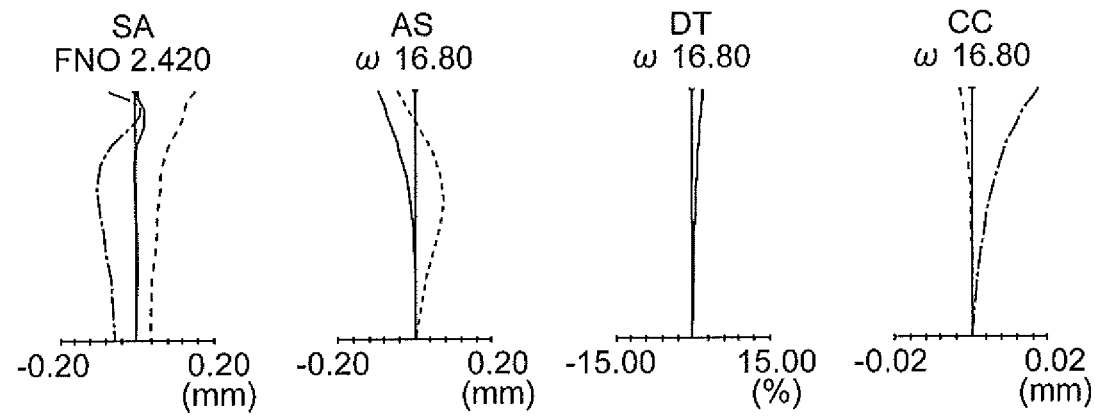

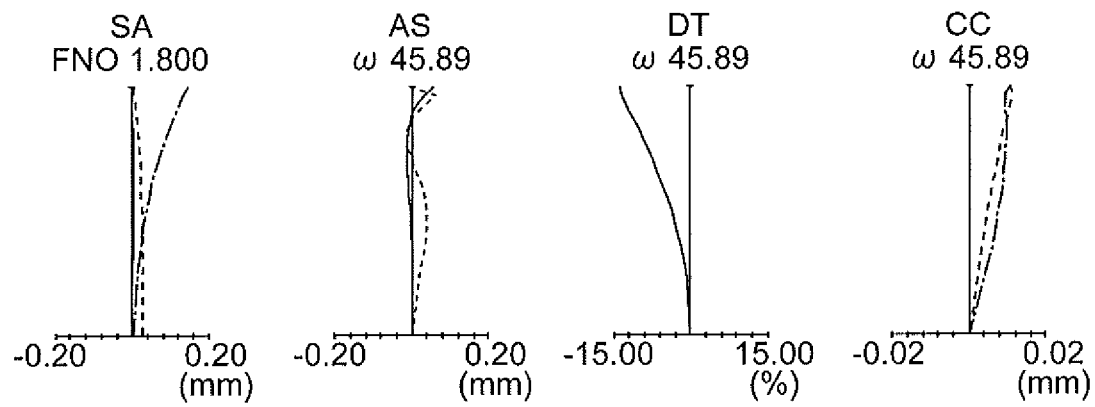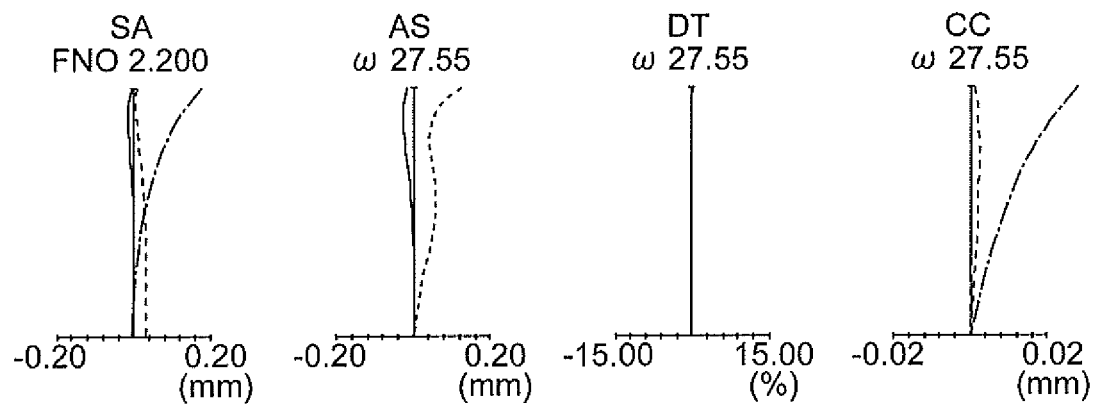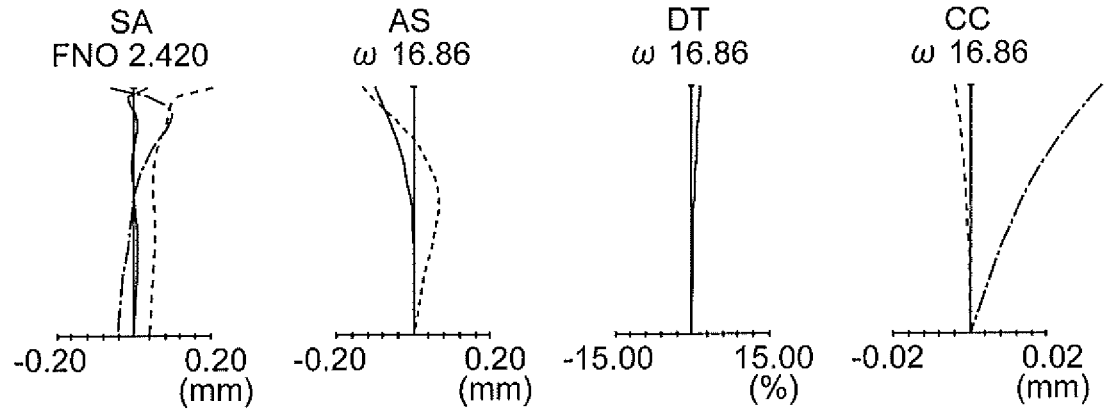

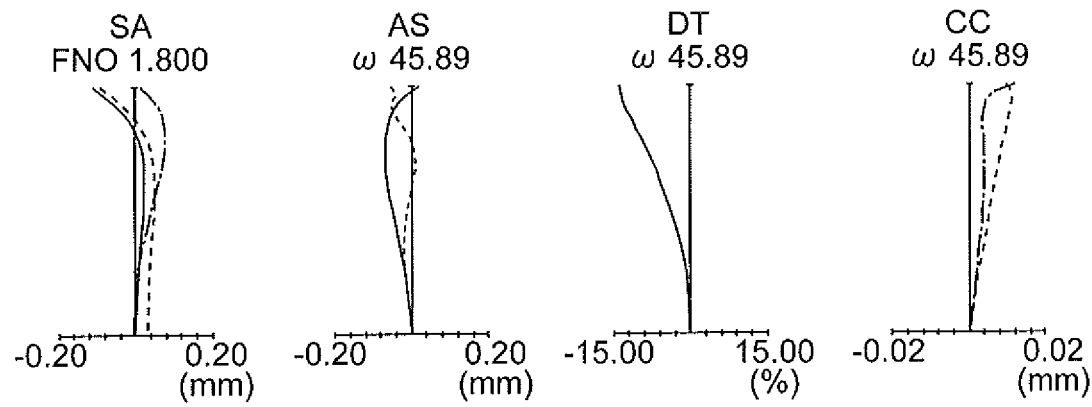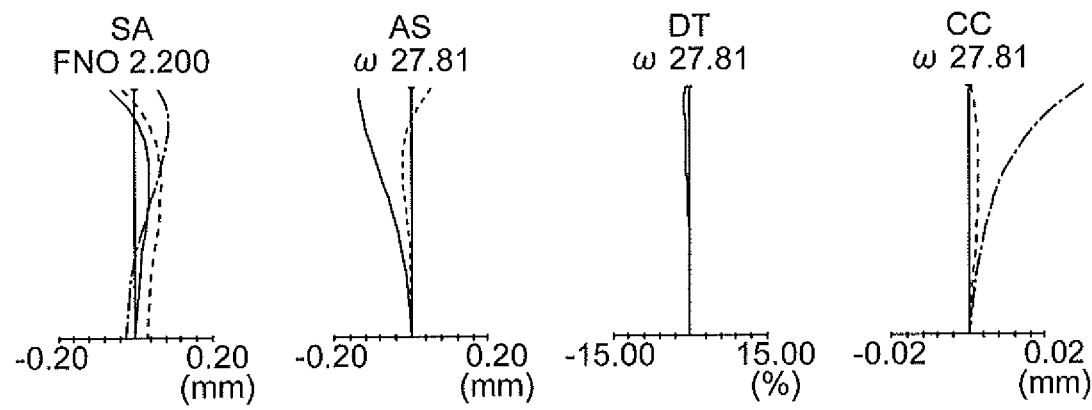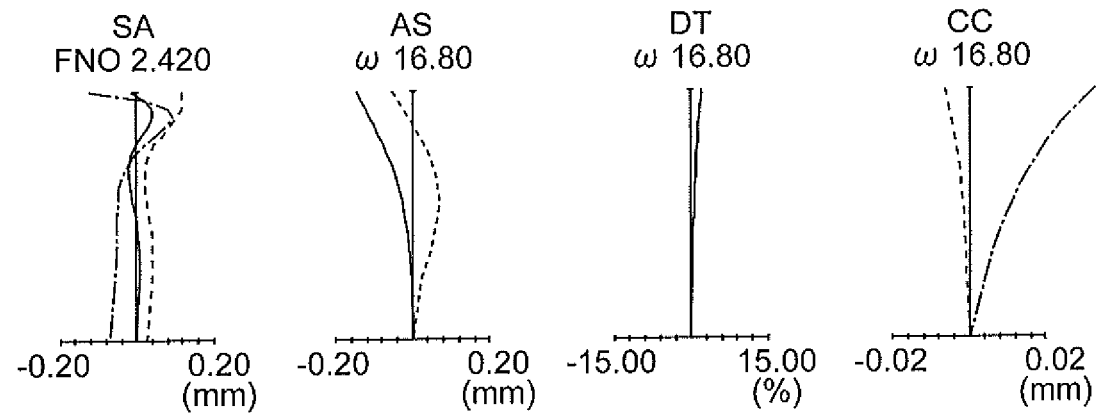

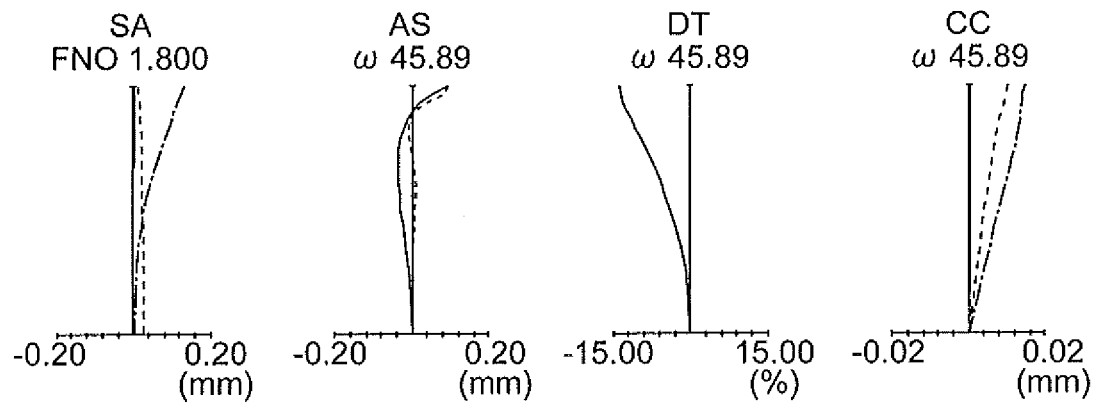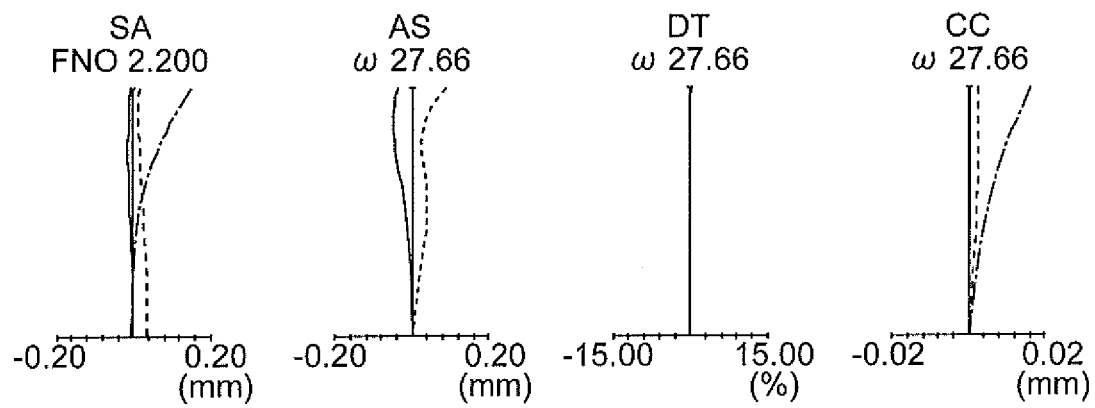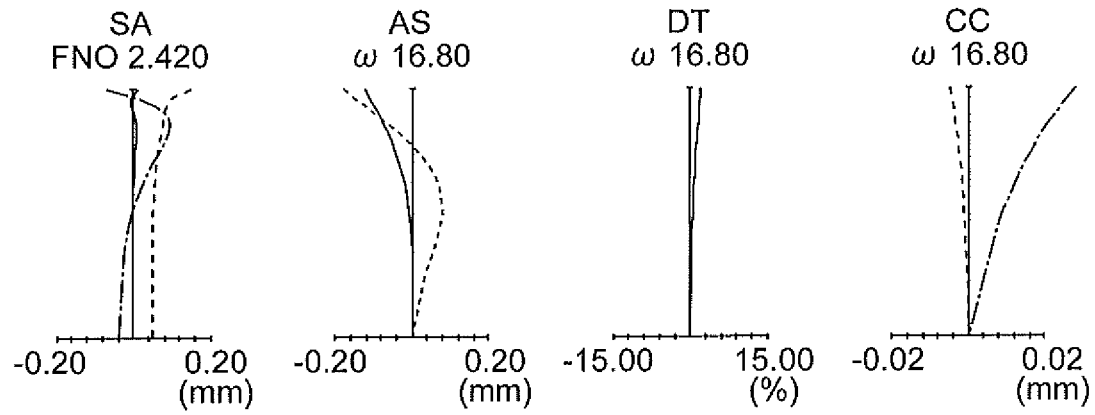

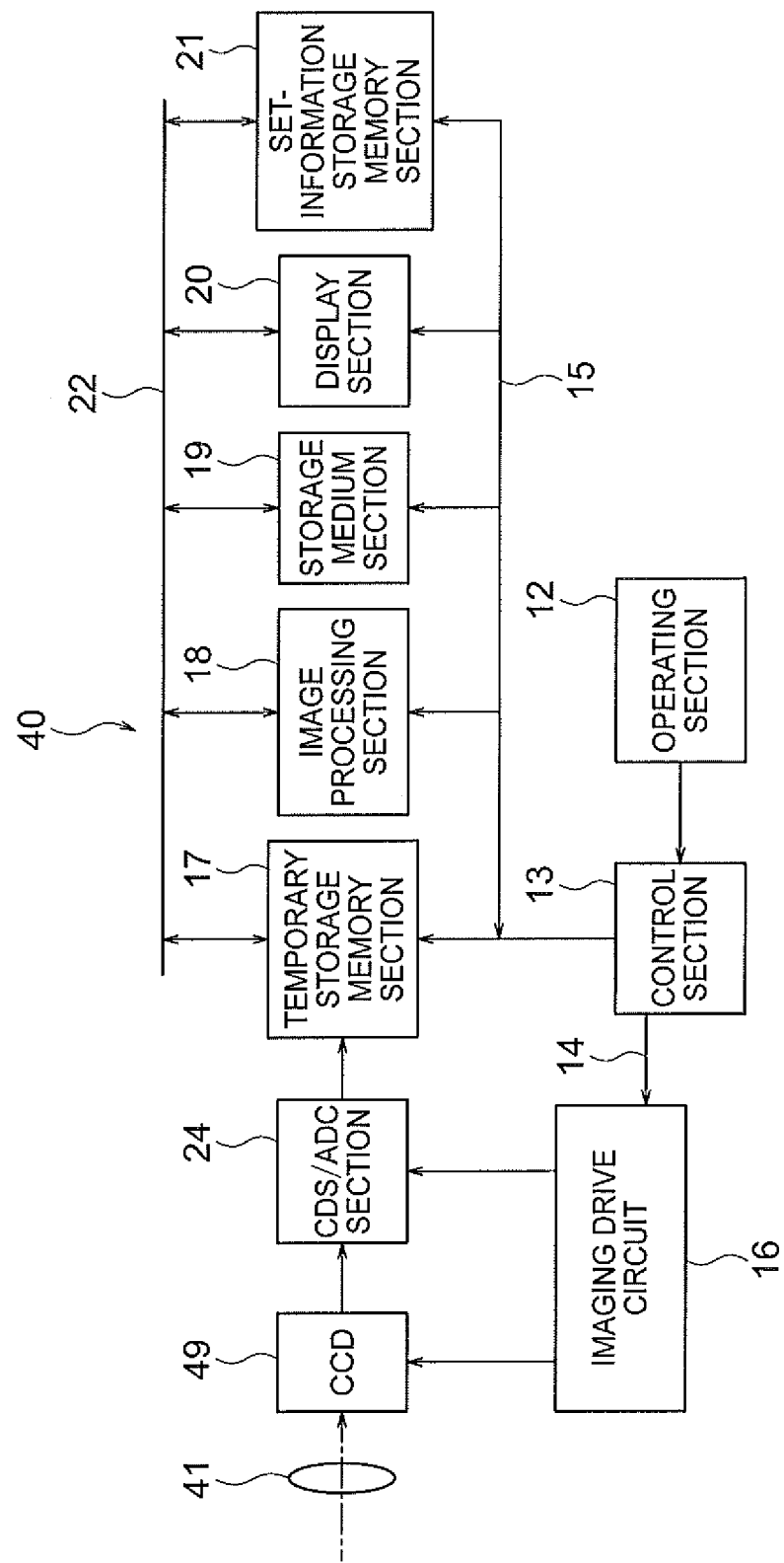

ZOOM LENS AND IMAGE PICKUP APPARATUS USING THE SAME

CROSS-REFERENCE TO RELATED APPLICATION

The present application is a continuation of PCT/JP2014/062226, filed on May 7, 2014 which is based upon and claims the benefit of priority from Japanese Patent Application No. 2013-114618 filed on May 30, 2013; the entire contents of which are incorporated herein by reference.

BACKGROUND OF THE INVENTION

Field of the Invention

The present invention relates to a zoom lens and an image pickup apparatus using the same.

Description of the Related Art

For a zoom lens to be used in an image pickup apparatus, it is expected that the zoom lens is small-sized, and that various aberrations are corrected favorably. On the other hand, for an image pickup element to be used in an image pickup apparatus, it is preferable that the image pickup element has a high sensitivity and that the number of pixels is large. For this, a size of the image pickup element (size of a light receiving surface) becomes large. For such reasons, a zoom lens, in addition to be small-sized and having various aberrations corrected favorably, is expected to be capable of coping with an image pickup element of a large size as well.

As the size of the image pickup element becomes large, a size of an image formed on the image pickup element also becomes large. To be capable of coping with an image pickup element of a large size means that, even in a case in which the size of the image has become large, various aberrations in a peripheral portion (a portion at a high image height) are corrected favorably.

Meanwhile, as a camera with a small size of image pickup element, small-sized cameras of a fixed-lens type (popularly known as compact cameras) have been used widely. As a zooming optical system appropriate for a fixed-lens camera, a zoom lens disclosed in Japanese Patent No. 3598971 is available. The zoom lens of Japanese Patent No. 3598971 includes four lens units. Concretely, the zoom lens includes in order from an object side, a first lens unit having a positive refractive power, a second lens unit having a negative refractive power, a third lens unit having a positive refractive power, and a fourth lens unit having a negative refractive power.

Incidentally, an arrangement in which, a lens unit having a positive refractive power is disposed nearest to an object is called as a positive-lead type arrangement. In the most basic positive-lead type arrangements, lens units are disposed from the object side in order of a first lens unit having a positive refractive power, a second lens unit having a negative refractive power, a third lens unit having a positive refractive power, and a fourth lens unit having a positive refractive power.

The zoom lens of Japanese Patent No. 3598971 can be said to be a zoom lens in which, the positive refractive power of the fourth lens unit in the basic type is replaced by a negative refractive power. By doing so, in the zoom lens of Japanese Patent No. 3598971, at a telephoto end at which, the overall length tends to become long, an arrangement is made such that the desired zooming ratio is achieved while shortening the overall length of the zoom lens.

Moreover, in the past, as a camera with a large size of an image pickup area, silver-salt cameras were used widely. As a zoom lens to be used in a silver-salt camera, a zoom lens disclosed in Japanese Patent Application Laid-open Publication No. Hei 8-220438 is available. The zoom lens of Japanese Patent Application Laid-open Publication No. 220438 includes five lens units. Concretely, the zoom lens includes in order from an object side, a first lens unit having a positive refractive power, a second lens unit having a negative refractive power, a third lens unit having a negative refractive power, a fourth lens unit having a positive refractive power, and a fifth lens unit having a negative refractive power.

SUMMARY OF THE INVENTION

A zoom lens of the present invention having a plurality of lens units comprises in order from an object side, a first lens unit having a positive refractive power;

a second lens unit having a negative refractive power; and a rearmost lens unit having a negative refractive power, wherein the rearmost lens unit is positioned nearest to an image in the plurality of lens units, and at the time of zooming from a wide angle end to a telephoto end, distances between the lens units change, and the first lens unit moves toward the object side, and the following conditional expression is satisfied $$0.2 < (\beta_{lt}/\beta_{lw})/(f_t/f_w) < 0.7$$

where, $\beta_{lt}$ denotes a lateral magnification of the rearmost lens unit at the telephoto end, $\beta_{lw}$ denotes a lateral magnification of the rearmost lens unit at the wide angle end, $f_t$ denotes a focal length of the overall zoom lens system at the telephoto end, and $f_w$ denotes a focal length of the overall zoom lens system at the wide angle end.

Moreover, an image pickup apparatus of the present invention comprises the aforementioned zoom lens, and an image pickup element which has an image pickup surface.

BRIEF DESCRIPTION OF THE DRAWINGS

FIG. 1A, FIG. 1B, and FIG. 1C are cross-sectional views along an optical axis showing an optical arrangement of a zoom lens according to an example 1 at the time of focusing on an infinite object point, where, FIG. 1A is a cross-sectional view at a wide angle end, FIG. 1B is a cross-sectional view in an intermediate focal length state, and FIG. 1C is a cross-sectional view at a telephoto angle end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L (hereinafter, 'FIG. 2A to FIG. 2L') are diagrams showing a spherical aberration (SA), an astigmatism (AS), a distortion (DT), and a chromatic aberration of magnification (CC) of the zoom lens according to the example 1 at the time of focusing on the infinite object point, where, FIG. 2A, FIG. 2B, FIG. 2C, and FIG. 2D show a state at the wide angle end, FIG. 2E, FIG. 2F, FIG. 2G, and FIG. 2H show an intermediate focal length state, and FIG. 2I, FIG. 2J, FIG. 2K, and FIG. 2L show a state at the telephoto end;

FIG. 3A is a cross-sectional view at a wide angle end, FIG. 3B is a cross-sectional view in an intermediate focal length state, and FIG. 3C is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L (hereinafter, 'FIG. 4A to FIG. 4L') are diagrams showing a spherical aberration (SA), an astigmatism (AS), a distortion (DT), and a chromatic aberration of magnification (CC) of the zoom lens according to the example 2 at the time of focusing on the infinite object point, where, FIG. 4A, FIG. 4B, FIG. 4C, and FIG. 4D show a state at the wide angle end, FIG. 4E, FIG. 4F, FIG. 4G, and FIG. 4H show an intermediate focal length state, and FIG. 4I, FIG. 4J, FIG. 4K, and FIG. 4L show a state at the telephoto end;

FIG. 5A is a cross-sectional view at a wide angle end, FIG. 5B is a cross-sectional view in an intermediate focal length state, and FIG. 5C is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L (hereinafter, 'FIG. 6A to FIG. 6L') are diagrams showing a spherical aberration (SA), an astigmatism (AS), a distortion (DT), and a chromatic aberration of magnification (CC) of the zoom lens according to the example 3 at the time of focusing on the infinite object point, where, FIG. 6A, FIG. 6B, FIG. 6C, and FIG. 6D show a state at the wide angle end, FIG. 6E, FIG. 6F, FIG. 6G, and FIG. 6H show an intermediate focal length state, and FIG. 6I, FIG. 6J, FIG. 6K, and FIG. 6L show a state at the telephoto end;

FIG. 7A is a cross-sectional view at a wide angle end, FIG. 7B is a cross-sectional view in an intermediate focal length state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, 'FIG. 8A to FIG. 8L') are diagrams showing a spherical aberration (SA), an astigmatism (AS), a distortion (DT), and a chromatic aberration of magnification (CC) of the zoom lens according to the example 4 at the time of focusing on the infinite object point, where, FIG. 8A, FIG. 8B, FIG. 8C, and FIG. 8D show a state at the wide angle end, FIG. 8E, FIG. 8F, FIG. 8G, and FIG. 8H show an intermediate focal length state, and FIG. 8I, FIG. 8J, FIG. 8K, and FIG. 8L show a state at the telephoto end;

FIG. 9A, FIG. 9B, and FIG. 9C are cross-sectional views along an optical axis showing an optical arrangement of a zoom lens according to an example 5 at the time of focusing on the infinite object point, where, FIG. 9A is a cross-sectional view at a wide angle end, FIG. 9B is a cross-sectional view in an intermediate focal length state, and FIG. 9C is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, 'FIG. 10A to FIG. 10L') are diagrams showing a spherical aberration (SA), an astigmatism (AS), a distortion (DT), and a chromatic aberration of magnification (CC) of the zoom lens according to the example 5 at the time of focusing on the infinite object point, where, FIG. 10A, FIG. 10B, FIG. 10C, and FIG. 10D show a state at the wide angle end, FIG. 10E, FIG. 10F, FIG. 10G, and FIG. 10H show an intermediate focal length state, and FIG. 10I, FIG. 10J, FIG. 10K, and FIG. 10L show a state at the telephoto end;

FIG. 11A is a cross-sectional view at a wide angle end, FIG. 11B is a cross-sectional view in an intermediate focal length state, and FIG. 11C is a cross-sectional view at a telephoto end;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are diagrams showing a spherical aberration (SA), an astigmatism (AS), a distortion (DT), and a chromatic aberration of magnification (CC) of the zoom lens according to the example 6 at the time of focusing on the infinite object point, where, FIG. 12A, FIG. 12B, FIG. 12C, and FIG. 12D show a state at the wide angle end, FIG. 12E, FIG. 12F, FIG. 12G, and FIG. 12H show an intermediate focal length state, and FIG. 12I, FIG. 12J, FIG. 12K, and FIG. 12L show a state at the telephoto end;

FIG. 13A is a cross-sectional view at a wide angle end, FIG. 13B is a cross-sectional view in an intermediate focal length state, and FIG. 13C is a cross-sectional view at a telephoto end;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L (hereinafter, 'FIG. 14A to FIG. 14L') are diagrams showing a spherical aberration (SA), an astigmatism (AS), a distortion (DT), and a chromatic aberration of magnification (CC) of the zoom lens according to the example 7 at the time of focusing on the infinite object point, where, FIG. 14A, FIG. 14B, FIG. 14C, and FIG. 14D show a state at the wide angle end, FIG. 14E, FIG. 14F, FIG. 14G, and FIG. 14H show an intermediate focal length state, and FIG. 14I, FIG. 14J, FIG. 14K, and FIG. 14L show a state at the telephoto end;

FIG. 15A is a cross-sectional view at a wide angle end, FIG. 15B is a cross-sectional view in an intermediate focal length state, and FIG. 15C is a cross-sectional view at a telephoto end;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L (hereinafter, 'FIG. 16A to FIG. 16L') are diagrams showing a spherical aberration (SA), an astigmatism (AS), a distortion (DT), and a chromatic aberration of magnification (CC) of the zoom lens according to the example 8 at the time of focusing on the infinite object point, where, FIG. 16A, FIG. 16B, FIG. 16C, and FIG. 16D show a state at the wide angle end, FIG. 16E, FIG. 16F, FIG. 16G, and FIG. 16H show an intermediate focal length state, and FIG. 16I, FIG. 16J, FIG. 16K, and FIG. 16L show a state at the telephoto end;

FIG. 17A is a cross-sectional view at a wide angle end, FIG. 17B is a cross-sectional view in an intermediate focal length state, and FIG. 17C is a cross-sectional view at a telephoto end;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L (hereinafter, 'FIG. 18A to FIG. 18L') are diagrams showing a spherical aberration (SA), an astigmatism (AS), a distortion (DT), and a chromatic aberration of magnification (CC) of the zoom lens according to the example 9 at the time of focusing on the infinite object point, where, FIG. 18A, FIG. 18B, FIG. 18C, and FIG. 18D show a state at the wide angle end, FIG. 18E, FIG. 18F, FIG. 18G, and FIG. 18H show an intermediate focal length state, and FIG. 18I, FIG. 18J, FIG. 18K, and FIG. 18L show a state at the telephoto end;

FIG. 19A is a cross-sectional view at a wide angle end, FIG. 19B is a cross-sectional view in an intermediate focal length state, and FIG. 19C is a cross-sectional view at a telephoto end;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L (hereinafter, 'FIG. 20A to FIG. 20L') are diagrams showing a spherical aberration (SA), an astigmatism (AS), a distortion (DT), and a chromatic aberration of magnification (CC) of the zoom lens according to the example 10 at the time of focusing on the infinite object point, where, FIG. 20A, FIG. 20B, FIG. 20C, and FIG. 20D show a state at the wide angle end, FIG. 20E, FIG. 20F, FIG. 20G, and FIG. 20H show an intermediate focal length state, and FIG. 20I, FIG. 20J, FIG. 20K, and FIG. 20L show a state at the telephoto end;

FIG. 21A is a cross-sectional view at a wide angle end, FIG. 21B is a cross-sectional view in an intermediate focal length state, and FIG. 21C is a cross-sectional view at a telephoto end;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L (hereinafter, 'FIG. 22A to FIG. 22L') are diagrams showing a spherical aberration (SA), an astigmatism (AS), a distortion (DT), and a chromatic aberration of magnification (CC) of the zoom lens according to the example 11 at the time of focusing on the infinite object point, where, FIG. 22A, FIG. 22B, FIG. 22C, and FIG. 22D show a state at the wide angle end, FIG. 22E, FIG. 22F, FIG. 22G, and FIG. 22H show an intermediate focal length state, and FIG. 22I, FIG. 22J, FIG. 22K, and FIG. 22L show a state at the telephoto end;

FIG. 23A is a cross-sectional view at a wide angle end, FIG. 23B is a cross-sectional view in an intermediate focal length state, and FIG. 23C is a cross-sectional view at a telephoto end;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L (hereinafter, 'FIG. 24A to FIG. 24L') are diagrams showing a spherical aberration (SA), an astigmatism (AS), a distortion (DT), and a chromatic aberration of magnification (CC) of the zoom lens according to the example 12 at the time of focusing on the infinite object point, where, FIG. 24A, FIG. 24B, FIG. 24C, and FIG. 24D show a state at the wide angle end, FIG. 24E, FIG. 24F, FIG. 24G, and FIG. 24H show an intermediate focal length state, and FIG. 24I, FIG. 24J, FIG. 24K, and FIG. 24L show a state at the telephoto end;

FIG. 25A is a cross-sectional view at a wide angle end, FIG. 25B is a cross-sectional view in an intermediate focal length state, and FIG. 25C is a cross-sectional view at a telephoto end;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L (hereinafter, 'FIG. 26A to FIG. 26L') are diagrams showing a spherical aberration (SA), an astigmatism (AS), a distortion (DT), and a chromatic aberration of magnification (CC) of the zoom lens according to the example 13 at the time of focusing on the infinite object point, where, FIG. 26A, FIG. 26B, FIG. 26C, and FIG. 26D show a state at the wide angle end, FIG. 26E, FIG. 26F, FIG. 26G, and FIG. 26H show an intermediate focal length state, and FIG. 26I, FIG. 26J, FIG. 26K, and FIG. 26L show a state at the telephoto end;

FIG. 27A is a cross-sectional view at a wide angle end, FIG. 27B is a cross-sectional view in an intermediate focal length state, and FIG. 27C is a cross-sectional view at a telephoto end;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L (hereinafter, 'FIG. 28A to FIG. 28L') are diagrams showing a spherical aberration (SA), an astigmatism (AS), a distortion (DT), and a chromatic aberration of magnification (CC) of the zoom lens according to the example 14 at the time of focusing on the infinite object point, where, FIG. 28A, FIG. 28B, FIG. 28C, and FIG. 28D show a state at the wide angle end, FIG. 28E, FIG. 28F, FIG. 28G, and FIG. 28H show an intermediate focal length state, and FIG. 28I, FIG. 28J, FIG. 28K, and FIG. 28L show a state at the telephoto end;

FIG. 29A is a cross-sectional view at a wide angle end, FIG. 29B is a cross-sectional view in an intermediate focal length state, and FIG. 29C is a cross-sectional view at a telephoto end;

FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L (hereinafter, 'FIG. 30A to FIG. 30L') are diagrams showing a spherical aberration (SA), an astigmatism (AS), a distortion (DT), and a chromatic aberration of magnification (CC) of the zoom lens according to the example 15 at the time of focusing on the infinite object point, where, FIG. 30A, FIG. 30B, FIG. 30C, and FIG. 30D show a state at the wide angle end, FIG. 30E, FIG. 30F, FIG. 30G, and FIG. 30H show an intermediate focal length state, and FIG. 30I, FIG. 30J, FIG. 30K, and FIG. 30L show a state at the telephoto end;

FIG. 31A is a cross-sectional view at a wide angle end, FIG. 31B is a cross-sectional view in an intermediate focal length state, and FIG. 31C is a cross-sectional view at a telephoto end;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L (hereinafter, 'FIG. 32A to FIG. 32L') are diagrams showing a spherical aberration (SA), an astigmatism (AS), a distortion (DT), and a chromatic aberration of magnification (CC) of the zoom lens according to the example 16 at the time of focusing on the infinite object point, where, FIG. 32A, FIG. 32B, FIG. 32C, and FIG. 32D show a state at the wide angle end, FIG. 32E, FIG. 32F, FIG. 32G, and FIG. 32H show an intermediate focal length state, and FIG. 32I, FIG. 32J, FIG. 32K, and FIG. 32L show a state at the telephoto end;

FIG. 33A is a cross-sectional view at a wide angle end, FIG. 33B is a cross-sectional view in an intermediate focal length state, and FIG. 33C is a cross-sectional view at a telephoto end;

FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L (hereinafter, 'FIG. 34A to FIG. 34L') are diagrams showing a spherical aberration (SA), an astigmatism (AS), a distortion (DT), and a chromatic aberration of magnification (CC) of the zoom lens according to the example 17 at the time of focusing on the infinite object point, where, FIG. 34A, FIG. 34B, FIG. 34C, and FIG. 34D show a state at the wide angle end, FIG. 34E, FIG. 34F, FIG. 34G, and FIG. 34H show an intermediate focal length state, and FIG. 34I, FIG. 34J, FIG. 34K, and FIG. 34L show a state at the telephoto end;

FIG. 38 is a structural block diagram of an internal circuit of main components of the digital camera in FIG. 36.

DETAILED DESCRIPTION OF THE INVENTION

Figure 3A:
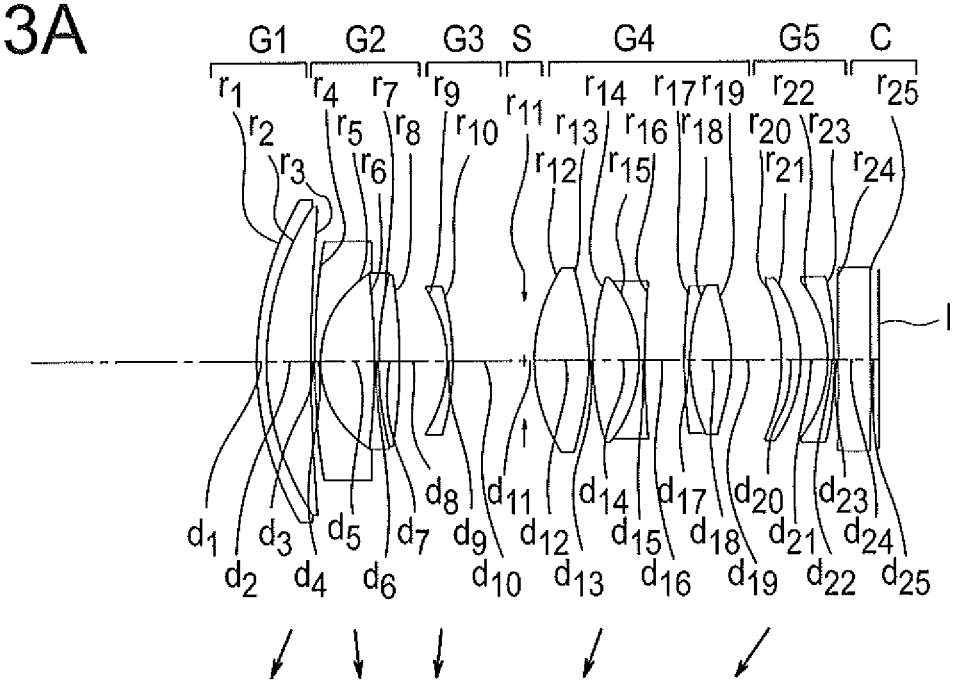
FIG. 3A, FIG. 3B, and FIG. 3C are cross-sectional views along an optical axis showing an optical arrangement of a zoom lens according to an example 2 at the time of focusing on the infinite object point, where.

Prior to explaining examples, an action and effect of embodiments according to certain aspects of the present invention will be described below. An action and effect of the present embodiment will be described specifically by describing concrete examples. However, similar to a case of the examples to be described later, the aspects exemplified thereof are some of the aspects included in the present invention, and there is a large number of variations in these aspects. Therefore, the present invention is not restricted to the aspects that are exemplified.

Moreover, arrangements and conditional expressions described below are arrangements and conditional expressions when focused on an infinite object point, unless specifically noted. Moreover, in a case in which, a lens surface is an aspheric surface, a paraxial radius of curvature may be let to be a radius of curvature of that lens surface.

Furthermore, in a case in which an arrangement of a lens unit is described by using 'a lens nearest to an image' and 'a lens nearest to an object', that lens unit is not restricted to include a plurality of lenses. In other words, a case in which, that lens unit consists of one lens is also included. In a case in which, a lens unit consists of one lens, that lens is a lens positioned nearest to an object in that lens unit, and at the same time, is a lens positioned nearest to an image in that lens unit.

A zoom lens of the present embodiment has a plurality of lens units, and includes in order from an object side, a first lens unit having a positive refractive power, a second lens unit having a negative refractive power; and a rearmost lens unit having a negative refractive power, and the rearmost lens unit is positioned nearest to an image in the plurality of lens units, and at the time of zooming from a wide angle end to a telephoto end, distances between the lens units change, and the first lens unit moves toward the object side, and the following conditional expression (1) is satisfied:

$$0.2 < (\beta_{lt}/\beta_{lw})/(f_t/f_w) < 0.7 \qquad (1)$$

where, $\beta_{lt}$ denotes a lateral magnification of the rearmost lens unit at the telephoto end, $\beta_{lw}$ denotes a lateral magnification of the rearmost lens unit at the wide angle end, $f_t$ denotes a focal length of the overall zoom lens system at the telephoto end, and $f_w$ denotes a focal length of the overall zoom lens system at the wide angle end.

The zoom lens of the present embodiment has the plurality of lens units, and includes in order from the object side, the first lens unit having a positive refractive power, the second lens unit having a negative refractive power, and the rearmost lens unit having a negative refractive power. Here, since the rearmost lens unit has a negative refractive power, it is possible to position principal points of the overall optical system further toward the object side. As a result, it is possible to make the optical system small-sized.

Moreover, at the time of zooming, distances between the lens units change. In this case, it is possible to cause a zooming effect by the rearmost lens unit and a lens unit positioned on the object side of the rearmost lens unit. Accordingly, it is possible to reduce a load of zooming on the lens unit positioned on the object side of the rearmost lens unit.

Here, it is preferable to cause the zooming effect by moving the rearmost lens unit. By moving the rearmost lens unit, it is possible to impart the zooming effect to the rearmost lens unit. Therefore, as compared to a case in which, the rearmost lens unit does not have the zooming effect, it is possible to reduce the load of zooming on the lens unit positioned on the object side of the rearmost lens unit, and particularly, to reduce the load of zooming on the second lens unit.

Moreover, when it is possible to reduce the load of zooming on the second lens unit, it is possible to suppress an increase in a distance between the first lens unit and the second lens unit at the telephoto end. As a result, even at the telephoto end at which, the overall length is susceptible to become long, it is possible to shorten the overall length of the zoom lens. Furthermore, by satisfying conditional expression (1), it is possible to enhance the effect of shortening the overall length of the zoom lens.

Conditional expression (1) is a conditional expression related to a zooming ratio (magnification) of the rearmost lens unit. It is preferable to make an arrangement such that the zooming ratio (load of zooming) of the rearmost lens unit to the zooming ratio of the overall optical system satisfies conditional expression (1).

By making so as not to fall below a lower limit value of conditional expression (1), it is possible to make the zooming ratio of the rearmost lens unit large up to certain degree.

In this case, it is possible to impart the zooming effect of an appropriate magnitude to the rearmost lens unit. Accordingly, it is possible to reduce the load of zooming on a lens unit which is positioned on the object side of the rearmost lens unit, and particularly, to reduce the load of zooming on the second lens unit. Moreover, by being able to reduce the load of zooming on the second lens unit, it is possible to suppress the increase in the distance between the first lens unit and the second lens unit at the telephoto end as aforementioned. As a result, it is possible to shorten the overall length of the zoom lens even at the telephoto end at which, the overall length is susceptible to become long.

Moreover, by being able to reduce the load of zooming on the second lens unit, it is possible to suppress an aberration that occurs in the first lens unit from being enlarged in the second lens unit. Therefore, correction of a spherical aberration and a chromatic aberration becomes easy in the overall optical system. As a result, it is possible to shorten the overall length of the zoom lens while correcting various aberrations favorably.

By making so as not to exceed an upper limit value of conditional expression (1), it is possible to suppress the increase in the load of zooming on the rearmost lens unit. Therefore, it is possible to suppress an increase in an amount of movement of the rearmost lens unit which is caused while zooming. As a result, it is possible to shorten the overall length of the zoom lens even at the telephoto end at which, the overall length is susceptible to become long.

Furthermore, since it is possible to suppress the increase in the amount of movement of the rearmost lens unit, it is possible to make small a change in a height of an axial light beam which is caused while zooming. Accordingly, it becomes possible to carry out zooming while suppressing a fluctuation in a longitudinal aberration. As a result, it is possible to shorten the overall length of the zoom lens while correcting various aberrations favorably.

It is more preferable that the following conditional expression (1') is satisfied instead of conditional expression (1).

$$0.25<(\beta_{lt}/\beta_{lw})/(f_t/f_w)<0.68 \qquad (1')$$

Furthermore, it is even more preferable that the following conditional expression (1") is satisfied instead of conditional expression (1).

$$0.3<(\beta_{lt}/\beta_{lw})/(f_t/f_w)<0.65 \qquad (1")$$

Moreover, in the zoom lens of the present embodiment, it is preferable that the zoom lens includes an aperture stop, and at the time of zooming from the wide angle end to the telephoto end, the aperture stop moves toward the object side, and the following conditional expression (2) is satisfied:

$$2.15<D_{aiw}/(\tan \omega_t \times f_t)<6.0 \qquad (2)$$

where, $D_{aiw}$ denotes a distance between the aperture stop and an image plane at the wide angle end, $\omega_t$ denotes a half angle of view at the telephoto end, and $f_t$ denotes the focal length of the overall zoom lens system at the telephoto end.

Conditional expression (2) is a conditional expression in which, a ratio of the distance between the aperture stop and the image plane at the wide angle end and a product of the half angle of view at the telephoto end and the focal length of the overall zoom lens at the telephoto end is taken.

By making so as not to fall below a lower limit value of conditional expression (2), it is possible to separate apart a position of the aperture stop adequately from the image plane. When such an arrangement is made, at the wide angle end, it is possible to dispose the first lens unit and the second lens unit near the aperture stop. Since a height of an off-axis light ray is low at the position of the aperture stop, the height of an off-axis light ray that passes through the first lens unit and the second lens unit also becomes low. Therefore, it is possible to make a lens diameter small in the first lens unit and the second lens unit. As a result, it is possible to make the optical system small-sized. Moreover, it is possible to correct favorably an off-axis aberration such as a distortion and an astigmatism at the wide angle end.

By making so as not to exceed an upper limit value of conditional expression (2), it is possible to prevent the position of the aperture stop from being separated excessively apart from the image plane (it is possible to bring the position of the aperture stop adequately closer to the image plane). Accordingly, it is possible to make small the distance between the image plane and the aperture stop mall at the wide angle end. As a result, it is possible to shorten the overall length of the zoom lens at the wide angle end.

Moreover, when the aperture stop moves toward the object side at the time of zooming from the wide angle end to the telephoto end, the aperture stop is positioned nearest to the object even at the telephoto end in all positions while moving. Therefore, the overall length of the zoom lens is susceptible to become long at the telephoto end. By making so as not to exceed the upper limit value of conditional expression (2), at the wide angle end, it is possible to move and keep the position of the aperture stop closer to the image plane. As a result, it is possible to secure adequately a space for movement of a lens unit which is disposed on the image side of the stop, and particularly, a space for the movement at the telephoto end. Moreover, by the space for the movement being secured adequately, it is possible to suppress an increase in a refractive power of a lens unit disposed on the image side of the stop. Accordingly, it is possible to shorten the overall length of the zoom lens even at the telephoto end at which the overall length is susceptible to become long. Moreover, it becomes easy to suppress fluctuation in the spherical aberration.

As aforementioned, by making so as not to exceed the upper limit value of conditional expression (2), it is possible to secure the space for the movement of the lens unit disposed on the image side of the stop. For instance, in a zoom lens in which, an aperture stop is disposed between a lens unit A and a lens unit B, it is possible to secure a space for the movement of the lens unit B and a lens unit which is disposed on an image side of the lens unit B. Moreover, in a zoom lens in which, an aperture stop is disposed in a lens unit C (at an interior of the lens unit C), it is possible to secure a space for the movement of the lens unit C and a lens unit which is disposed on the image side of the lens unit.

It is more preferable that the following conditional expression (2') is satisfied instead of conditional expression (2).

$$2.15<D_{aiw}/(\tan \omega_t \times f_t)<5.5 \qquad (2')$$

Furthermore, in the zoom lens of the present embodiment, it is even more preferable that the following conditional expression (2") is satisfied.

$$2.2<D_{aiw}/(\tan \omega_t \times f_t)<5.0 \qquad (2")$$

Moreover, in the zoom lens of the present embodiment, it is preferable that the zoom lens includes a third lens unit having a negative refractive power which is disposed between the second lens unit and the rearmost lens unit, and at the time of focusing from an infinite object point to an object point at a close distance, only the third lens unit moves, and the following conditional expression (3) is satisfied:

$$1.4 < |S_t| < 7 \quad (3)$$

where, $S_t$ is denoted by $S_t = (1-\beta_{3t} \times \beta_{3t}) \times \beta_{ct} \times \beta_{ct}$ where, $\beta_{3t}$ denotes a lateral magnification of the third lens unit at the telephoto end, $\beta_{ct}$ denotes a combined lateral magnification of all lens units positioned on the image side of the third lens unit at the telephoto end.

At the time of zooming from the wide angle end to the telephoto end, an amount of astigmatism occurred changes. The change in the amount of astigmatism occurred becomes a cause of degradation of imaging performance of the optical system. Therefore, the refractive power of the third lens unit is to be made negative and also a distance between the second lens unit and the third lens unit at the time of zooming is to be changed. By doing so, it is possible to carry out correction of astigmatism from the wide angle end up to the telephoto end. As a result, it is possible to improve imaging performance of the optical system (to realize an optical system in which, various aberrations are corrected favorably).

Conditional expression (3) is a conditional expression related to a focusing sensitivity at the telephoto end in a case of focusing by the third lens unit. The focusing sensitivity is an amount of movement of an image plane indicated paraxially with respect to an amount of movement of the third lens unit. In a case of focusing by the third lens unit, a combined lateral magnification of the lens units positioned on the image side of the third lens unit is included in the focusing sensitivity. There is a plurality of lens units on the image side of the third lens unit. The combined lateral magnification is a product of lateral magnification of the plurality of lens units.

By satisfying conditional expression (3), the astigmatism and the distortion are corrected favorably, and also it is possible to realize a zoom lens with a short overall length. Moreover, it is possible to secure favorably imaging performance when focused to an object point at a close distance (object point which is near). In other words, an image in which, various aberrations are corrected favorably is achieved.

By making so as not to fall below a lower limit value of conditional expression (3), it is possible to make the focusing sensitivity adequately high. Therefore, it is possible to suppress an increase in the amount of movement of the third lens unit at the time of focusing, and the fluctuation in the astigmatism and the distortion. Moreover, by the amount of movement of the third lens unit being suppressed, it is possible to make a space necessary for the movement of the third lens unit small. As a result, it is possible to shorten the overall length of the zoom lens.

By making so as not to exceed an upper limit value of conditional expression (3), it is possible to suppress the focusing sensitivity from becoming excessively high. Accordingly, it is possible to suppress an occurrence of the astigmatism in the third lens unit.

It is more preferable that the following conditional expression (3') is satisfied instead of conditional expression (3).

$$1.5 < |S_t| < 6 \quad (3')$$

Furthermore, it is even more preferable that the following conditional expression (3") is satisfied instead of conditional expression (3)

$$1.55 < |S_t| < 5 \quad (3'')$$

Moreover, with regard to the movement of the third lens unit at the time of focusing, movement toward the object side is preferable. As mentioned above, in the zoom lens of the present embodiment, the third lens unit has a negative refractive power. Here, when a lens unit having a negative refractive power is moved toward the object side at the time of focusing, an entrance pupil, when focused on an object point at a close distance, assumes a position moved farther on the object side of a position of the entrance pupil when focused on an infinite object point. When the position of the entrance pupil is moved toward the object side, it is possible to suppress an increase in a height of (to suppress from becoming high) an off-axis light ray passing through the first lens unit. Therefore, it is possible to suppress the fluctuation in the astigmatism in the first lens unit. As a result, an image in which various aberrations are corrected favorably is achieved even when focused on the object point at the close distance.

Moreover, in the zoom lens of the present embodiment, it is preferable that the following conditional expression (4) is satisfied:

$$-6.6 < f_l/f_w < -0.8 \quad (4)$$

where, $f_l$ denotes a focal length of the rearmost lens unit, and $f_w$ denotes the focal length of the overall zoom lens system at the wide angle end.

Conditional expression (4) is a conditional expression in which, a ratio of the focal length of the rearmost lens unit and the focal length of the overall zoom lens system at the wide angle end is taken.

By satisfying conditional expression (4), it is possible to correct the distortion and the astigmatism favorably. As a result, it is possible to realize an optical system having a favorable imaging performance.

It is more preferable that the following conditional expression (4') is satisfied instead of conditional expression (4).

$$-6.57 < f_l/f_w < -0.9 \quad (4')$$

Furthermore, it is even more preferable that the following conditional expression (4") is satisfied instead of conditional expression (4).

$$-6.57 < f_l/f_w < -1.1 \quad (4'')$$

Moreover, in the zoom lens of the present embodiment, it is preferable that the following conditional expression (5) is satisfied:

$$1.05 < EXP_w/(\tan \omega_t \times f_t) < 5.2 \quad (5)$$

where, $EXP_w$ denotes a distance between an image plane and an exit pupil at the wide angle end, $\omega_t$ denotes the half angle of view at the telephoto end, and $f_t$ denotes the focal length of the overall zoom lens system at the telephoto end.

Conditional expression (5) is a conditional expression in which, a ratio of the distance between an exit pupil and an image plane at the wide angle end and a product of the half angle of view at the telephoto end and the focal length of the overall zoom lens system at the telephoto end, is taken.

By making so as not to fall below a lower limit value of conditional expression (5), it is possible to separate apart a position of the exit pupil adequately from the image plane. Accordingly, it is possible to separate apart the position of the aperture stop adequately from the image plane. When such an arrangement is made, at the wide angle end, it is possible to dispose the first lens unit and the second lens unit near the aperture stop. Since the height of the off-axis light ray is low at the position of the aperture stop, the height of the off-axis light ray that passes through the first lens unit and the second lens unit also becomes low. Therefore, it is possible to make the lens diameter small in the first lens unit and the second lens unit. As a result, it is possible to make the optical system small-sized. Moreover, it is possible to correct favorably the off-axis aberration such as the distortion and the astigmatism at the wide angle end.

By making so as not to exceed an upper limit value of conditional expression (5), it is possible to prevent the position of the exit pupil from being separated excessively apart from the image plane (it is possible to bring the position of the exit pupil adequately closer to the image plane). When such an arrangement is made, it is possible to prevent the position of the aperture stop form being separated excessively apart from the image plane (it is possible to bring the position of the aperture stop adequately closer to the image plane). Accordingly, it is possible to make small the distance between the image plane and the aperture stop at the wide angle end. As a result, it is possible to shorten the overall length of the zoom lens at the wide angle end.

Moreover, when the aperture stop moves toward the object side at the time of zooming from the wide angle end to the telephoto end, the aperture stop is positioned nearest to the object even at the telephoto end in all positions while moving. Therefore, the overall length of the zoom lens is susceptible to become long at the telephoto end. By making so as not to exceed the upper limit value of conditional expression (5), at the wide angle end, it is possible to move and keep the position of the aperture stop closer to the image plane. As a result, it is possible to secure adequately a space for movement of a lens unit which disposed on the image side of the stop, and particularly, a space for the movement at the telephoto end. Moreover, by the space for the movement being secured adequately, it is possible to suppress an increase in a refractive power of a lens unit disposed on the image side of the stop. Accordingly, it is possible to shorten the overall length of the zoom lens even at the telephoto end at which the overall length is susceptible to become long. Moreover, it becomes easy to suppress fluctuation in the spherical aberration.

It is more preferable that the following conditional expression (5') is satisfied instead of conditional expression (5).

$$1.07 < EXP_w/(\tan \omega_r \times f_t) < 4.7 \quad (5')$$

Furthermore, it is even more preferable that the following conditional expression (5") is satisfied instead of conditional expression (5).

$$1.1 < EXP_w/(\tan \omega_r \times f_t) < 4.2 \quad (5")$$

Moreover, in the zoom lens of the present embodiment, it is preferable that the following conditional expression (6) is satisfied:

$$1.0 < \beta_{lw} < 1.5 \quad (6)$$

where, $\beta_{lw}$ denotes the lateral magnification of the rearmost lens unit at the wide angle end.

Conditional expression (6) is a conditional expression related to the lateral magnification of the rearmost lens unit at the wide angle end.

By satisfying conditional expression (6), it is possible to correct favorably off-axis aberrations such as the distortion, the astigmatism, and the chromatic aberration of magnification occurred in the first lens unit and the second lens unit. As a result, it is possible to realize an optical system with a favorable imaging performance.

It is more preferable to satisfy the following conditional expression (6') instead of conditional expression (6).

$$1.0 < \beta_{lw} < 1.4 \quad (6')$$

Furthermore, it is even more preferable to satisfy the following conditional expression (6") instead of conditional expression (6).

$$1.0 < \beta_{lw} < 1.33 \quad (6")$$

Moreover, in the zoom lens of the present embodiment, it is preferable that a lens positioned nearest to the image in the rearmost lens unit satisfies the following conditional expression (7).

$$-9 < (r_{lf} + r_{lb})/(r_{lf} - r_{lb}) < -0.1 \quad (7)$$

where, $r_{lf}$ denotes a radius of curvature of an object-side lens surface of a lens positioned nearest to the image in the rearmost lens unit, and $r_{lb}$ denotes a radius of curvature of an image-side lens surface of the lens positioned nearest to the image in the rearmost lens unit.

Conditional expression (7) is a conditional expression related to a shaping factor of the lens positioned nearest to the image in the rearmost lens unit. In a case in which, a lens surface is an aspheric surface, $r_{lf}$ and $r_{lb}$ are paraxial radius of curvature.

By satisfying conditional expression (7), it is possible to carry out favorably the correction of distortion at the wide angle end and the correction of spherical aberration at the telephoto end.

It is more preferable that the following conditional expression (7') is satisfied instead of conditional expression (7).

$$-7 < (r_{lf} + r_{lb})/(r_{lf} - r_{lb}) < -0.2 \quad (7')$$

Furthermore, it is even more preferable that the following conditional expression (7") is satisfied instead of conditional expression (7).

$$-6 < (r_{lf} + r_{lb})/(r_{lf} - r_{lb}) < -0.4 \quad (7")$$

Moreover, in the zoom lens of the present embodiment, it is preferable that a negative lens which is positioned nearest to the object in the third lens unit is a negative lens having a concave surface directed toward the object side, and the following conditional expression (8) is satisfied:

$$-5 < (r_{ff} + r_{fb})/(r_{ff} - r_{fb}) < -0.1 \quad (8)$$

where, $r_{ff}$ denotes a radius of curvature of an object-side lens surface of the negative lens having the concave surface directed toward the object side, and $r_{fb}$ denotes a radius of curvature of an image-side lens surface of the negative lens having the concave surface directed toward the object side.

In a case in which, the negative lens is moved for focusing, as compared to a case in which a positive lens is moved, it is possible to suppress an increase in the height of the off-axis light beam that passes through the first lens unit at the time of focusing. Therefore, it is preferable to move the negative lens positioned nearest to the object from among the negative lenses in the third lens unit. Accordingly, it is possible to suppress fluctuation in the astigmatism at the time of focusing. Moreover, by providing the concave surface to the negative lens, and by disposing the negative lens such that the concave surface is directed toward the object side, it is possible to suppress an occurrence of the spherical aberration at the telephoto end.

Conditional expression (8) is a conditional expression related to a shape factor of the negative lens which is positioned nearest to the object from among the lenses in the third lens unit. In a case in which, the lens surface is an aspheric surface, $r_{ff}$ and $r_{fb}$ are paraxial radius of curvature.

By satisfying conditional expression (8), it is possible to carry out favorably the correction of astigmatism at the wide angle end and the correction of spherical aberration at the telephoto end.

It is more preferable that the following conditional expression (8') is satisfied instead of conditional expression (8).

$$-4<(r_{ff}+r_{fb})/(r_{ff}-r_{fb})<-0.2 \tag{8'}$$

Furthermore, it is even more preferable that the following conditional expression (8") is satisfied instead of conditional expression (8).

$$-3<(r_{ff}+r_{fb})/(r_{ff}-r_{fb})<-0.3 \tag{8"}$$

Moreover, in the zoom lens of the present embodiment, it is preferable that the following conditional expression (9) is satisfied:

$$1.1<(\beta_{lt}/\beta_{lw})<2.8 \tag{9}$$

where, $\beta_{lt}$ denotes the lateral magnification of the rearmost lens unit at the telephoto end, and $\beta_{lw}$ denotes the lateral magnification of the rearmost lens unit at the wide angle end.

Conditional expression (9) is a conditional expression related to a zooming ratio of the rearmost lens unit.

By satisfying conditional expression (9), it is possible to suppress fluctuation in the astigmatism and a chromatic aberration of magnification which is caused while zooming. As a result, it is possible to realize an optical system having a favorable imaging performance.

It is more preferable that the following conditional expression (9') is satisfied instead of conditional expression (9).

$$1.15<(\beta_{lt}/\beta_{lw})<2.4 \tag{9'}$$

Furthermore, it is even more preferable that the following conditional expression (9") is satisfied instead of conditional expression (9).

$$1.17<(\beta_{lt}/\beta_{lw})<2 \tag{9"}$$

Moreover, in the zoom lens of the present embodiment, it is preferable that the lens which is disposed nearest to an image in the rearmost lens unit has a negative refractive power.

By making such arrangement, it is possible to dispose the exit pupil farther on the image side. As a result, it is possible to position the aperture stop farther on the image side. Furthermore, in the rearmost lens unit, a height of a light ray becomes low. Therefore, by letting the refractive power of the lens nearest to the image to be negative, it is possible to make Petzval's sum small. As a result, it is possible to carry out the correction of the astigmatism favorably.

Moreover, in the zoom lens of the present embodiment, it is preferable that at the time of zooming from the wide angle end to the telephoto end, the rearmost lens unit moves toward the object side.

By making such arrangement, a height of an off-axis light ray is suppressed to be low. As a result, it is possible to suppress a lens diameter of the rearmost lens unit at the telephoto end to be small. Moreover, it is possible to suppress an occurrence of the off-axis aberration.

Moreover, in the zoom lens of the present embodiment, it is preferable that the zoom lens includes the aperture stop, and the aperture stop is disposed between two lenses, and one of the two lenses is positioned nearest to an image in the second lens unit, and the other lens of the two lenses is positioned nearest to an object in the rearmost lens unit.

By making such arrangement, it is possible to suppress the height of the off-axis light ray at the rearmost lens unit to be low. Therefore, it is possible to suppress an occurrence of the astigmatism and the chromatic aberration of magnification. Furthermore, by the second lens unit having a negative refractive power and the rearmost lens unit having a negative refractive power being disposed to be sandwiching the stop, it is possible to carry out favorably the correction of the distortion and the chromatic aberration of magnification.

Moreover, in the zoom lens of the present embodiment, it is preferable that the zoom lens includes the aperture stop, and the total number of lens units in the zoom lens is five, and the plurality of lens units includes in order from the object side between the second lens unit and the rearmost lens unit, a third lens unit having a negative refractive power, and a fourth lens unit having a positive refractive power, and the rearmost lens unit is a fifth lens unit, and the aperture stop is disposed between a lens positioned nearest to an image in the third lens unit and the image plane, and at the time of zooming from the wide angle end to the telephoto end, the aperture stop moves toward the object side and the fifth lens unit moves toward the object side.

The zoom lens includes five lens units, and an arrangement of refractive power is let to be in order of a positive refractive power, a negative refractive power, a negative refractive power, a positive refractive power, and a negative refractive power from the object side. Moreover, by making such arrangement and by positioning the aperture stop between the lens positioned nearest to the image in the third lens unit and the image plane, it is possible to suppress the height of an off-axis light ray to be low in the fifth lens unit. As a result, it is possible to suppress an occurrence of the astigmatism and the chromatic aberration of magnification.

Furthermore, by the second lens unit having a negative refractive power and the fifth lens unit having a negative refractive power being disposed to be sandwiching the stop, it is possible to carry out favorably the correction of the distortion and the chromatic aberration of magnification.

Moreover, at the time of zooming from the wide angle end to the telephoto end, an amount of the astigmatism that occurs changes. The change in the amount of astigmatism causes degradation of the imaging performance of the optical system. Therefore, the refractive power of the third lens unit is to be let to be negative and the distance between the second lens unit and the third lens unit is to be changed. By making such arrangement, it is possible to carry out favorably the correction of the astigmatism from the wide angle end to the telephoto end. As a result, it is possible to improve the imaging performance of the optical system.

Furthermore, since the fifth lens unit has a negative refractive power, it is possible to position the principal points farther toward on the object side. As a result, it is possible to make the optical system small-sized.

Moreover, by moving the fifth lens unit toward the object side at the time of zooming from the wide angle end to the telephoto end, it is possible to impart the zooming effect to the fifth lens unit. Therefore, as compared to a case in which, the fifth lens unit does not have the zooming effect, it is possible to reduce the load of zooming on the second lens unit. When it is possible to reduce the load of zooming on the second lens unit, at the telephoto end, it is possible to suppress the distance between the first lens unit and the second lens unit from being widened. As a result, even at the telephoto end at which, the overall length is susceptible to become long, it is possible to shorten the overall length of the zoom lens.

Moreover, by being able to reduce the load of zooming on the second lens unit, it is possible to suppress an aberration that occurs in the first lens unit from being enlarged in the second lens unit. Therefore, correction of the spherical aberration and the chromatic aberration becomes easy in the overall optical system. As a result, it is possible to shorten the overall length of the zoom lens while correcting various aberrations favorably.

Furthermore, the height of the off-axis light ray is suppressed to be low. As a result, it is possible to suppress the lens diameter of the rearmost lens unit at the telephoto end to be small. Moreover, it is possible to suppress an occurrence of the off-axis aberration.

It is preferable that the first lens unit includes a positive lens. Also, it is preferable that in the positive lens, an object-side surface is a convex surface directed toward the object side. Moreover, the first lens unit may include a negative lens. It is preferable that the negative lens is disposed on the object side of the positive lens. It is preferable that the negative lens has an object-side surface which is convex toward the object side, or has an image-side surface which is convex toward the object side.

Moreover, it is preferable that the positive lens and the negative lens are cemented. In this case, it is preferable that a cemented surface is a surface that is convex toward the object side.

It is preferable that the second lens unit includes a negative lens and a positive lens. Moreover, it is preferable that the negative lens is disposed farther on the object side of the positive lens. It is preferable that in the negative lens, an object-side surface is a surface that is concave toward the object side, or, an image-side surface is a surface that is concave toward the image side. Moreover, in the positive lens, it is preferable that an object-side surface is a surface that is convex toward the object side, or, an image-side surface is surface that is convex toward the image side.

The second lens unit may further include another negative lens. In this negative lens, it is preferable that an object-side surface is a surface that is concave toward the object side, or, an image-side surface is a surface that is concave toward the image side. Moreover, it is preferable that this negative lens and a positive lens are cemented. It is preferable that the cemented lens is disposed farther on the image side than the negative lens. It is preferable that a cemented surface of the cemented lens is a surface that is convex toward the object side, or, is a surface that is convex toward the image side.

Moreover, it is preferable that the fourth lens unit includes a positive lens and a negative lens. Also, it is preferable that the positive lens is disposed farther on the object side of the negative lens. Moreover, in the positive lens, it is preferable that an image-side surface is a surface that is convex toward the image side. In the negative lens, it is preferable that an object-side surface is a surface that is concave toward the object side, or, an image-side surface is a surface that is concave toward the image side.

The fourth lens unit may further include another positive lens. In this positive lens, it is preferable that an object-side surface is a surface that is convex toward the object side. Moreover, it is preferable that this positive lens and a negative lens are cemented. It is preferable that the cemented lens is disposed farther on the image side than the positive lens. It is preferable that a cemented surface of the cemented lens is a surface that is convex toward the object side, or is a surface that is convex toward the image side.

The fourth lens unit may further include another cemented lens. It is preferable that this cemented lens includes a negative lens and a positive lens. In the negative lens, it is preferable that an image-side surface is a surface that is concave toward the image side. Moreover, in the positive lens an object-side surface is a surface that is convex toward the object side, or an image-side surface is a surface that is convex toward the image side. It is preferable that a cemented surface of the cemented lens is a surface that is convex toward the object side, or is a surface that is convex toward the image side.

It is preferable that the fifth lens unit includes a positive lens and a negative lens. Moreover, it is preferable that the positive lens is disposed on the object side of the negative lens. In the positive lens, it is preferable that an object-side surface is a surface that is convex toward the image side, or an image-side surface is a surface that is convex toward the image side. Moreover, in the negative lens, it is preferable that an object-side surface is a surface that is concave toward the object side.

Moreover, an image pickup apparatus of the present invention includes one of the aforementioned zoom lenses, and an image pickup element which has an image pickup surface.

By making such arrangement, it is possible to provide an image pickup apparatus which includes a zoom lens in which, various aberrations from a center up to a peripheral area are corrected, and in which, the overall length of the optical system is short.

Regarding each conditional expression, it is preferable to make that function more assured by restricting one of or both of the lower limit value and the upper limit value. Moreover, regarding each conditional expression, only an upper limit value or a lower limit value of a numerical range of a further restricted conditional expression may be restricted. For restricting the numerical range of a conditional expression, the upper limit value or the lower limit value of each conditional expression may be let to be the upper limit value or the lower limit value of the other conditional expression.

Examples of zoom lenses according to certain aspects of the present invention will be described below in detail by referring to the accompanying diagrams. However, the present invention is not restricted to the examples described below. Moreover, as to whether the refractive power is a positive refractive power or a negative refractive power is based on a paraxial radius of curvature.

A zoom lens according to an example 1 will be described below. FIG. 1A, FIG. 1B, and FIG. 1C are cross-sectional views (lens cross-sectional views) along an optical axis showing an optical arrangement of the zoom lens according to the example 1 at the time of focusing on the infinite object point, where, FIG. 1A is a cross-sectional view at a wide angle end, FIG. 1B is a cross-sectional view in an intermediate focal length state, and FIG. 1C is a cross-sectional view at a telephoto end. In all the examples that follow, in cross-sectional views, C denotes a cover glass, and I denotes an image pickup surface of an image pickup element.

Diagrams from FIG. 2A to FIG. 2L are aberration diagrams of the zoom lens according to the example 1 at the time of focusing on the infinite object point. Here, co denotes a half angle of view. Reference numerals in the aberration diagrams are common for all the examples that will be described later.

Moreover, in these aberration diagrams, FIG. 2A, FIG. 4A, FIG. 6A, FIG. 8A, FIG. 10A, FIG. 12A, FIG. 14A, FIG. 16A, FIG. 18A, FIG. 20A, FIG. 22A, FIG. 24A, FIG. 26A, FIG. 28A, FIG. 30A, FIG. 32A, and FIG. 34A show a spherical aberration (SA) at the wide angle end, FIG. 2B, FIG. 4B, FIG. 6B, FIG. 8B, FIG. 10B, FIG. 12B, FIG. 14B, FIG. 16B, FIG. 18B, FIG. 20B, FIG. 22B, FIG. 24B, FIG. 26B, FIG. 28B, FIG. 30B, FIG. 32B, and FIG. 34B show an astigmatism (AS) at the wide angle end, FIG. 2C, FIG. 4C, FIG. 6C, FIG. 8C, FIG. 10C, FIG. 12C, FIG. 14C, FIG. 16C, FIG. 18C, FIG. 20C, FIG. 22C, FIG. 24C, FIG. 26C, FIG. 28C, FIG. 30C, FIG. 32C, and FIG. 34C show a distortion (DT) at the wide angle end, and FIG. 2D, FIG. 4D, FIG. 6D, FIG. 8D, FIG. 10D, FIG. 12D, FIG. 14D, FIG. 16D, FIG. 18D, FIG. 20D, FIG. 22D, FIG. 24D, FIG. 26D, FIG. 28D, FIG. 30D, FIG. 32D, and FIG. 34D show a chromatic aberration of magnification (CC) at the wide angle end.

Moreover, FIG. 2E, FIG. 4E, FIG. 6E, FIG. 8E, FIG. 10E, FIG. 12E, FIG. 14E, FIG. 16E, FIG. 18E, FIG. 20E, FIG. 22E, FIG. 24E, FIG. 26E, FIG. 28E, FIG. 30E, FIG. 32E, and FIG. 34E show a spherical aberration (SA) in the intermediate focal length state, FIG. 2F, FIG. 4F, FIG. 6F, FIG. 8F, FIG. 10F, FIG. 12F, FIG. 14F, FIG. 16F, FIG. 18F, FIG. 20F, FIG. 22F, FIG. 24F, FIG. 26F, FIG. 28F, FIG. 30F, FIG. 32F, and FIG. 34F show an astigmatism (AS) in the intermediate focal length state, FIG. 2G, FIG. 4G, FIG. 6G, FIG. 8G, FIG. 10G, FIG. 12G, FIG. 14G, FIG. 16G, FIG. 18G, FIG. 20G, FIG. 22G, FIG. 24G, FIG. 26G, FIG. 28G, FIG. 30G, FIG. 32G, and FIG. 34G show a distortion (DT) in the intermediate focal length state, and FIG. 2H, FIG. 4H, FIG. 6H, FIG. 8H, FIG. 10H, FIG. 12H, FIG. 14H, FIG. 16H, FIG. 18H, FIG. 20H, FIG. 22H, FIG. 24H, FIG. 26H, FIG. 28H, FIG. 30H, FIG. 32H, and FIG. 34H show a chromatic aberration of magnification (CC) in the intermediate focal length state.

Moreover, FIG. 2I, FIG. 4I, FIG. 6I, FIG. 8I, FIG. 10I, FIG. 12I, FIG. 14I, FIG. 16I, FIG. 18I, FIG. 20I, FIG. 22I, FIG. 24I, FIG. 26I, FIG. 28I, FIG. 30I, FIG. 32I, and FIG. 34I show a spherical aberration (AS) at the telephoto end, FIG. 2J, FIG. 4J, FIG. 6J, FIG. 8J, FIG. 10J, FIG. 12J, FIG. 14J, FIG. 16J, FIG. 18J, FIG. 20J, FIG. 22J, FIG. 24J, FIG. 26J, FIG. 28J, FIG. 30J, FIG. 32J, and FIG. 34J show an astigmatism (AS) at the telephoto end, FIG. 2K, FIG. 4K, FIG. 6K, FIG. 8K, FIG. 10K, FIG. 12K, FIG. 14K, FIG. 16K, FIG. 18K, FIG. 20K, FIG. 22K, FIG. 24K, FIG. 26K, FIG. 28K, FIG. 30K, FIG. 32K, and FIG. 34K show a distortion (DT) at the telephoto end, and FIG. 2L, FIG. 4L, FIG. 6L, FIG. 8L, FIG. 10L, FIG. 12L, FIG. 14L, FIG. 16L, FIG. 18L, FIG. 20L, FIG. 22L, FIG. 24L, FIG. 26L, FIG. 28L, FIG. 30L, FIG. 32L, and FIG. 34L show a chromatic aberration of magnification (CC) at the telephoto end.

The zoom lens of the example 1, as shown in FIG. 1A, FIG. 1B, and FIG. 1C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, and a biconvex positive lens L5. Here, the biconcave negative lens L4 and the biconvex positive lens L5 are cemented.

The third lens unit G3 includes a negative meniscus lens L6 having a convex surface directed toward an image side.

The fourth lens unit G4 includes a biconvex positive lens L7, a biconvex positive lens L8, a biconcave negative lens L9, and a biconvex positive lens L10. Here, the biconvex positive lens L8 and the biconcave negative lens L9 are cemented.

The fifth lens unit G5 includes a positive meniscus lens L11 having a convex surface directed toward the image side, a biconcave negative lens L12, and a negative meniscus lens L13 having a convex surface directed toward the image side.

Moreover, an aperture stop S is disposed between the biconvex positive lens L5 and the positive meniscus lens L11. The biconvex positive lens L5 is positioned nearest to an image in the second lens unit G2, and the positive meniscus lens L11 is positioned nearest to an object in the fifth lens unit G5. More specifically, the aperture stop S is disposed between the negative meniscus lens L6 and the biconvex positive lens L7.

At the time of zooming from a wide angle end to a telephoto end, distances between the lens units change. A distance between the first lens unit G1 and the second lens unit G2 widens. A distance between the second lens unit G2 and the third lens unit G3 widens and then narrows. A distance between the third lens unit G3 and the fourth lens unit G4 narrows. A distance between the fourth lens unit G4 and the fifth lens unit G5 narrows.

Each of the first lens unit G1, the second lens unit G2, the third lens unit G3, the fourth lens unit G4, and the fifth lens unit G5 moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of nine surfaces namely, both surfaces of the negative meniscus lens L3, an object-side surface of the negative meniscus lens L6, both surfaces of the biconvex positive lens L7, both surfaces of the biconvex positive lens L10, an object-side surface of the biconcave negative lens L12, and an image-side surface of the negative meniscus lens L13.

Figure 3B:
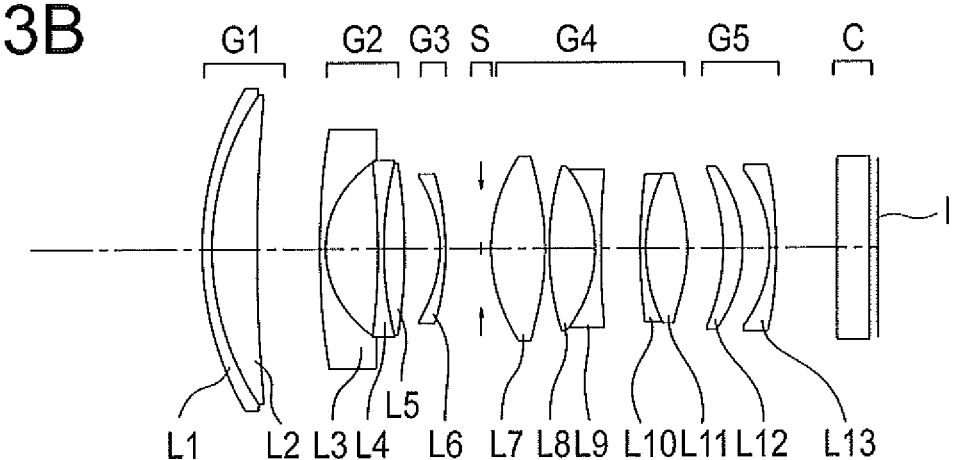
Figure 3C:
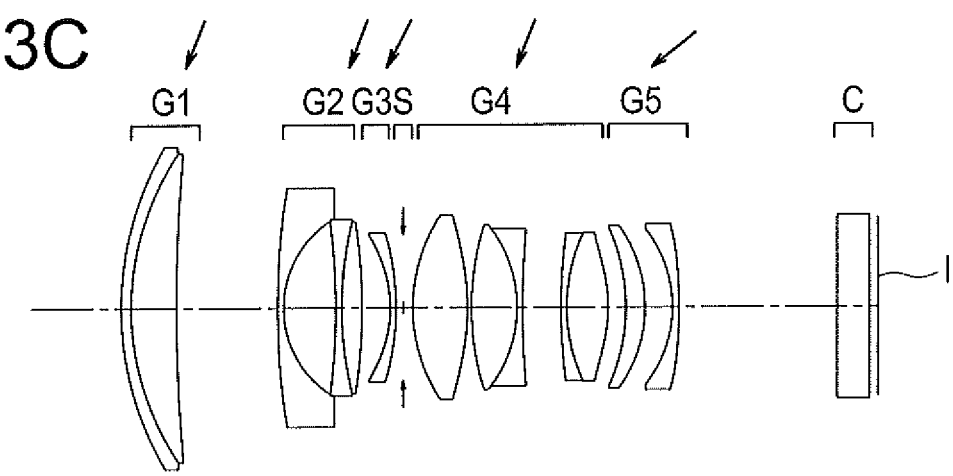

Next, a zoom lens according to an example 2 will be described below. FIG. 3A, FIG. 3B, and FIG. 3C are cross-sectional views along an optical axis showing an optical arrangement of the zoom lens according to the example 2 at the time of focusing on the infinite object point. FIG. 4A to FIG. 4L are aberration diagrams of the zoom lens according to the example 2 at the time of focusing on the infinite object point.

The zoom lens of the example 2, as shown in FIG. 3A, FIG. 3B, and FIG. 3C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, and a biconvex positive lens L5. Here, the biconcave negative lens L4 and the biconvex positive lens L5 are cemented.

The third lens unit G3 includes a negative meniscus lens L6 having a convex surface directed toward an image side.

The fourth lens unit G4 includes a biconvex positive lens L7, a biconvex positive lens L8, a biconcave negative lens L9, a negative meniscus lens L10 having a convex surface directed toward the object side, and a biconvex positive lens L11. Here, the biconvex positive lens L8 and the biconcave negative lens L9 are cemented. Moreover, the negative meniscus lens L10 and the biconvex positive lens L11 are cemented.

The fifth lens unit G5 includes a positive meniscus lens L12 having a convex surface directed toward the image side and a negative meniscus lens L13 having a convex surface directed toward the image side.

Moreover, an aperture stop S is disposed between the biconvex positive lens L5 and the positive meniscus lens L12. The biconvex positive lens L5 is positioned nearest to an image in the second lens unit G2, and the positive meniscus lens L12 is positioned nearest to an object in the fifth lens unit G5. More specifically, the aperture stop S is disposed between the negative meniscus lens L6 and the biconvex positive lens L7.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the third lens unit G3, the fourth lens unit G4, and the fifth lens unit G5 moves toward the object side. The second lens unit G2, after moving toward the image side, moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of seven surfaces namely, both surfaces of the negative meniscus lens L3, an object-side surface of the negative meniscus lens L6, both surfaces of the biconvex positive lens L7, an image-side surface of the biconvex positive lens L11, and an image-side surface of the negative meniscus lens L13.

Figure 5A:
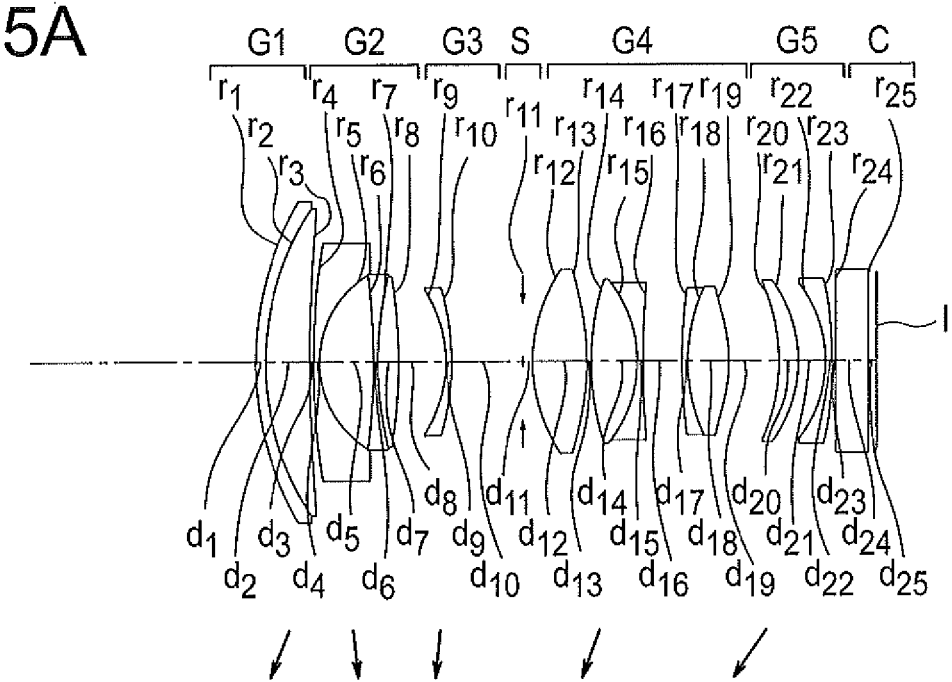
FIG. 5A, FIG. 5B, and FIG. 5C are cross-sectional views along an optical axis showing an optical arrangement of a zoom lens according to an example 3 at the time of focusing on the infinite object point, where.
Figure 5B:
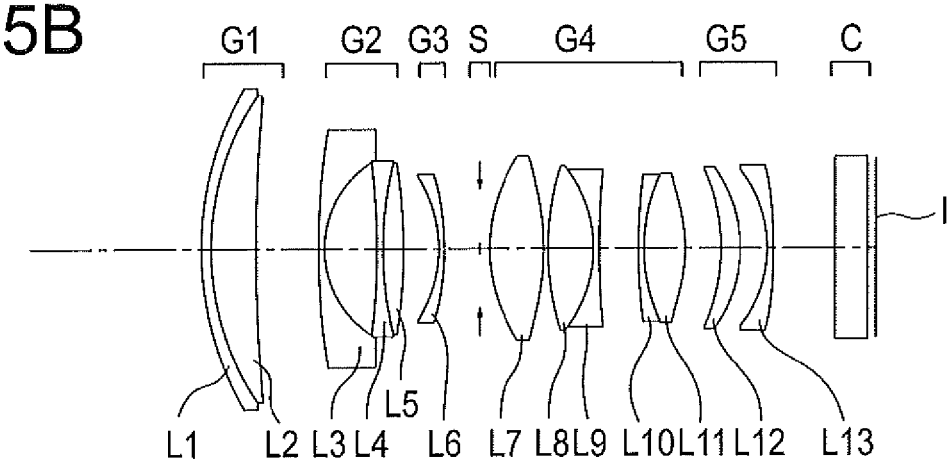
Figure 5C:
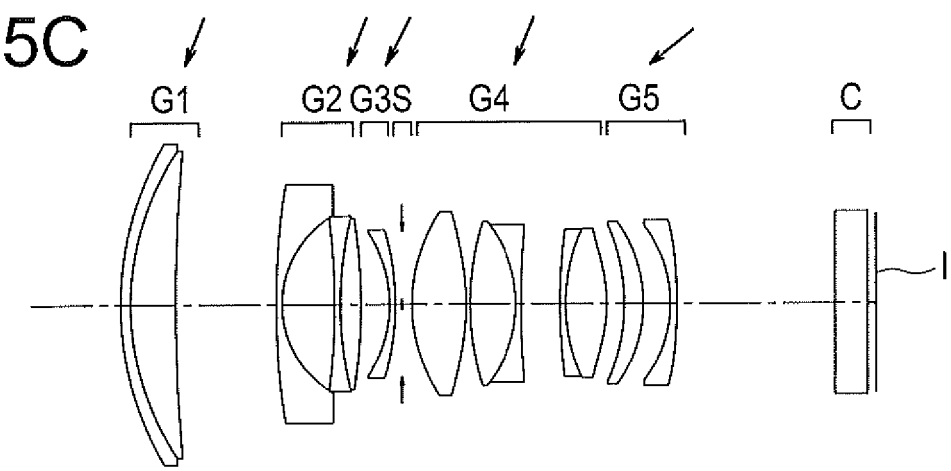

Next, a zoom lens according to an example 3 will be described below. FIG. 5A, FIG. 5B, and FIG. 5C are cross-sectional views along an optical axis showing an optical arrangement of the zoom lens according to the example 3 at the time of focusing on the infinite object point. FIG. 6A to FIG. 6L are aberration diagrams of the zoom lens according to the example 3 at the time of focusing on the infinite object point.

The zoom lens of the example 3, as shown in FIG. 5A, FIG. 5B, and FIG. 5C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a biconcave negative lens L3, a biconcave negative lens L4, and a biconvex positive lens L5. Here, the biconcave negative lens L4 and the biconvex positive lens L5 are cemented.

The third lens unit G3 includes a negative meniscus lens L6 having a convex surface directed toward an image side.

The fourth lens unit G4 includes a biconvex positive lens L7, a biconvex positive lens L8, a biconcave negative lens L9, a negative meniscus lens L10 having a convex surface directed toward the object side, and a biconvex positive lens L11. Here, the biconvex positive lens L8 and the biconcave negative lens L9 are cemented. Moreover, the negative meniscus lens L10 and the biconvex positive lens L11 are cemented.

The fifth lens unit G5 includes a positive meniscus lens L12 having a convex surface directed toward the image side, a positive meniscus lens L13 having a convex surface directed toward the image side, and a negative meniscus lens L14 having a convex surface directed toward the image side.

Moreover, an aperture stop S is disposed between the biconvex positive lens L5 and the positive meniscus lens L12. The biconvex positive lens L5 is positioned nearest to an image in the second lens unit G2, and the positive meniscus lens L12 is positioned nearest to an object in the fifth lens unit G5. More specifically, the aperture stop S is disposed between the biconvex positive lens L7 and the biconvex positive lens L8 (in the fourth lens unit G4).

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the third lens unit G3, the fourth lens unit G4, and the fifth lens unit G5 moves toward the object side. The second lens unit G2, after moving toward the image side, moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of seven surfaces namely, both surfaces of the biconcave negative lens L3, an object-side surface of the negative meniscus lens L6, both surfaces of the biconvex positive lens L7, an image-side surface of the biconvex positive lens L11, and an image-side surface of the negative meniscus lens L14.

Figure 7A:
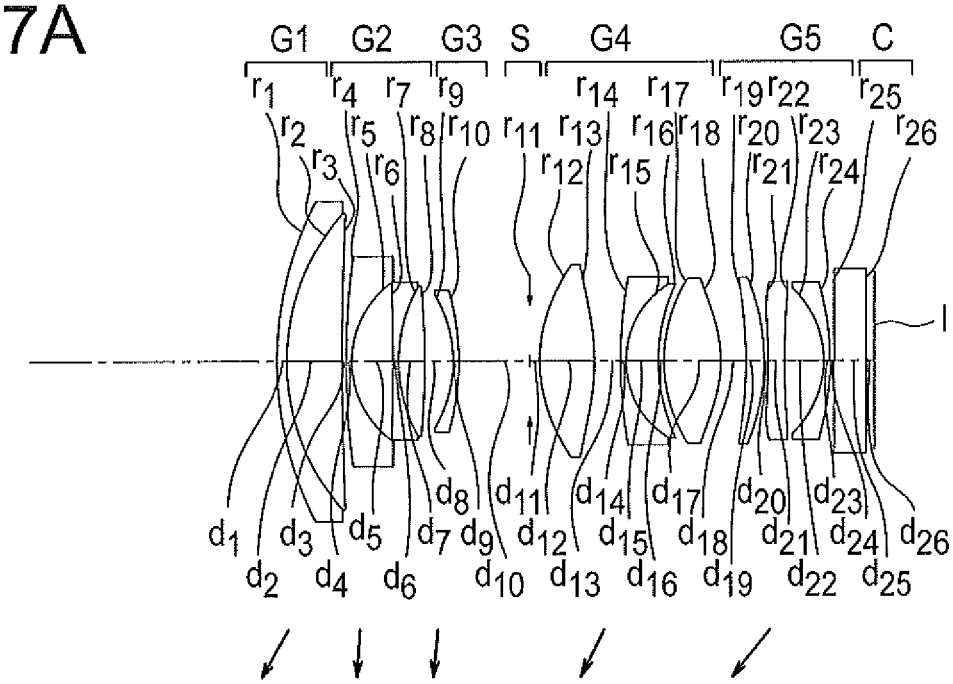
FIG. 7A, FIG. 7B, and FIG. 7C are cross-sectional views along an optical axis showing an optical arrangement of a zoom lens according to an example 4 at the time of focusing on the infinite object point, where.
Figure 7B:
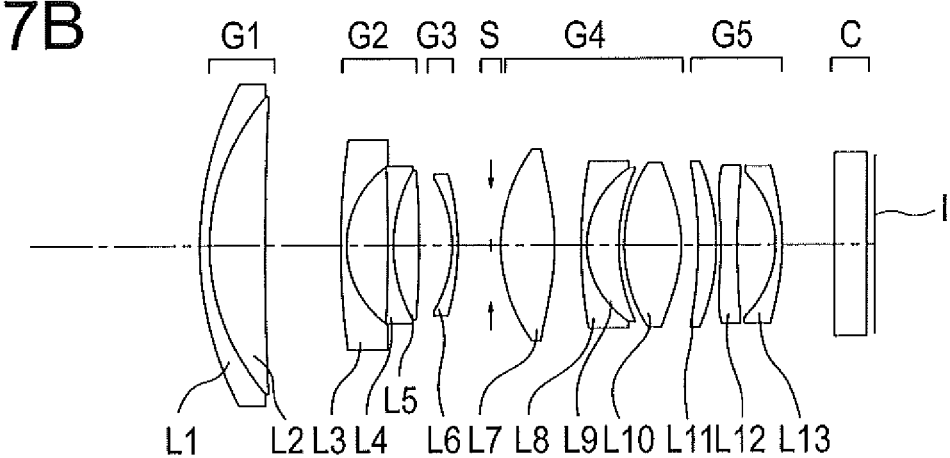
Figure 7C:
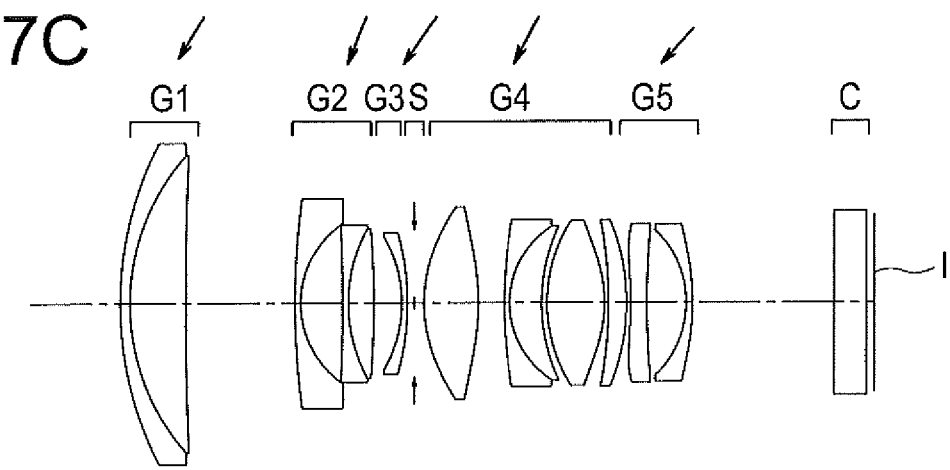

Next, a zoom lens according to an example 4 will be described below. FIG. 7A, FIG. 7B, and FIG. 7C are cross-sectional views along an optical axis showing an optical arrangement of the zoom lens according to the example 4 at the time of focusing on the infinite object point.

FIG. 8A to FIG. 8L are aberration diagrams of the zoom lens according to the example 4 at the time of focusing on the infinite object point.

The zoom lens of the example 4, as shown in FIG. 7A, FIG. 7B, and FIG. 7C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, and a biconvex positive lens L5. Here, the biconcave negative lens L4 and the biconvex positive lens L5 are cemented.

The third lens unit G3 includes a negative meniscus lens L6 having a convex surface directed toward an image side.

The fourth lens unit G4 includes a biconvex positive lens L7, a negative meniscus lens L8 having a convex surface directed toward the object side, a positive meniscus lens L9 having a convex surface directed toward the object side, and a biconvex positive lens L10. Here, the negative meniscus lens L8 and the positive meniscus lens L9 are cemented.

The fifth lens unit G5 includes a positive meniscus lens L11 having a convex surface directed toward the image side, a biconcave negative lens L12, and a negative meniscus lens L13 having a convex surface directed toward the image side.

Moreover, an aperture stop S is disposed between the biconvex positive lens L5 and the positive meniscus lens L11. The biconvex positive lens L5 is positioned nearest to an image in the second lens unit G2, and the positive meniscus lens L11 is positioned nearest to an object in the fifth lens unit G5. More specifically, the aperture stop S is disposed between the negative meniscus lens L6 and the biconvex positive lens L7.

At the time of zooming from a wide angle end to a telephoto end, distances between the lens units change. A distance between the first lens unit G1 and the second lens unit G2 widens. A distance between the second lens unit G2 and the third lens unit G3 widens and then narrows. A distance between the third lens unit G3 and the fourth lens unit G4 narrows. A distance between the fourth lens unit G4 and the fifth lens unit G5 narrows.

Each of the first lens unit G1, the second lens unit G2, the third lens unit G3, the fourth lens unit G4, and the fifth lens unit G5 moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of nine surfaces namely, both surfaces of the negative meniscus lens L3, an object-side surface of the negative meniscus lens L6, both surfaces of the biconvex positive lens L7, both surfaces of the biconvex positive lens L10, an object-side surface of the biconcave negative lens L12, and an image-side surface of the negative meniscus lens L13.

Next, a zoom lens according to an example 5 will be described below. FIG. 9A, FIG. 9B, and FIG. 9C are cross-sectional views along an optical axis showing an optical arrangement of the zoom lens according to the example 5 at the time of focusing on the infinite object point. FIG. 10A to FIG. 10L are aberration diagrams of the zoom lens according to the example 5 at the time of focusing on the infinite object point.

The zoom lens of the example 5, as shown in FIG. 9A, FIG. 9B, and FIG. 9C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a negative meniscus lens L4 having a convex surface directed toward the object side, and a biconvex positive lens L5.

The third lens unit G3 includes a negative meniscus lens L6 having a convex surface directed toward an image side.

The fourth lens unit G4 includes a biconvex positive lens L7, a biconvex positive lens L8, a negative meniscus lens L9 having a convex surface directed toward the image side, a biconcave negative lens L10, and a biconvex positive lens L11. Here, the biconvex positive lens L8 and the negative meniscus lens L9 are cemented. Moreover, the biconcave negative lens L10 and the biconvex positive lens L11 are cemented.

The fifth lens unit G5 includes a positive meniscus lens L12 having a convex surface directed toward the image side and a negative meniscus lens L13 having a convex surface directed toward the image side.

Moreover, an aperture stop S is disposed between the biconvex positive lens L5 and the positive meniscus lens L12. The biconvex positive lens L5 is positioned nearest to an image in the second lens unit G2, and the positive meniscus lens L12 is positioned nearest to an object in the fifth lens unit G5. More specifically, the aperture stop S is disposed between the negative meniscus lens L6 and the biconvex positive lens L7.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the third lens unit G3, the fourth lens unit G4, and the fifth lens unit G5 moves toward the object side. The second lens unit G2, after moving toward the image side, moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of seven surfaces namely, both surfaces of the negative meniscus lens L4, an object-side surface of the negative meniscus lens L6, both surfaces of the biconvex positive lens L7, an image-side surface of the biconvex positive lens L11, and an image-side surface of the negative meniscus lens L13.

Figure 11A:
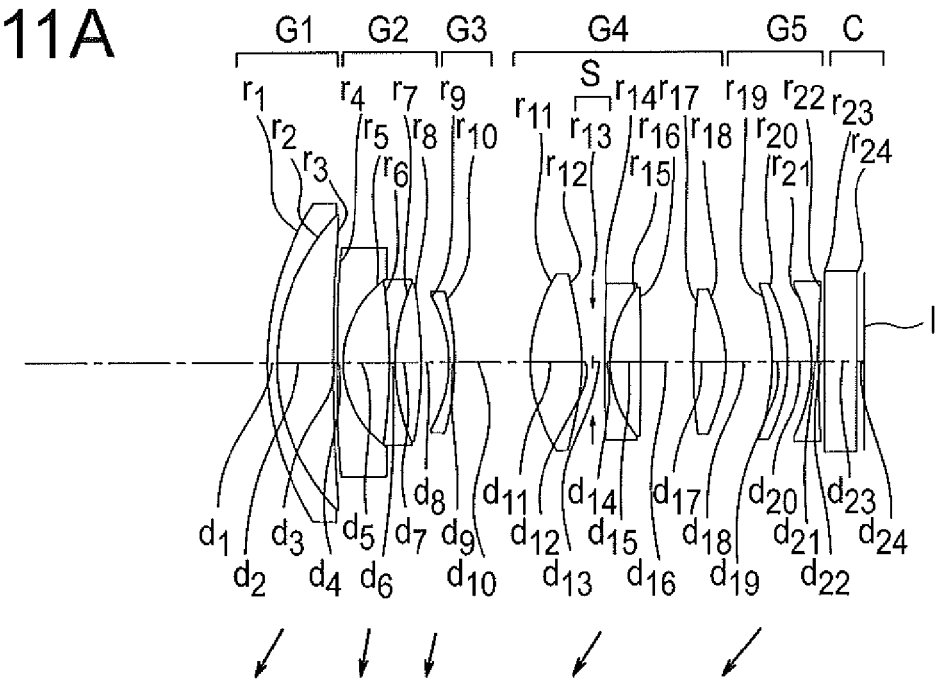
FIG. 11A, FIG. 11B, and FIG. 11C are cross-sectional views along an optical axis showing an optical arrangement of a zoom lens according to an example 6 at the time of focusing on the infinite object point, where.
Figure 11B:
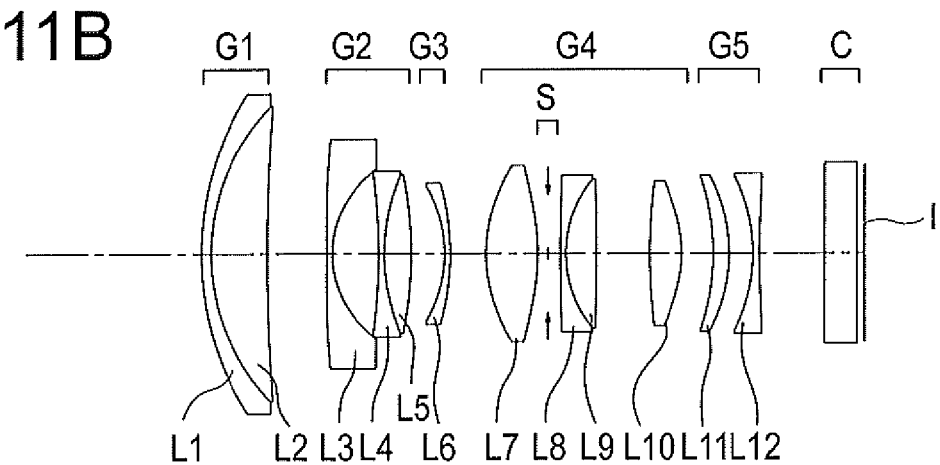
Figure 11C:
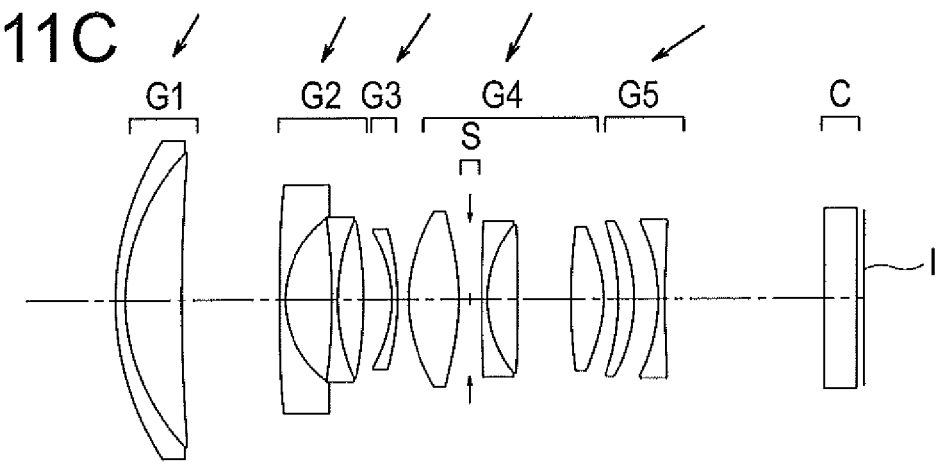

Next, a zoom lens according to an example 6 will be described below. FIG. 11A, FIG. 11B, and FIG. 11C are cross-sectional views along an optical axis showing an optical arrangement of the zoom lens according to the example 6 at the time of focusing on the infinite object point. FIG. 12A to FIG. 12L are aberration diagrams of the zoom lens according to the example 6 at the time of focusing on the infinite object point.

The zoom lens of the example 6, as shown in FIG. 11A, FIG. 11B, and FIG. 11C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, and a biconvex positive lens L5. Here, the biconcave negative lens L4 and the biconvex positive lens L5 are cemented.

The third lens unit G3 includes a negative meniscus lens L6 having a convex surface directed toward an image side.

The fourth lens unit G4 includes a biconvex positive lens L7, a negative meniscus lens L8 having a convex surface directed toward the image side, a biconvex positive lens L9, and a biconvex positive lens L10. Here, the negative meniscus lens L8 and the biconvex positive lens L9 are cemented.

The fifth lens unit G5 includes a positive meniscus lens L11 having a convex surface directed toward the image side and a biconcave negative lens L12.

Moreover, an aperture stop S is disposed between the biconvex positive lens L5 and the positive meniscus lens L11. The biconvex positive lens L5 is positioned nearest to an image in the second lens unit G2, and the positive meniscus lens L11 is positioned nearest to an object in the fifth lens unit G5. More specifically, the aperture stop S is disposed between the biconvex positive lens L7 and the negative meniscus lens L8 (in the fourth lens unit G4).

At the time of zooming from a wide angle end to a telephoto end, distances between the lens units change. A distance between the first lens unit G1 and the second lens unit G2 widens. A distance between the second lens unit G2 and the third lens unit G3 widens and then narrows. A distance between the third lens unit G3 and the fourth lens unit G4 narrows. A distance between the fourth lens unit G4 and the fifth lens unit G5 narrows.

Each of the first lens unit G1, the second lens unit G2, the third lens unit G3, the fourth lens unit G4, and the fifth lens unit G5 moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of seven surfaces namely, both surfaces of the negative meniscus lens L3, an object-side surface of the negative meniscus lens L6, both surfaces of the biconvex positive lens L7, an image-side surface of the biconvex positive lens L11, and an image-side surface of the biconcave negative lens L13.

Figure 13A:
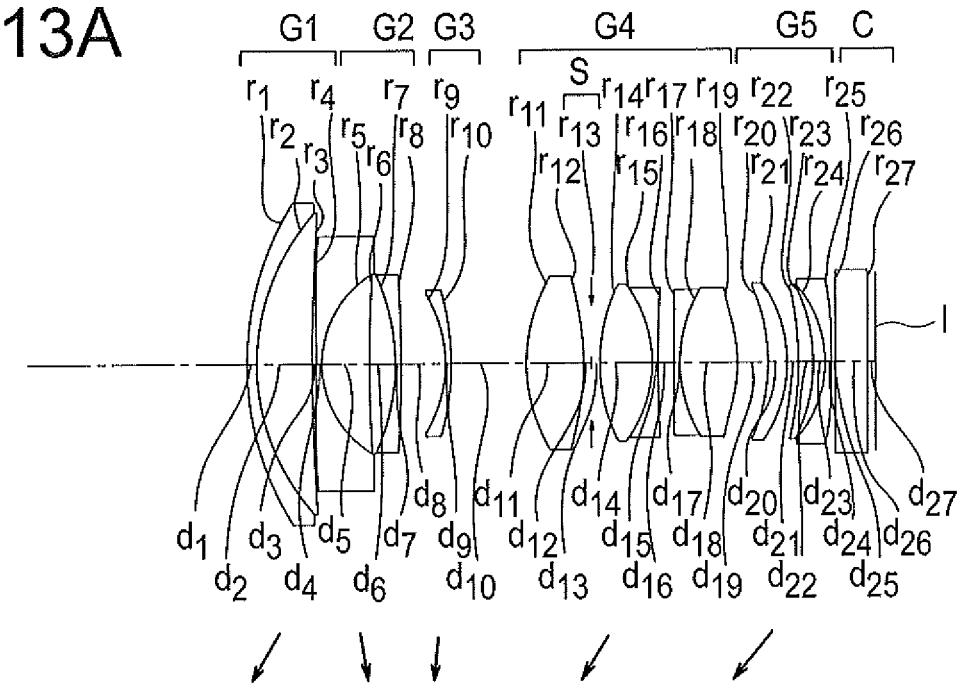
FIG. 13A, FIG. 13B, and FIG. 13C are cross-sectional views along an optical axis showing an optical arrangement of a zoom lens according to an example 7 at the time of focusing on the infinite object point, where.
Figure 13B:
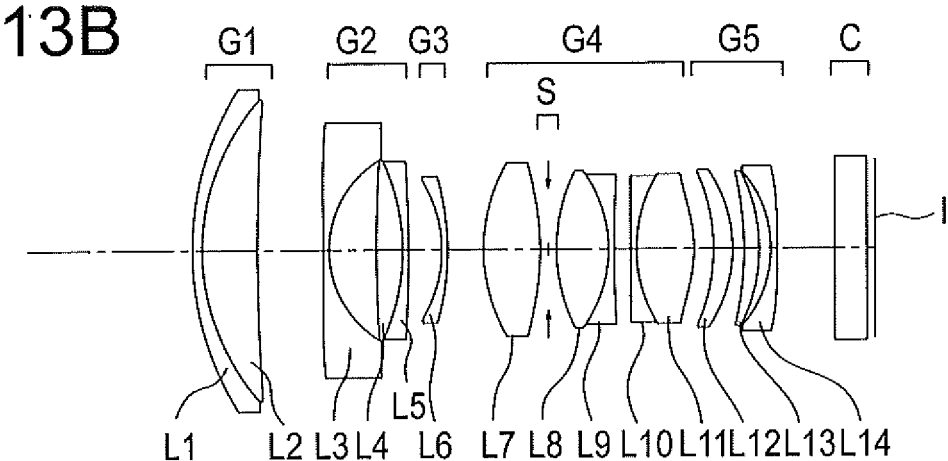
Figure 13C:
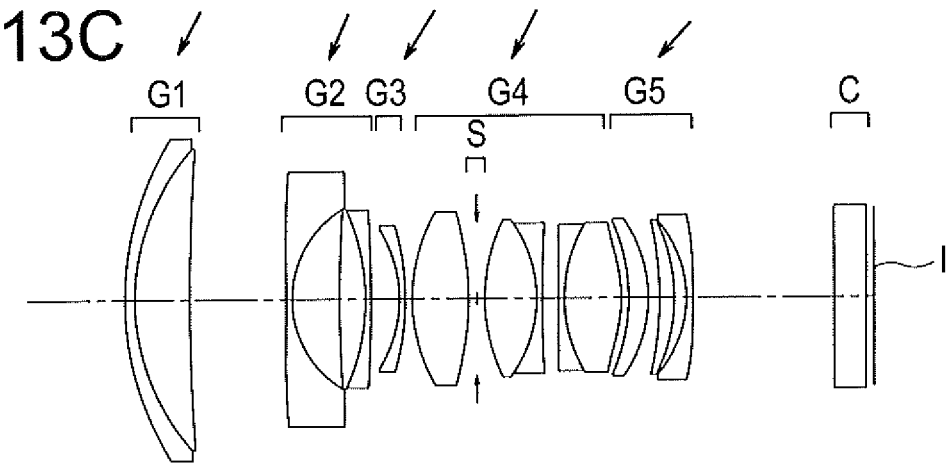

Next, a zoom lens according to an example 7 will be described below. FIG. 13A, FIG. 13B, and FIG. 13C are cross-sectional views along an optical axis showing an optical arrangement of the zoom lens according to the example 7 at the time of focusing on the infinite object point focusing. FIG. 14A to FIG. 14L are aberration diagrams of the zoom lens according to the example 7 at the time of focusing on the infinite object point.

The zoom lens of the example 7, as shown in FIG. 13A, FIG. 13B, and FIG. 13C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a biconcave negative lens L3, a biconvex positive lens L4, and a negative meniscus lens L5 having a convex surface directed toward an image side.

The third lens unit G3 includes a negative meniscus lens L6 having a convex surface directed toward the image side.

The fourth lens unit G4 includes a biconvex positive lens L7, a biconvex positive lens L8, a biconcave negative lens L9, a biconcave negative lens L10, and a biconvex positive lens L11. Here, the biconvex positive lens L8 and the biconcave negative lens L9 are cemented. Moreover, the biconcave negative lens L10 and the biconvex positive lens L11 are cemented.

The fifth lens unit G5 includes a positive meniscus lens L12 having a convex surface directed toward the image side, a positive meniscus lens L13 having a convex surface directed toward the image side, and a negative meniscus lens L14 having a convex surface directed toward the image side.

Moreover, an aperture stop S is disposed between the negative meniscus lens L5 and the positive meniscus lens L12. The negative meniscus lens L5 is positioned nearest to an image in the second lens unit G2, and the positive meniscus lens L12 is positioned nearest to an object in the fifth lens unit G5. More specifically, the aperture stop S is disposed between the biconvex positive lens L7 and the biconvex positive lens L8 (in the fourth lens unit G4).

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the third lens unit G3, the fourth lens unit G4, and the fifth lens unit G5 move toward the object side. The second lens unit G2, after moving toward the image side, moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of seven surfaces namely, both surfaces of the biconcave negative lens L3, an object-side surface of the negative meniscus lens L6, both surfaces of the biconvex positive lens L7, an image-side surface of the biconvex positive lens L11, and an image side surface of the negative meniscus lens L14.

Figure 15A:
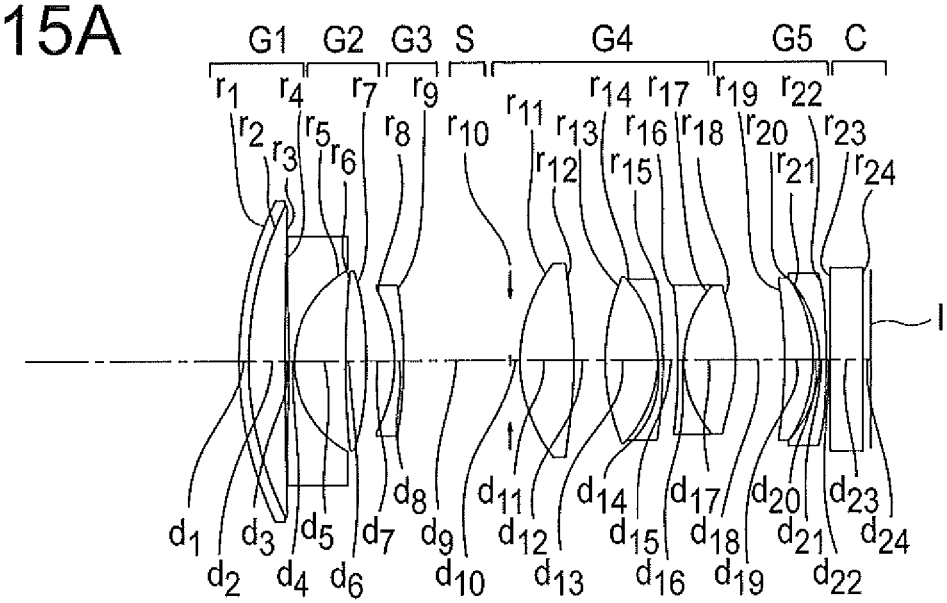
FIG. 15A, FIG. 15B, and FIG. 15C are cross-sectional views along an optical axis showing an optical arrangement of a zoom lens according to an example 8 at the time of focusing on the infinite object point, where.
Figure 15B:
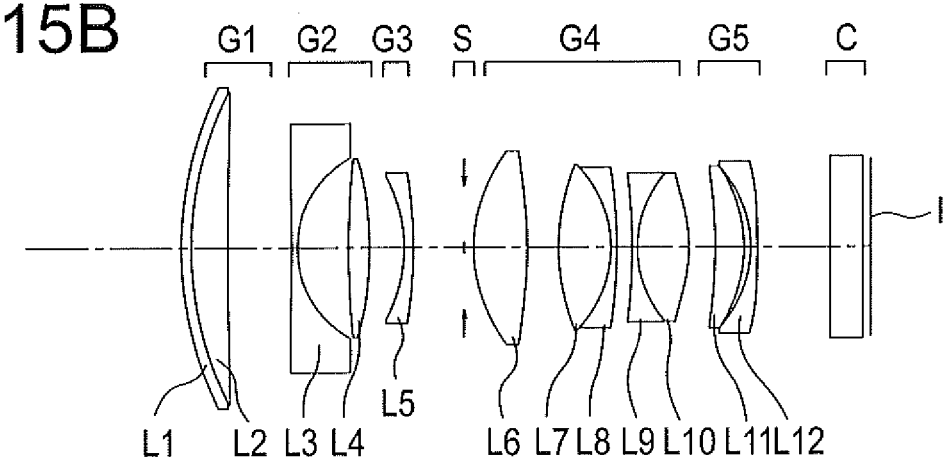
Figure 15C:
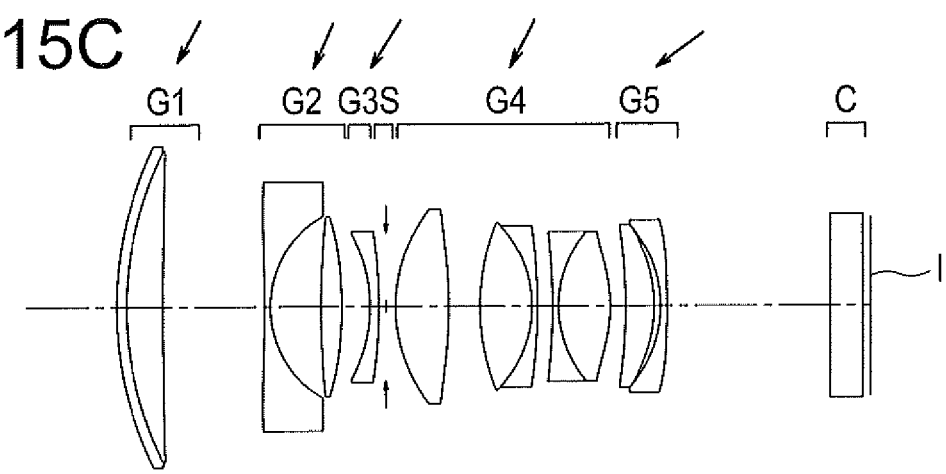

Next, a zoom lens according to an example 8 will be described below. FIG. 15A, FIG. 15B, and FIG. 15C are cross-sectional views along an optical axis showing an optical arrangement of the zoom lens according to the example 8 at the time of focusing on the infinite object point. FIG. 16A to FIG. 16L are aberration diagrams of the zoom lens according to the example 8 at the time of focusing on the infinite object point.

The zoom lens of the example 8, as shown in FIG. 15A, FIG. 15B, and FIG. 15C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a biconcave negative lens L3 and a biconvex positive lens L4.

The third lens unit G3 includes a negative meniscus lens L5 having a convex surface directed toward an image side.

The fourth lens unit G4 includes a biconvex positive lens L6, a biconvex positive lens L7, a negative meniscus lens L8 having a convex surface directed toward the image side, a biconcave negative lens L9, and a biconvex positive lens L10. Here, the biconvex positive lens L7 and the negative meniscus lens L8 are cemented. Moreover, the biconcave negative lens L9 and the biconvex positive lens L10 are cemented.

The fifth lens unit G5 includes a positive meniscus lens L11 having a convex surface directed toward the image side and a negative meniscus lens L12 having a convex surface directed toward the image side.

Moreover, an aperture stop S is disposed between the biconvex positive lens L4 and the positive meniscus lens L11. The biconvex positive lens L4 is positioned nearest to an image in the second lens unit G2 and the positive meniscus lens L11 is positioned nearest to an object in the fifth lens unit G5. More specifically, the aperture stop S is disposed between the negative meniscus lens L5 and the biconvex positive lens L6.

At the time of zooming from a wide angle end to a telephoto end, distances between the lens units change. A distance between the first lens unit G1 and the second lens unit G2 widens. A distance between the second lens unit G2 and the third lens unit G3 widens and then narrows. A distance between the third lens unit G3 and the fourth lens unit G4 narrows. A distance between the fourth lens unit G4 and the fifth lens unit G5 narrows.

Each of the first lens unit G1, the fourth lens unit G4, and the fifth lens unit G5 moves toward the object side. The second lens unit G2 and the third lens unit G3, after moving toward the image side, move toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L5 moves toward the object side.

An aspheric surface is provided to a total of nine surfaces namely, both surfaces of the biconcave negative lens L3, both surfaces of the biconvex positive lens L4, an object-side surface of the negative meniscus lens L5, both surfaces of the biconvex positive lens L6, an image-side surface of the biconvex positive lens L10, and an image-side surface of the negative meniscus lens L12.

Figure 17A:
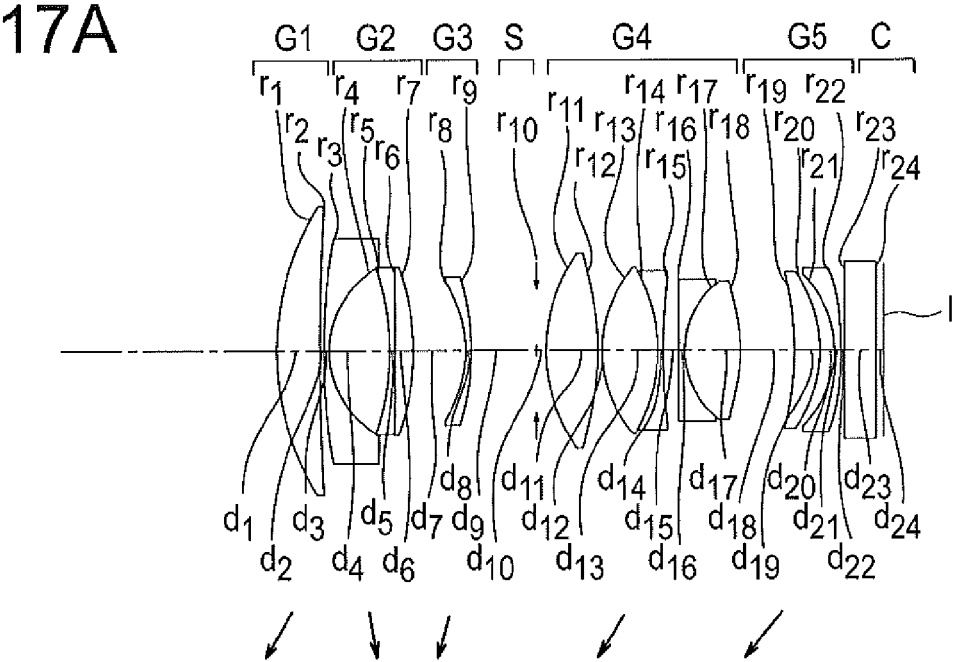
FIG. 17A, FIG. 17B, and FIG. 17C are cross-sectional views along an optical axis showing an optical arrangement of a zoom lens according to an example 9 at the time of focusing on the infinite object point, where.
Figure 17B:
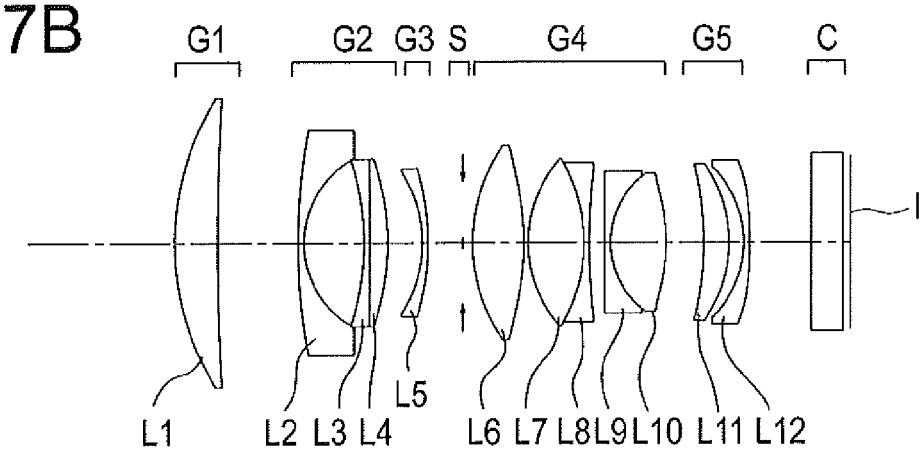
Figure 17C:
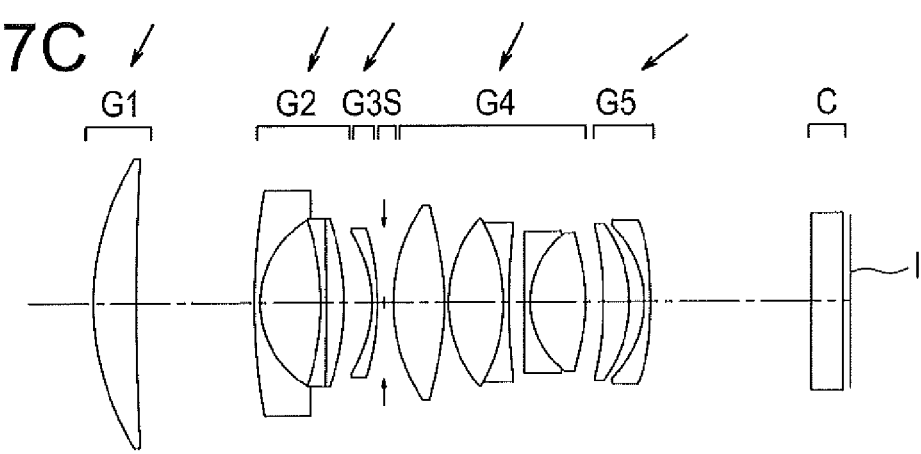

Next, a zoom lens according to an example 9 will be described below. FIG. 17A, FIG. 17B, and FIG. 17C are cross-sectional views along an optical axis showing an optical arrangement of the zoom lens according to the example 9 at the time of focusing on the infinite object point. FIG. 18A to FIG. 18L are aberration diagrams of the zoom lens according to the example 9 at the time of focusing on the infinite object point.

The zoom lens of the example 9, as shown in FIG. 17A, FIG. 17B, and FIG. 17C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a positive meniscus lens L1 having a convex surface directed toward the object side.

The second lens unit G2 includes a negative meniscus lens L2 having a convex surface directed toward the object side, a negative meniscus lens L3 having a convex surface directed toward an image side, and a positive meniscus lens L4 having a convex surface directed toward the image side. Here, the negative meniscus lens L3 and the positive meniscus lens L4 are cemented.

The third lens unit G3 includes a negative meniscus lens L5 having a convex surface directed toward the image side.

The fourth lens unit G4 includes a biconvex positive lens L6, a biconvex positive lens L7, a biconcave negative lens L8, a biconcave negative lens L9, and a biconvex positive lens L10. Here, the biconvex positive lens L7 and the biconcave negative lens L8 are cemented. Moreover, the biconcave negative lens L9 and the biconvex positive lens L10 are cemented.

The fifth lens unit G5 includes a positive meniscus lens L11 having a convex surface directed toward the image side and a negative meniscus lens L12 having a convex surface directed toward the image side.

Moreover, an aperture stop S is disposed between the positive meniscus lens L4 and the positive meniscus lens L11. The positive meniscus lens L4 is positioned nearest to an image in the second lens unit G2 and the positive meniscus lens L11 is positioned nearest to an object in the fifth lens unit G5. More specifically, the aperture stop S is disposed between the negative meniscus lens L5 and the biconvex positive lens L6.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the third lens unit G3, the fourth lens unit G4, and the fifth lens unit G5 moves toward the object side. The second lens unit G2, after moving toward the image side, moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L5 moves toward the object side.

An aspheric surface is provided to a total of seven surfaces namely, both surfaces of the negative meniscus lens L2, an object-side surface of the negative meniscus lens L5, both surfaces of the biconvex positive lens L6, an image-side surface of the biconvex positive lens L10, and an image-side surface of the negative meniscus lens L12.

Figure 19A:
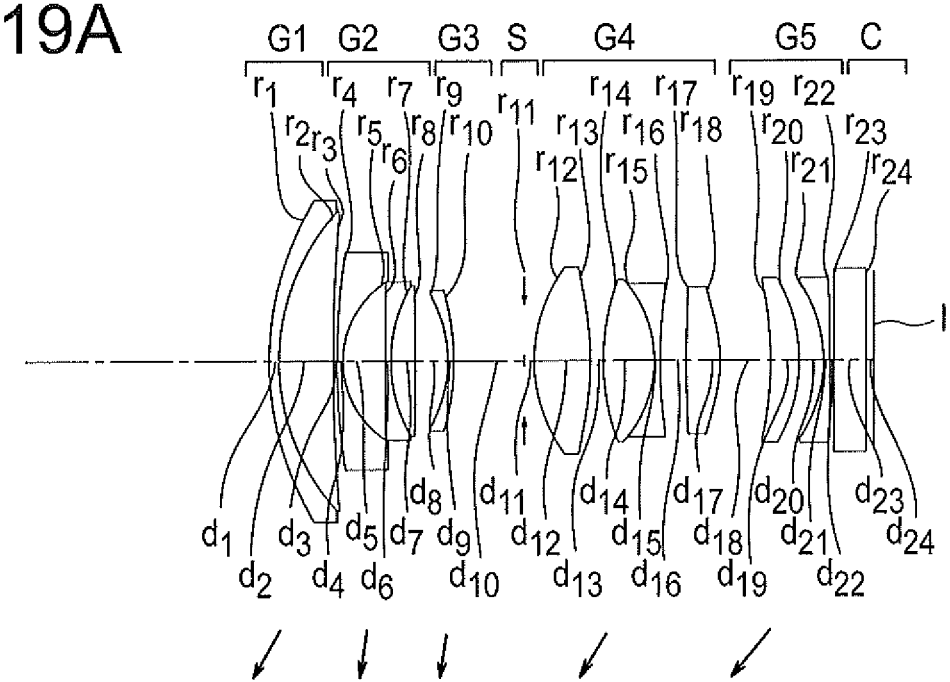
FIG. 19A, FIG. 19B, and FIG. 19C are cross-sectional views along an optical axis showing an optical arrangement of a zoom lens according to an example 10 at the time of focusing on the infinite object point, where.
Figure 19B:
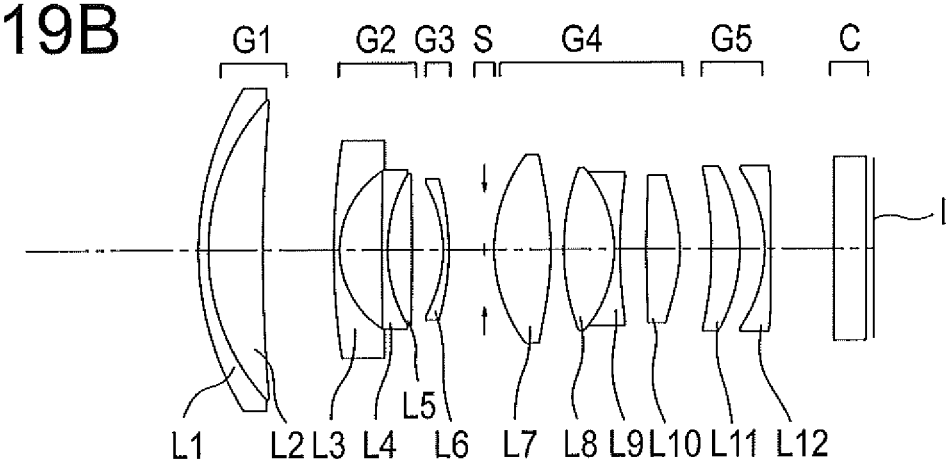
Figure 19C:
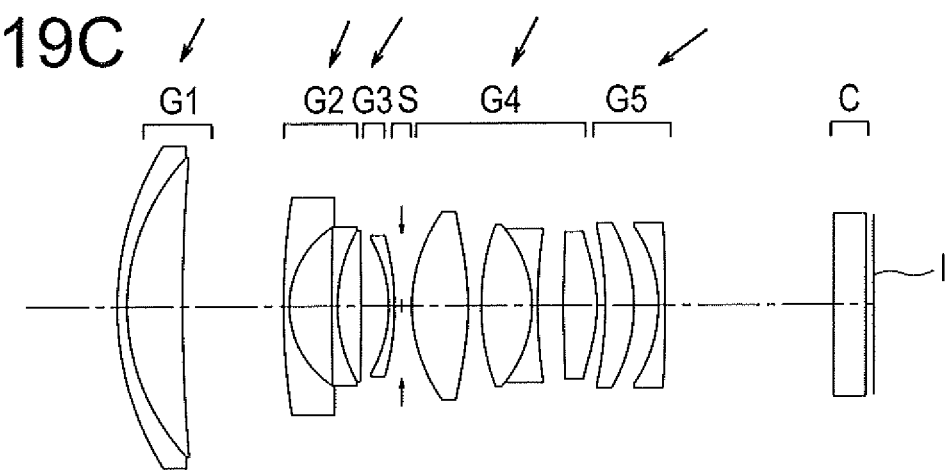

Next, a zoom lens according to an example 10 will be described below. FIG. 19A, FIG. 19B, and FIG. 19C are cross-sectional views along an optical axis showing an optical arrangement of the zoom lens according to the example 10 at the time of focusing on the infinite object point. FIG. 20A to FIG. 20L are aberration diagrams of the zoom lens according to the example 10 at the time of focusing on the infinite object point.

The zoom lens of the example 10, as shown in FIG. 19A, FIG. 19B, and FIG. 19C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a negative meniscus lens L4 having a convex surface directed toward the object side, and a biconvex positive lens L5. Here, the negative meniscus lens L4 and the biconvex positive lens L5 are cemented.

The third lens unit G3 includes a negative meniscus lens L6 having a convex surface directed toward an image side.

The fourth lens unit G4 includes a biconvex positive lens L7, a biconvex positive lens L8, a biconcave negative lens L9, and a biconvex positive lens L10. Here, the biconvex positive lens L8 and the biconcave negative lens L9 are cemented.

The fifth lens unit G5 includes a positive meniscus lens L11 having a convex surface directed toward the image side and a biconcave negative lens L12.

Moreover, an aperture stop S is disposed between the biconvex positive lens L5 and the positive meniscus lens L11. The biconvex positive lens L5 is positioned nearest to an image in the second lens unit G2 and the positive meniscus lens L11 is positioned nearest to an object in the fifth lens unit G5. More specifically, the aperture stop S is disposed between the negative meniscus lens L6 and the biconvex positive lens L7.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the second lens unit G2, the third lens unit G3, the fourth lens unit G4, and the fifth lens unit G5 moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of eight surfaces namely, both surfaces of the negative meniscus lens L3, an object-side surface of the negative meniscus lens L6, both surfaces of the biconvex positive lens L7, both surfaces of the biconvex positive lens L10, and an image-side surface of the biconcave negative lens L12.

Figure 21A:
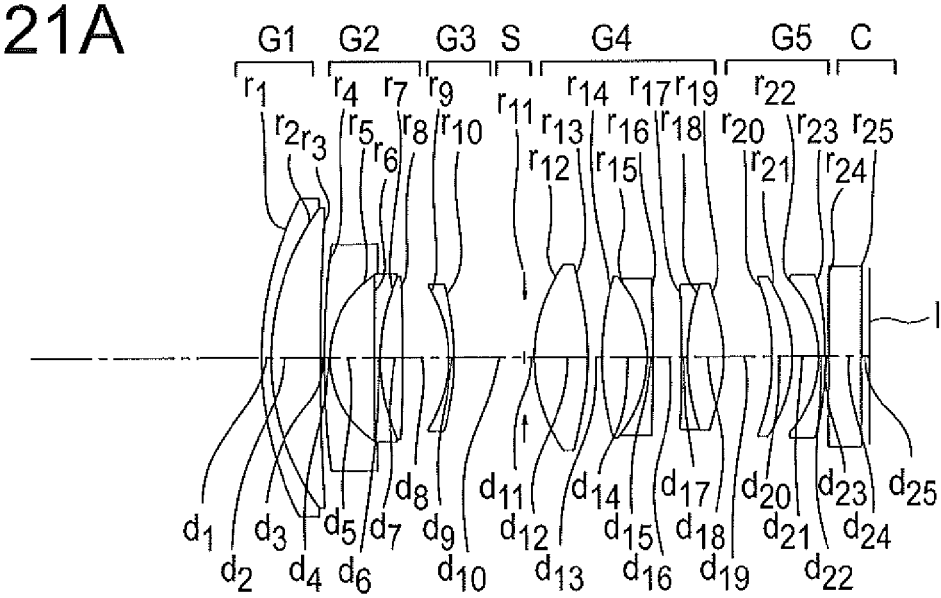
FIG. 21A, FIG. 21B, and FIG. 21C are cross-sectional views along an optical axis showing an optical arrangement of a zoom lens according to an example 11 at the time of focusing on the infinite object point, where.
Figure 21B:
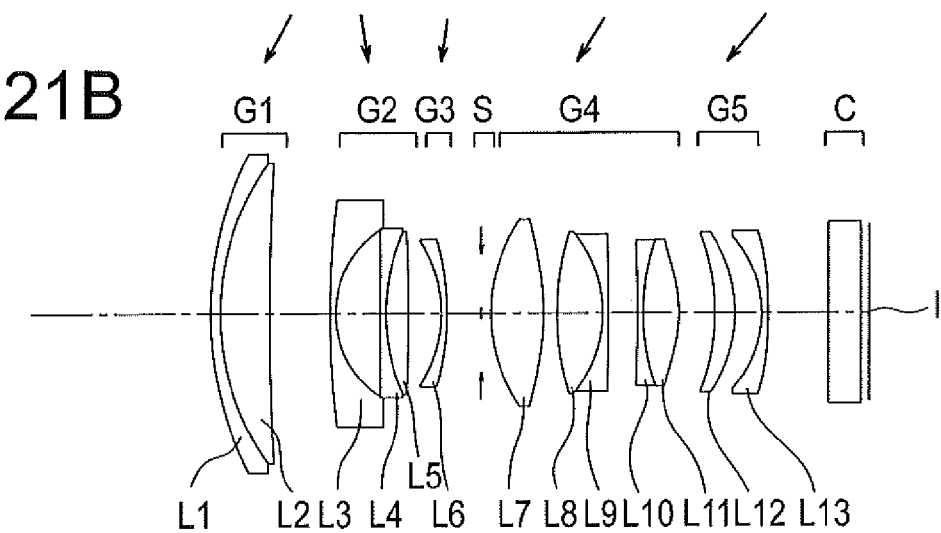
Figure 21C:
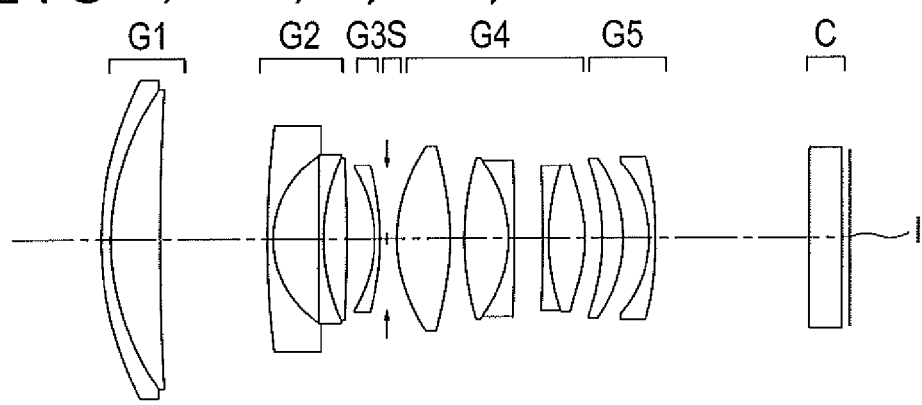

Next, a zoom lens according to an example 11 will be described below. FIG. 21A, FIG. 21B, and FIG. 21C are cross-sectional views along an optical axis showing an optical arrangement of the zoom lens according to the example 11 at the time of focusing on the infinite object point. FIG. 22A to FIG. 22L are aberration diagrams of the zoom lens according to the example 11 at the time of focusing on the infinite object point.

The zoom lens of the example 11, as shown in FIG. 21A, FIG. 21B, and FIG. 21C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a negative meniscus lens L4 having a convex surface directed toward the object side, and the biconvex positive lens L5. Here, the negative meniscus lens L4 and the biconvex positive lens L5 are cemented.

The third lens unit G3 includes a negative meniscus lens L6 having a convex surface directed toward an image side.

The fourth lens unit G4 includes a biconvex positive lens L7, a biconvex positive lens L8, a negative meniscus lens L9 having a convex surface directed toward the image side, a biconcave negative lens L10, and a biconvex positive lens L11. Here, the biconvex positive lens L8 and the negative meniscus lens L9 are cemented. Moreover, the biconcave negative lens L10 and the biconvex positive lens L11 are cemented.

The fifth lens unit G5 includes a positive meniscus lens L12 having a convex surface directed toward the image side and a negative meniscus lens L13 having a convex surface directed toward the image side.

Moreover, an aperture stop S is disposed between the biconvex positive lens L5 and the positive meniscus lens L12. The biconvex positive lens L5 is positioned nearest to an image in the second lens unit G2, and the positive meniscus lens L12 is positioned nearest to an object in the fifth lens unit G5. More specifically, the aperture stop S is disposed between the negative meniscus lens L6 and the biconvex positive lens L7.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the third lens unit G3, the fourth lens unit G4, and the fifth lens unit G5 moves toward the object side. The second lens unit G2, after moving toward the image side, moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of seven surfaces namely, both surfaces of the negative meniscus lens L3, an object-side surface of the negative meniscus lens L6, both surfaces of the biconvex positive lens L7, an image-side surface of the biconvex positive lens L11, and an image-side surface of the negative meniscus lens L13.

Figure 23A:
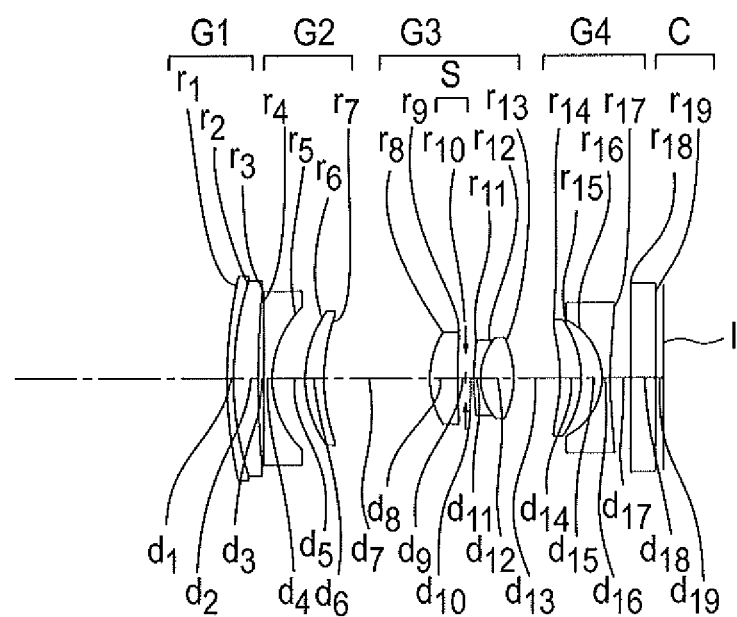
FIG. 23A, FIG. 23B, FIG. 23C are cross-sectional views along an optical axis showing an optical arrangement of a zoom lens according to an example 12 at the time of focusing on the infinite object point, where.
Figure 23B:
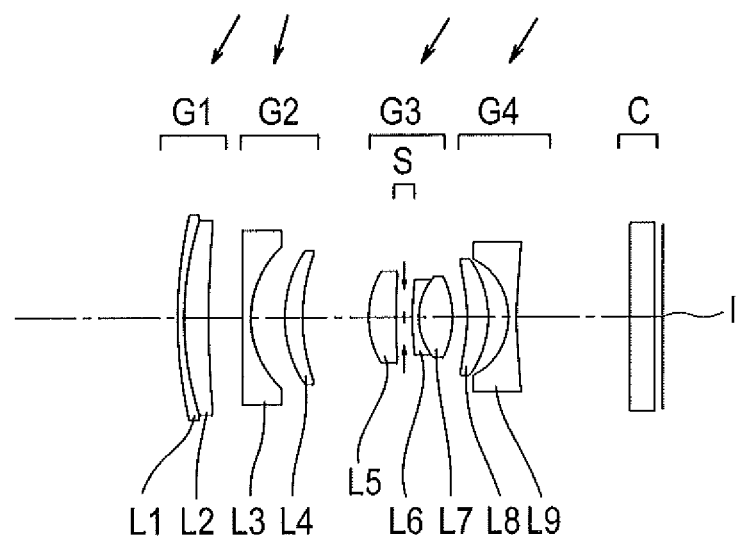
Figure 23C:
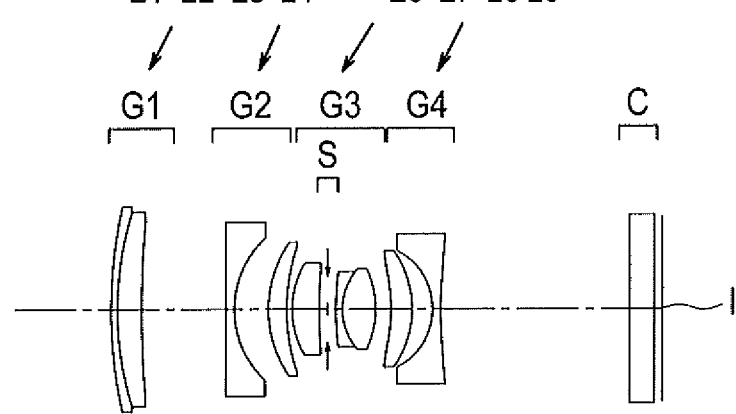

Next, a zoom lens according to an example 12 will be described below. FIG. 23A, FIG. 23B, and FIG. 23C are cross-sectional views along an optical axis showing an optical arrangement of the zoom lens according to the example 12 at the time of focusing on the infinite object point. FIG. 24A to FIG. 24L are aberration diagrams of the zoom lens according to the example 12 at the time of focusing on the infinite object point.

The zoom lens of the example 12, as shown in FIG. 23A, FIG. 23B, and FIG. 23C, includes in order from an object side, a first lens unit G1 having a positive refractive power, a second lens unit G2 having a negative refractive power, a third lens unit G3 having a positive refractive power, and a fourth lens unit G4 having a negative refractive power. Here, the fourth lens unit G4 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a biconcave negative lens L3, and a positive meniscus lens L4 having a convex surface directed toward the object side.

The third lens unit G3 includes a positive meniscus lens L5 having a convex surface directed toward the object side, a negative meniscus lens L6 having a convex surface directed toward the object side, and a biconvex positive lens L7. Here, the negative meniscus lens L6 and the biconvex positive lens L7 are cemented.

The fourth lens unit G4 includes a positive meniscus lens L8 having a convex surface directed toward an image side and a biconcave negative lens L9.

Moreover, an aperture stop S is disposed between the positive meniscus lens L4 and the positive meniscus lens L8. The positive meniscus lens L4 is positioned nearest to an image in the second lens unit G2 and the positive meniscus lens L8 is positioned nearest to an object in the fourth lens unit G4. More specifically, the aperture stop S is disposed between the positive meniscus lens L5 and the negative meniscus lens L6.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows and then widens.

Each of the first lens unit G1, the second lens unit G2, the third lens unit G3, and the fourth lens unit G4 moves toward the object side. The aperture stop S moves toward the object side together with the third lens unit G3.

Moreover, focusing on the object is carried out by the movement of the second lens unit G2. At the time of focusing from an infinite object point to an object point at a close distance, the biconcave negative lens L3 and the positive meniscus lens L4 having the convex surface directed toward the object side move toward the object side.

An aspheric surface is provided to a total of six surfaces namely, both surfaces of the positive meniscus lens L5, both surfaces of the positive meniscus lens L8, and both surfaces of the biconcave negative lens L9.

Figure 25A:
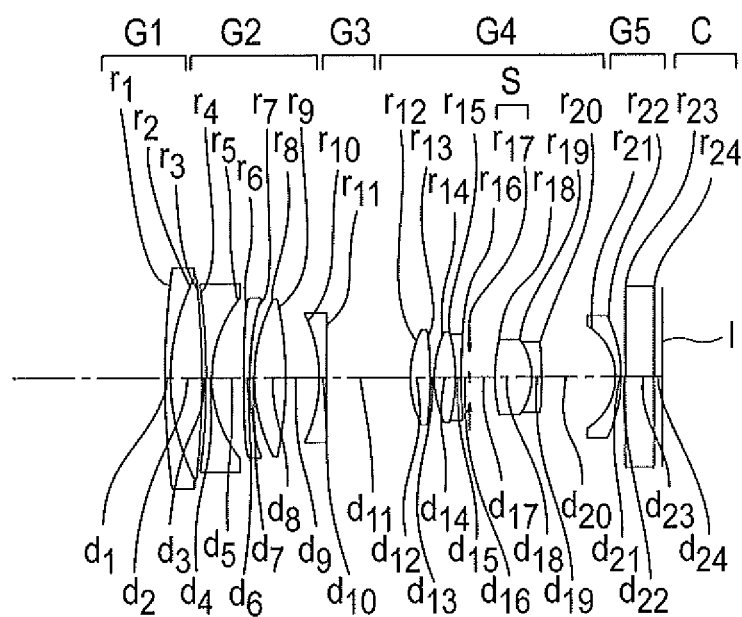
FIG. 25A, FIG. 25B, and FIG. 25C are cross-sectional views along an optical axis showing an optical arrangement of a zoom lens according to an example 13 of at the time of focusing on the infinite object, where.
Figure 25B:
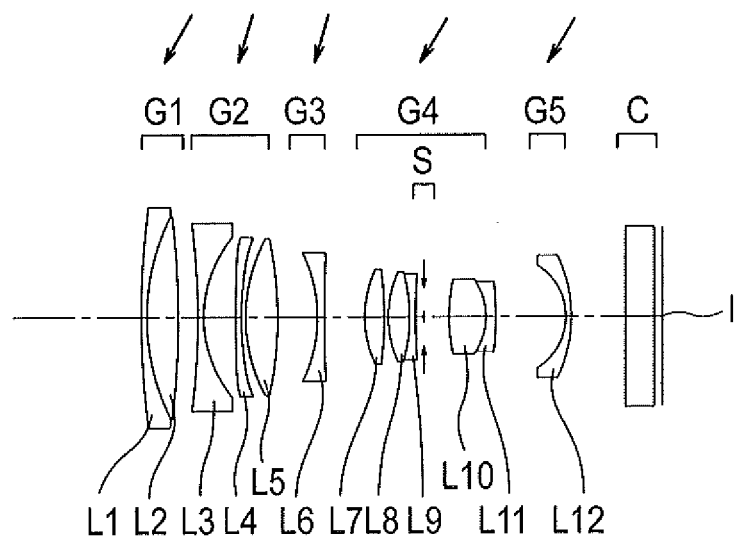
Figure 25C:
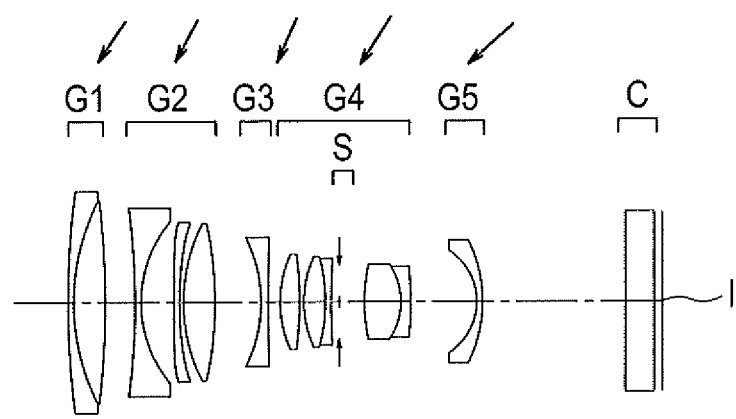

Next, a zoom lens according to an example 13 will be described below. FIG. 25A, FIG. 25B, and FIG. 25C are cross-sectional views along an optical axis showing an optical arrangement of the zoom lens according to the example 13 at the time of focusing on the infinite object point. FIG. 26A to FIG. 26L are aberration diagrams of the zoom lens according to the example 13 at the time of focusing on the infinite object point.

The zoom lens of the example 13, as shown in FIG. 25A, FIG. 25B, and FIG. 25C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a biconvex positive lens L2. Here, the negative meniscus lens L1 and the biconvex positive lens L2 are cemented.

The second lens unit G2 includes a biconcave negative lens L3, a negative meniscus lens L4 having a convex surface directed toward the object side, and a biconvex positive lens L5.

The third lens unit G3 includes a biconcave negative lens L6.

The fourth lens unit G4 includes a biconvex positive lens L7, a biconvex positive lens L8, a biconcave negative lens L9, a biconvex positive lens L10, and a negative meniscus lens L11 having a convex surface directed toward an image side. Here, the biconvex positive lens L8 and the biconcave negative lens L9 are cemented. Moreover, the biconvex positive lens L10 and the negative meniscus lens L11 are cemented.

The fifth lens unit G5 includes a negative meniscus lens L12 having a convex surface directed toward the image side.

Moreover, an aperture stop S is disposed between the biconvex positive lens L5 and the negative meniscus lens L12. The biconvex positive lens L5 is positioned nearest to an image in the second lens unit G2 and the negative meniscus lens L12 is positioned nearest to an object in the fifth lens unit G5. More specifically, the aperture stop S is disposed between the biconcave negative lens L9 and the biconvex positive lens L10 (in the fourth lens unit G4).

At the time of zooming from a wide angle end to a telephoto end, distances between the lens units change. A distance between the first lens unit G1 and the second lens unit G2 widens. A distance between the second lens unit G2 and the third lens unit G3 widens. A distance between the third lens unit G3 and the fourth lens unit G4 narrows. A distance between the fourth lens unit G4 and the fifth lens unit G5 narrows.

Each of the first lens unit G1, the second lens unit G2, the third lens unit G3, the fourth lens unit G4, and the fifth lens unit G5 moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of four surfaces namely, both surfaces of the negative meniscus lens L4, an object-side surface of the negative meniscus lens L6, and an object-side surface of the biconvex positive lens L10.

Figure 27A:
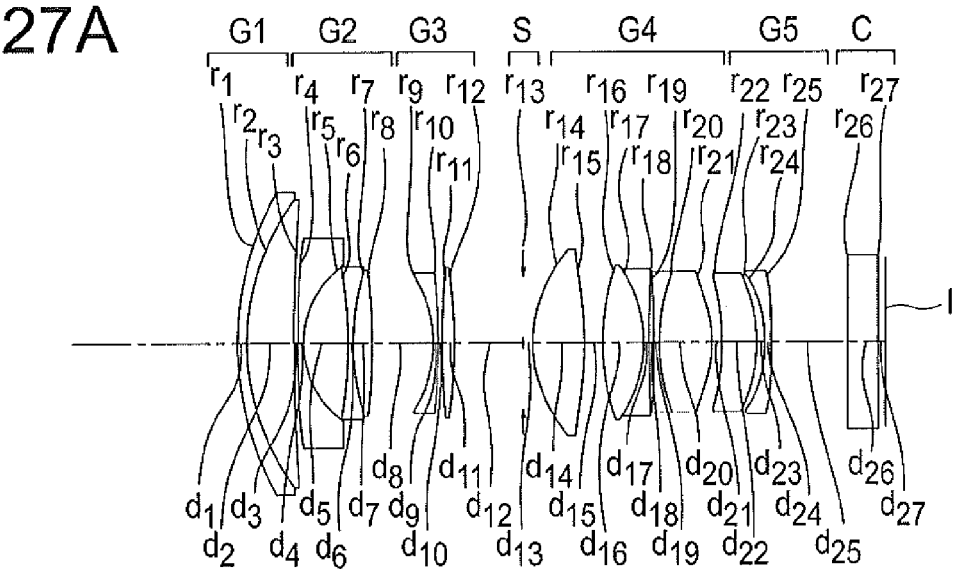
FIG. 27A, FIG. 27B, and FIG. 27C are cross-sectional views along an optical axis showing an optical arrangement of a zoom lens according to an example 14 at the time of focusing on the infinite object point, where.
Figure 27B:
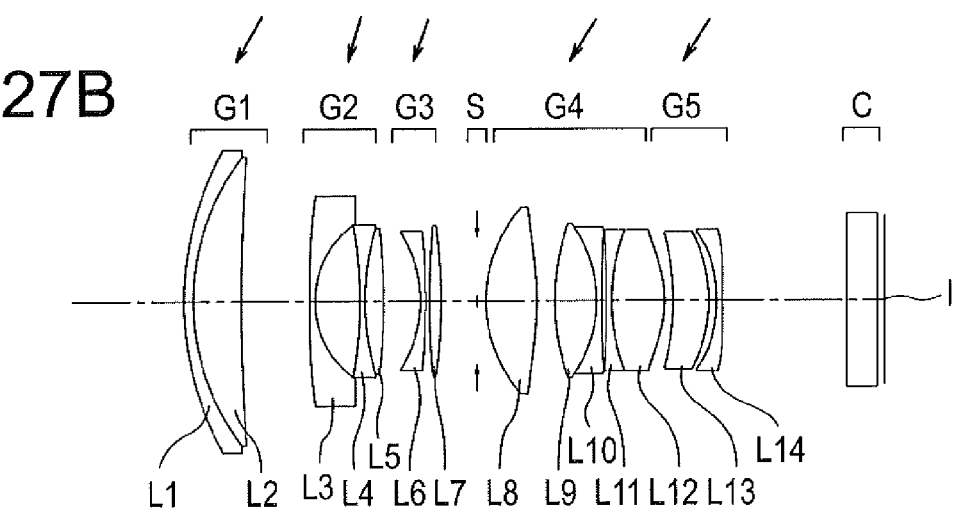
Figure 27C:
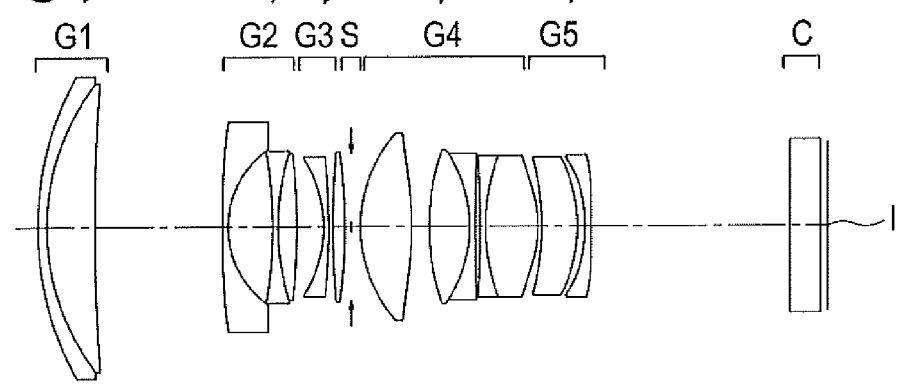

Next, a zoom lens according to an example 14 will be described below. FIG. 27A, FIG. 27B, and FIG. 27C are cross-sectional views along an optical axis showing an optical arrangement of the zoom lens according to the example 14 at the time of focusing on the infinite object point. FIG. 28A to FIG. 28L are aberration diagrams of the zoom lens according to the example 14 at the time of focusing on the infinite object point.

The zoom lens of the example 14, as shown in FIG. 27A, FIG. 27B, and FIG. 27C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, and a biconvex positive lens L5. Here, the biconcave negative lens L4 and the biconvex positive lens L5 are cemented.

The third lens unit G3 includes a negative meniscus lens L6 having a convex surface directed toward an image side, and a biconvex positive lens L7.

The fourth lens unit G4 includes a biconvex positive lens L8, a biconvex positive lens L9, a biconcave negative lens L10, a biconcave negative lens L11, and a biconvex positive lens L12. Here, the biconvex positive lens L9 and the biconcave negative lens L10 are cemented. Moreover, the biconcave negative lens L11 and the biconvex positive lens L12 are cemented.

The fifth lens unit G5 includes a positive meniscus lens L13 having a convex surface directed toward the image side, and a biconcave negative lens L14.

Moreover, an aperture stop S is disposed between the biconvex positive lens L5 and the positive meniscus lens L13. The biconvex positive lens L5 is positioned nearest to an image in the second lens unit G2 and the positive meniscus lens L13 is positioned nearest to an object in the fifth lens unit G5. More specifically, the aperture stop S is disposed between the biconvex positive lens L7 and the biconvex positive lens L8.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the third lens unit G3, the fourth lens unit G4, and the fifth lens unit G5 moves toward the object side. The second lens unit G2, after moving toward the image side, moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 and the biconvex positive lens L7 move toward the object side.

An aspheric surface is provided to a total of eight surfaces namely, both surfaces of the negative meniscus lens L3, an object-side surface of the negative meniscus lens L6, both surfaces of the biconvex positive lens L8, an image-side surface of the biconvex positive lens L12, and both surfaces of the biconcave negative lens L14.

Figure 29A:
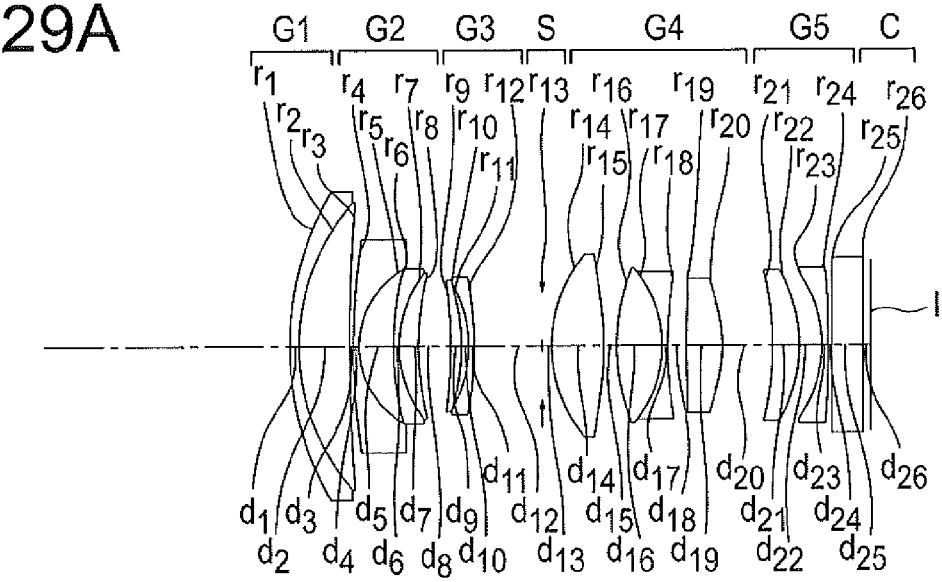
FIG. 29A, FIG. 29B, and FIG. 29C are cross-sectional views along an optical axis showing an optical arrangement of a zoom lens according to an example 15 at the time of focusing on the infinite object point, where.
Figure 29B:
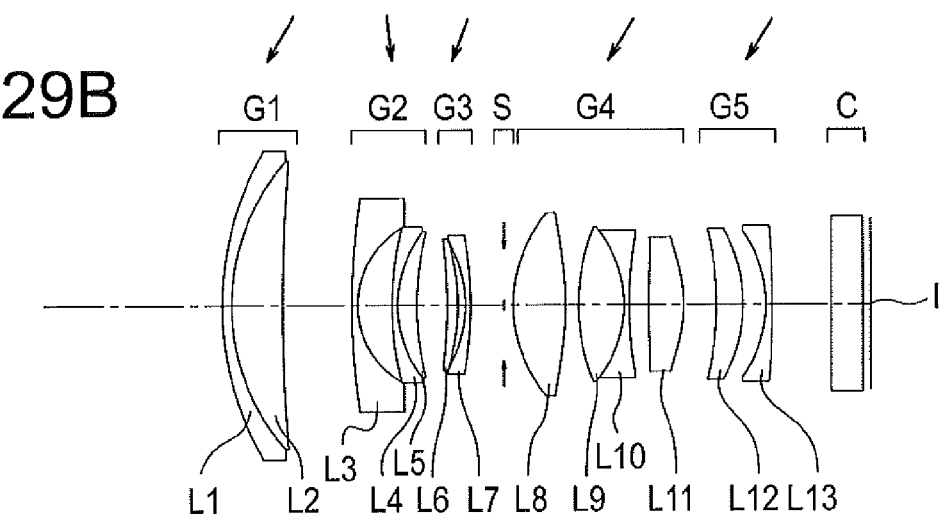
Figure 29C:
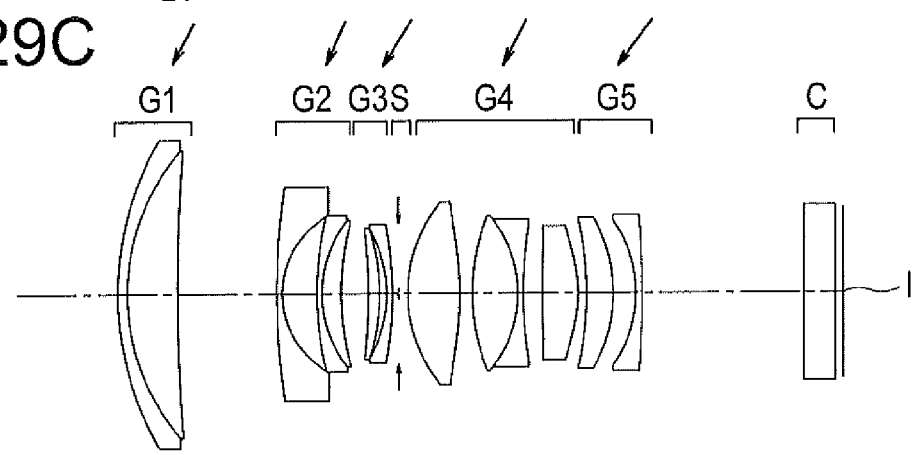

Next, a zoom lens according to an example 15 will be described below. FIG. 29A, FIG. 29B, and FIG. 29C are cross-sectional views along an optical axis showing an optical arrangement of the zoom lens according to the example 15 at the time of focusing on the infinite object point. FIG. 30A to FIG. 30L are aberration diagrams of the zoom lens according to the example 15 at the time of focusing on the infinite object point.

The zoom lens of the example 15, as shown in FIG. 29A, FIG. 29B, and FIG. 29C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side, and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a negative meniscus lens L4 having a convex surface directed toward the object side, and a positive meniscus lens L5 having a convex surface directed toward the object side. Here, the negative meniscus lens L4 and the positive meniscus lens L5 are cemented.

The third lens unit G3 includes a positive meniscus lens L6 having a convex surface directed toward an image side, and a negative meniscus lens L7 having a convex surface directed toward the image side.

The fourth lens unit G4 includes a biconvex positive lens L8, a biconvex positive lens L9, a biconcave negative lens L10, and a biconvex positive lens L11. Here, the biconvex positive lens L9 and the biconcave negative lens L10 are cemented.

The fifth lens unit G5 includes a positive meniscus lens L12 having a convex surface directed toward the image side, and a negative meniscus lens L13 having a convex surface directed toward the image side.

Moreover, an aperture stop S is disposed between the positive meniscus lens L5 and the positive meniscus lens L12. The positive meniscus lens L5 is positioned nearest to an image in the second lens unit G2, and the positive meniscus lens L12 is positioned nearest to an object in the fifth lens unit G5. More specifically, the aperture stop S is disposed between the negative meniscus lens L7 and the biconvex positive lens L8.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the second lens unit G2, the third lens unit G3, the fourth lens unit G4, and the fifth lens unit G5 moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the positive meniscus lens L6 and the negative meniscus lens L7 move toward the object side.

An aspheric surface is provided to a total of eight surfaces namely, both surfaces of the negative meniscus lens L3, an object-side surface of the negative meniscus lens L7, both surfaces of the biconvex positive lens L8, both surfaces of the biconvex positive lens L11, and an image-side surface of the negative meniscus lens L13.

Figure 31A:
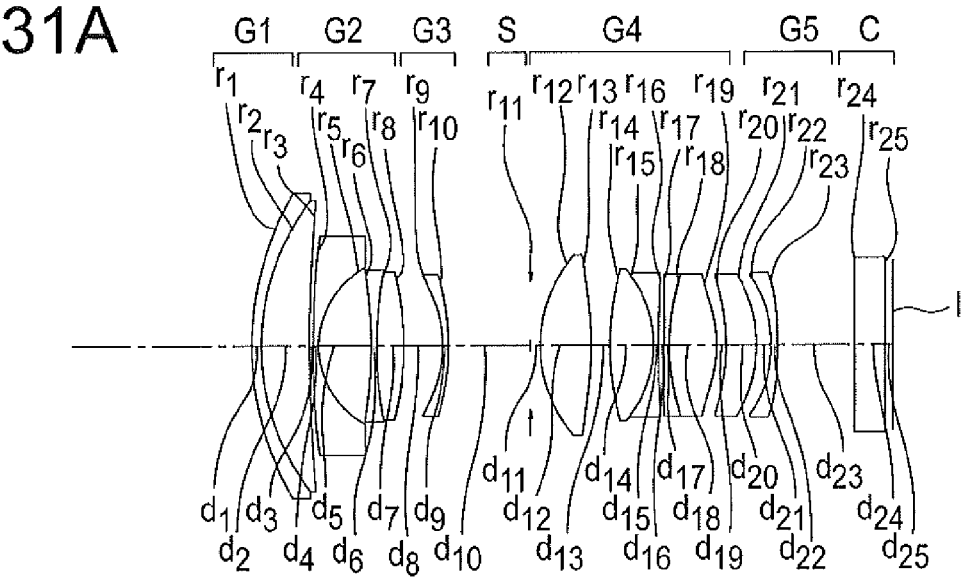
FIG. 31A, FIG. 31B, and FIG. 31C are cross-sectional views along an optical axis showing an optical arrangement of a zoom lens according to an example 16 at the time of focusing on the infinite object point, where.
Figure 31B:
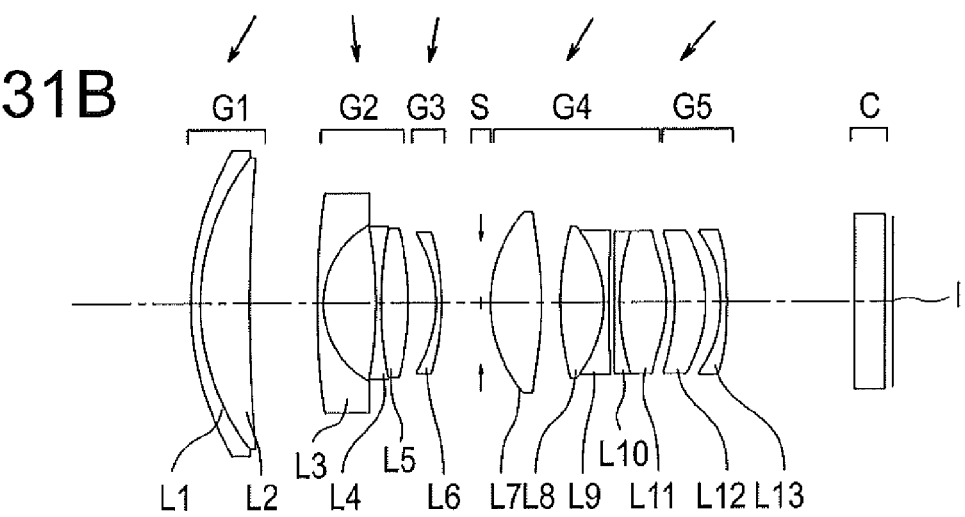
Figure 31C:
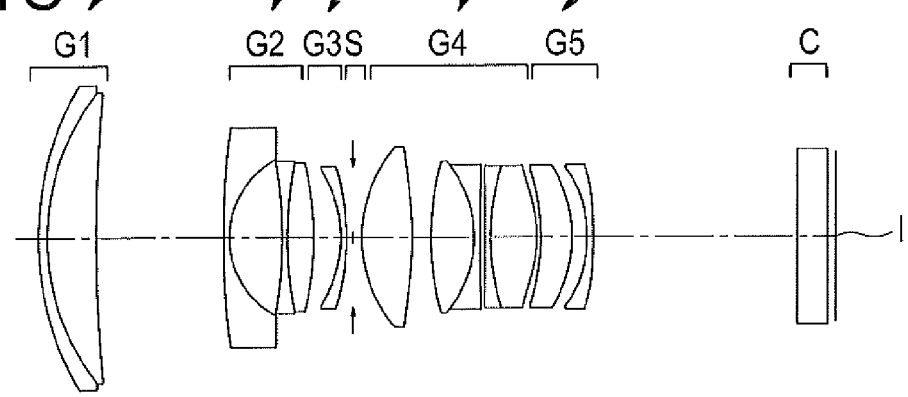

Next, a zoom lens according to an example 16 will be described below. FIG. 31A, FIG. 31B, and FIG. 31C are cross-sectional views along an optical axis showing an optical arrangement of the zoom lens according to the example 16 at the time of focusing on the infinite object point. FIG. 32A to FIG. 32L are aberration diagrams of the zoom lens according to the example 16 at the time of focusing on the infinite object point.

The zoom lens of the example 16, as shown in FIG. 31A, FIG. 31B, and FIG. 31C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side, and a positive meniscus lens L2 having a convex surface directed toward the object side. Here, the negative meniscus lens L1 and the positive meniscus lens L2 are cemented.

The second lens unit G2 includes a negative meniscus lens L3 having a convex surface directed toward the object side, a biconcave negative lens L4, and a biconvex positive lens L5. Here, the biconcave negative lens L4 and the biconvex positive lens L5 are cemented.

The third lens unit G3 includes a negative meniscus lens L6 having a convex surface directed toward an image side.

The fourth lens unit G4 includes a biconvex positive lens L7, a biconvex positive lens L8, a biconcave negative lens L9, a biconcave negative lens L10, and a biconvex positive lens L11. Here, the biconvex positive lens L8 and the biconcave negative lens L9 are cemented. Moreover, the biconcave negative lens L10 and the biconvex positive lens L11 are cemented.

The fifth lens unit G5 includes a positive meniscus lens L12 having a convex surface directed toward the image side, and a negative meniscus lens L13 having a convex surface directed toward the image side.

Moreover, an aperture stop S is disposed between the biconvex positive lens L5 and the positive meniscus lens L12. The biconvex positive lens L5 is positioned nearest to an image in the second lens unit G2, and the positive meniscus lens L12 is positioned nearest to an object in the fifth lens unit G5. More specifically, the aperture stop S is disposed between the negative meniscus lens L6 and the biconvex positive lens L7.

At the time of zooming from a wide angle end to a telephoto end, distances between the lens units change. A distance between the first lens unit G1 and the second lens unit G2 widens. A distance between the second lens unit G2 and the third lens unit G3 narrows. A distance between the third lens unit G3 and the fourth lens unit G4 narrows. A distance between the fourth lens unit G4 and the fifth lens unit G5 narrows.

Each of the first lens unit G1, the third lens unit G3, the fourth lens unit G4, and the fifth lens unit G5 moves toward the object side. The second lens unit G2, after moving toward the image side, moves toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L6 moves toward the object side.

An aspheric surface is provided to a total of eight surfaces namely, both surfaces of the negative meniscus lens L3, an object-side surface of the negative meniscus lens L6, both surfaces of the biconvex positive lens L7, an image-side surface of the biconvex positive lens L11, and both surfaces of the negative meniscus lens L13.

Figure 33A:
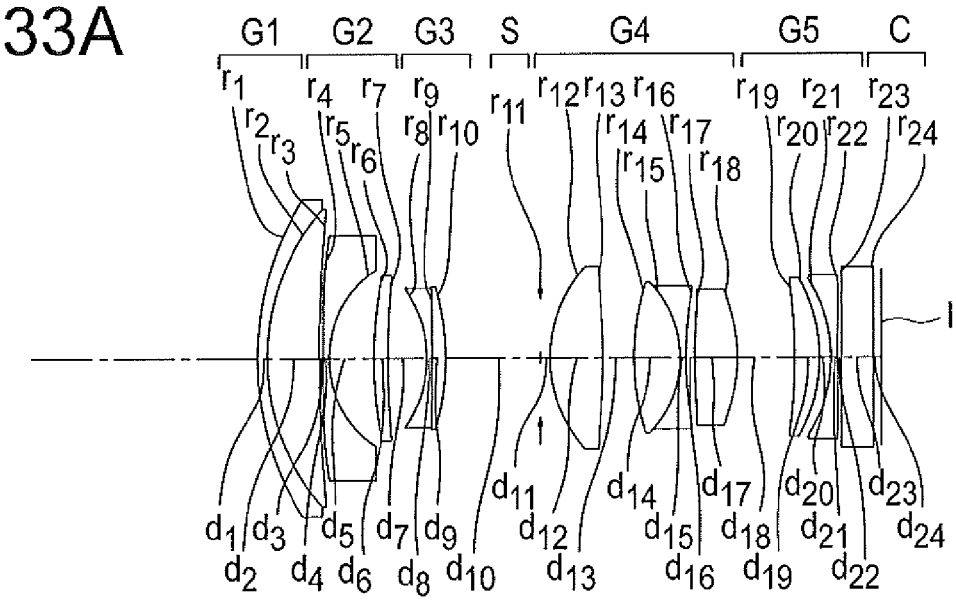
FIG. 33A, FIG. 33B, and FIG. 33C are cross-sectional views along an optical axis showing an optical arrangement of a zoom lens according to an example 17 at the time of focusing on the infinite object point n, where.
Figure 33B:
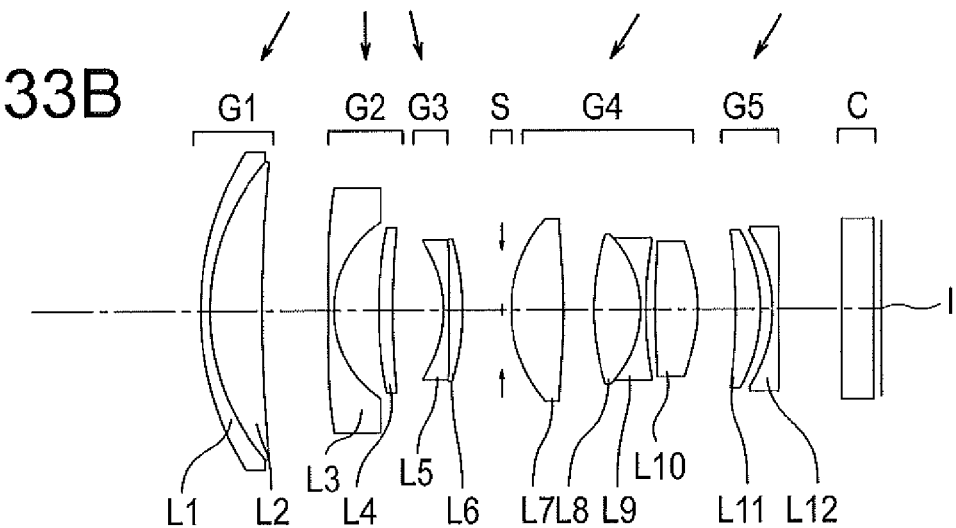
Figure 33C:
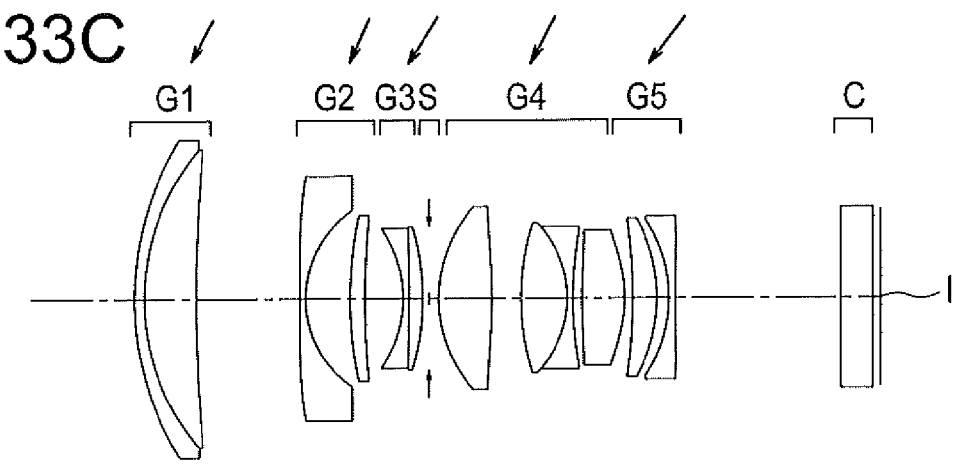

Next, a zoom lens according to an example 17 will be described below. FIG. 33A, FIG. 33B, and FIG. 33C are cross-sectional views along an optical axis showing an optical arrangement of the zoom lens according to the example 17 at the time of focusing on the infinite object point. FIG. 34A to FIG. 34L are aberration diagrams of the zoom lens according to the example 17 at the time of focusing on the infinite object point.

The zoom lens of the example 17, as shown in FIG. 33A, FIG. 33B, and FIG. 33C, includes in order from an object side, a first lens unit G1 having a positive refractive power, a second lens unit G2 having a negative refractive power, a third lens unit G3 having a negative refractive power, a fourth lens unit G4 having a positive refractive power, and a fifth lens unit G5 having a negative refractive power. Here, the fifth lens unit G5 is the rearmost lens unit.

The first lens unit G1 includes a negative meniscus lens L1 having a convex surface directed toward the object side, and a positive meniscus lens L2 having a convex surface directed toward the object side. Here, the negative meniscus lens L1 and the positive meniscus lens L2 are cemented.

The second lens unit G2 includes a biconcave negative lens L3, and a positive meniscus lens L4 having a convex surface directed toward the object side.

The third lens unit G3 includes a negative meniscus lens L5 having a convex surface directed toward an image side, and a positive meniscus lens L6 having a convex surface directed toward the image side. Here, the negative meniscus lens L5 and the positive meniscus lens L6 are cemented.

The fourth lens unit G4 includes a biconvex positive lens L7, a biconvex positive lens L8, a biconcave negative lens L9, and a biconvex positive lens L10. Here, the biconvex positive lens L8 and the biconcave negative lens L9 are cemented.

The fifth lens unit G5 includes a positive meniscus lens L11 having a convex surface directed toward the image side, and a biconcave negative lens L12.

Moreover, an aperture stop S is disposed between the positive meniscus lens L4 and the positive meniscus lens L11. The positive meniscus lens L4 is positioned nearest to an image in the second lens unit G2, and the positive meniscus lens L11 is positioned nearest to an object in the fifth lens unit G5. More specifically, the aperture stop S is disposed between the positive meniscus lens L6 and the biconvex positive lens L7.

At the time of zooming from a wide angle end to a telephoto end, distances between the lens units change. A distance between the first lens unit G1 and the second lens unit G2 widens. A distance between the second lens unit G2 and the third lens unit G3 widens and then narrows. A distance between the third lens unit G3 and the fourth lens unit G4 narrows. A distance between the fourth lens unit G4 and the fifth lens unit G5 narrows.

Each of the first lens unit G1, the fourth lens unit G4, and the fifth lens unit G5 moves toward the object side. The second lens unit G2 and the third lens unit G3, after moving toward the image side, move toward the object side. The aperture stop S moves toward the object side together with the fourth lens unit G4.

Moreover, focusing on the object is carried out by the movement of the third lens unit G3. At the time of focusing from an infinite object point to an object point at a close distance, the negative meniscus lens L5 and the positive meniscus lens L6 move toward the object side.

An aspheric surface is provided to a total of eight surfaces namely, both surfaces of the biconcave negative lens L3, an object-side surface of the negative meniscus lens L5, both surfaces of the biconvex positive lens L7, both surfaces of the biconvex positive lens L10, and an image-side surface of the biconcave negative lens L12.

Next, numerical data of optical components comprising the zoom lens of each above example are shown. In numerical data of each example, r1, r2, . . . denotes a radius of curvature of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, and * denotes an aspheric surface. Moreover, in zoom data, WE denotes a wide angle end, ST denotes an intermediate state, TE denotes a telephoto end, Focal Length denotes a focal length of the overall zoom lens system, FNO. denotes F-number, ω denotes for a half angle of field, FB stands for a back focus, each of f1, f2 . . . is a focal length of each lens unit. Further, Lens total length is a distance from a frontmost lens surface to a rearmost lens surface plus back focus. Back focus is a unit which is expressed upon air conversion of a distance from the rearmost lens surface to a paraxial image surface. Further, numerical data are data at the time of focusing on the infinite object point.

A shape of an aspheric surface is defined by the following expression where the direction of the optical axis is represented by z, the direction orthogonal to the optical axis is represented by y, a conical coefficient is represented by k, aspheric surface coefficients are represented by A4, A6, A8, A10, $$Z = (y^2/r)/\left[1 + \{1 - (1+k)(y/r)^2\}^{1/2}\right] + A4y^4 + A6y^6 + A8y^8 + A10y^{10}$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 43.936 | 1.20 | 1.92286 | 20.88 |
| 2 | 28.039 | 6.83 | 1.72916 | 54.68 |
| 3 | 416.387 | Variable | | |
| 4* | 103.154 | 0.70 | 1.85135 | 40.10 |
| 5* | 12.147 | 5.28 | | |
| 6 | −372.319 | 0.70 | 1.85135 | 40.10 |
| 7 | 18.297 | 3.32 | 1.94595 | 17.98 |
| 8 | −135.983 | Variable | | |
| 9* | −17.049 | 0.70 | 1.85135 | 40.10 |
| 10 | −36.725 | Variable | | |
| 11(Stop) | ∞ | 1.20 | | |
| 12* | 18.374 | 6.96 | 1.74320 | 49.34 |
| 13* | −40.462 | 1.04 | | |
| 14 | 39.991 | 5.58 | 1.58313 | 59.38 |
| 15 | −16.954 | 0.70 | 1.92286 | 20.88 |
| 16 | 59.097 | 0.50 | | |
| 17* | 35.190 | 6.43 | 1.53071 | 55.69 |
| 18* | −15.490 | Variable | | |
| 19 | −43.491 | 3.26 | 1.92286 | 20.88 |
| 20 | −21.422 | 0.50 | | |
| 21* | −56.071 | 1.70 | 1.53071 | 55.69 |
| 22 | 34.520 | 5.37 | | |
| 23 | −11.837 | 0.80 | 1.85135 | 40.10 |
| 24* | −22.533 | Variable | | |
| 25 | ∞ | 4.00 | 1.51633 | 64.14 |
| 26 | ∞ | 1.00 | | |
| Image plane (Image pickup surface) | ∞ | | | |

| Aspherical surface data |
|---|
| 4th surface |
| k = 0.000 |
| A4 = 5.61830e−06, A6 = −2.06924e−09, A8 = −8.96929e−11 |
| 5th surface |
| k = 0.000 |
| A4 = −1.49512e−06, A6 = 1.06534e−07 |
| 9th surface |
| k = 0.000 |
| A4 = 1.52780e−05, A6 = −1.89724e−08 |
| 12th surface |
| k = 0.000 |
| A4 = −1.91727e−05, A6 = 3.66676e−08, A8 = −4.14216e−11 |
| 13th surface |
| k = 0.000 |
| A4 = 2.03841e−05, A6 = −1.51783e−08 |

-continued

Unit mm

17th surface k = 0.000
A4 = −5.43835e−05, A6 = 8.83477e−08
18th surface k = 0.000
A4 = 1.35730e−04, A6 = −1.15736e−07, A8 = 3.12077e−09
21th surface k = 0.000
A4 = 5.41223e−05, A6 = 7.46065e−08
24th surface k = 0.000
A4 = −1.75556e−05, A6 = 1.53689e−07

Zoom data
Zoom ratio 2.88

|  | WE | ST | TE |
|---|---|---|---|
| Focal length | 12.40 | 21.04 | 35.71 |
| Fno. | 1.80 | 2.20 | 2.42 |
| Angle of view 2ω | 91.78 | 54.64 | 33.69 |
| Image height | 11.00 | 11.00 | 11.00 |
| FB(in air) | 4.14 | 10.03 | 20.99 |
| Lens total length (in air) | 72.76 | 82.08 | 91.64 |
| d3 | 0.50 | 9.28 | 13.03 |
| d8 | 3.68 | 3.93 | 3.50 |
| d10 | 8.89 | 4.25 | 0.85 |
| d18 | 2.78 | 1.83 | 0.50 |
| d24 | 0.50 | 6.39 | 17.35 |

Unit focal length f1 = 79.64   f2 = −21.00   f3 = −38.00   f4 = 15.44   f5 = −28.29

Example 2

Unit mm

Surface data

| Surface no. | r | d | nd | νd |
|---|---|---|---|---|
| Object plane | ∞ | ∞ | | |
| 1 | 40.461 | 1.20 | 1.92286 | 20.88 |
| 2 | 34.871 | 5.50 | 1.72916 | 54.68 |
| 3 | 212.024 | Variable | | |
| 4* | 125.211 | 0.70 | 1.85135 | 40.10 |
| 5* | 12.980 | 6.48 | | |
| 6 | −87.240 | 0.70 | 1.83481 | 42.71 |
| 7 | 45.311 | 2.54 | 1.94595 | 17.98 |
| 8 | −68.155 | Variable | | |
| 9* | −16.000 | 0.70 | 1.85135 | 40.10 |
| 10 | −33.170 | Variable | | |
| 11(Stop) | ∞ | 1.20 | | |
| 12* | 20.025 | 6.73 | 1.74320 | 49.34 |
| 13* | −29.647 | 0.50 | | |
| 14 | 34.325 | 5.64 | 1.51633 | 64.14 |
| 15 | −16.450 | 0.70 | 1.84666 | 23.78 |
| 16 | 109.609 | 4.79 | | |
| 17 | 71.118 | 0.70 | 1.85135 | 40.10 |
| 18 | 22.294 | 5.06 | 1.58313 | 59.38 |
| 19* | −18.928 | Variable | | |
| 20 | −24.408 | 2.35 | 1.94595 | 17.98 |
| 21 | −17.482 | 3.31 | | |
| 22 | −16.000 | 0.80 | 1.85135 | 40.10 |
| 23* | −70.838 | Variable | | |
| 24 | ∞ | 4.00 | 1.51633 | 64.14 |
| 25 | ∞ | 1.00 | | |
| Image plane (Image pickup surface) | ∞ | | | |

Aspherical surface data

4th surface k = 0.000
A4 = 1.02369e−05, A6 = −2.18429e−08, A8 = 3.90403e−12
5th surface k = 0.000
A4 = 3.19622e−08, A6 = 6.95961e−08
9th surface k = 0.000
A4 = 1.79252e−05, A6 = 5.52627e−08
12th surface k = 0.000
A4 = −1.51621e−05, A6 = 4.21766e−08, A8 = −4.85331e−11
13th surface k = 0.000
A4 = 3.24750e−05, A6 = −3.63363e−08
19th surface k = 0.000
A4 = 7.92854e−05, A6 = 8.94951e−08, A8 = 2.01290e−09
23th surface k = 0.000
A4 = −2.79752e−05, A6 = 2.03247e−09

Zoom data
Zoom ratio 2.88

|  | WE | ST | TE |
|---|---|---|---|
| Focal length | 12.40 | 21.04 | 35.71 |
| Fno. | 1.80 | 2.20 | 2.42 |
| Angle of view 2ω | 90.66 | 55.48 | 33.82 |
| Image height | 11.00 | 11.00 | 11.00 |
| FB(in air) | 4.14 | 11.16 | 23.07 |
| Lens total length (in air) | 75.09 | 81.70 | 91.64 |
| d3 | 0.50 | 7.82 | 12.47 |
| d8 | 5.85 | 4.34 | 3.50 |
| d10 | 8.85 | 4.39 | 0.85 |
| d19 | 6.16 | 4.39 | 2.15 |
| d23 | 0.50 | 7.52 | 19.43 |

Unit focal length f1 = 70.76   f2 = −21.00   f3 = −37.00   f4 = 17.22   f5 = −44.22

Example 3

Unit mm

Surface data

| Surface no. | r | d | nd | νd |
|---|---|---|---|---|
| Object plane | ∞ | ∞ | | |
| 1 | 41.450 | 1.20 | 1.92286 | 20.88 |
| 2 | 29.642 | 7.00 | 1.72916 | 54.68 |
| 3 | 354.834 | Variable | | |
| 4* | −765.284 | 0.70 | 1.85135 | 40.10 |
| 5* | 12.891 | 5.87 | | |
| 6 | −175.111 | 0.70 | 1.83481 | 42.71 |
| 7 | 31.739 | 2.97 | 1.94595 | 17.98 |

-continued

Unit mm

| | | | | |
|---|---|---|---|---|
| 8 | −68.081 | Variable | | |
| 9* | −16.000 | 0.70 | 1.85135 | 40.10 |
| 10 | −33.170 | Variable | | |
| 11* | 20.906 | 7.00 | 1.74320 | 49.34 |
| 12* | −31.117 | 1.00 | | |
| 13(Stop) | ∞ | 1.00 | | |
| 14 | 21.835 | 6.37 | 1.58313 | 59.38 |
| 15 | −17.045 | 0.70 | 1.92286 | 20.88 |
| 16 | 105.958 | 2.00 | | |
| 17 | 228.680 | 0.70 | 1.85135 | 40.10 |
| 18 | 18.365 | 7.00 | 1.58313 | 59.38 |
| 19* | −17.817 | Variable | | |
| 20 | −23.878 | 2.17 | 1.94595 | 17.98 |
| 21 | −17.364 | 1.38 | | |
| 22 | −44.133 | 1.80 | 1.63493 | 23.89 |
| 23 | −20.479 | 1.45 | | |
| 24 | −14.131 | 0.80 | 1.85135 | 40.10 |
| 25* | −444.327 | Variable | | |
| 26 | ∞ | 4.00 | 1.51633 | 64.14 |
| 27 | ∞ | 1.00 | | |
| Image plane (Image pickup surface) | ∞ | | | |

Aspherical surface data

4th surface k = 0.000
A4 = 1.43727e−05, A6 = −2.40711e−08, A8 = −3.26811e−12

5th surface k = 0.000
A4 = −5.05278e−06, A6 = 5.19509e−08

9th surface k = 0.000
A4 = 1.50774e−05, A6 = 8.87157e−08

11th surface k = 0.000
A4 = −1.13991e−05, A6 = 1.73714e−08, A8 = −5.50513e−11

12th surface k = 0.000
A4 = 2.89195e−05, A6 = −3.42677e−08

19th surface k = 0.000
A4 = 1.25540e−04, A6 = 6.48662e−08, A8 = 8.52262e−10

25th surface k = 0.000
A4 = −6.78469e−05, A6 = 1.24765e−07

Zoom data
Zoom ratio 2.88

| | WE | ST | TE |
|---|---|---|---|
| Focal length | 12.40 | 21.04 | 35.71 |
| Fno. | 1.80 | 2.20 | 2.42 |
| Angle of view 2ω | 91.78 | 55.08 | 33.61 |
| Image height | 11.00 | 11.00 | 11.00 |
| FB(in air) | 4.14 | 10.43 | 20.64 |
| Lens total length (in air) | 74.99 | 81.93 | 91.64 |
| d3 | 0.50 | 7.92 | 12.94 |
| d8 | 4.98 | 4.02 | 3.50 |
| d10 | 9.00 | 4.42 | 0.85 |
| d19 | 3.85 | 2.62 | 1.18 |
| d25 | 0.50 | 6.79 | 17.00 |

Unit focal length f1 = 71.81  f2 = −21.00  f3 = −37.00  f4 = 16.50  f5 = −44.84

Example 4

Unit mm

Surface data

| Surface no. | r | d | nd | vd |
|---|---|---|---|---|
| Object plane | ∞ | ∞ | | |
| 1 | 44.021 | 1.20 | 1.92286 | 20.88 |
| 2 | 28.240 | 6.82 | 1.72916 | 54.68 |
| 3 | 420.457 | Variable | | |
| 4* | 105.858 | 0.70 | 1.85135 | 40.10 |
| 5* | 12.174 | 5.17 | | |
| 6 | −229.834 | 0.70 | 1.85135 | 40.10 |
| 7 | 19.226 | 3.21 | 1.94595 | 17.98 |
| 8 | −110.413 | Variable | | |
| 9* | −16.000 | 0.70 | 1.85135 | 40.10 |
| 10 | −32.294 | Variable | | |
| 11(Stop) | ∞ | 1.20 | | |
| 12* | 18.179 | 6.70 | 1.74320 | 49.34 |
| 13* | −28.413 | 3.20 | | |
| 14 | 57.975 | 0.70 | 1.92286 | 20.88 |
| 15 | 11.506 | 3.90 | 1.58313 | 59.38 |
| 16 | 22.947 | 0.68 | | |
| 17* | 19.599 | 7.00 | 1.53071 | 55.69 |
| 18* | −16.419 | Variable | | |
| 19 | −54.476 | 2.24 | 1.92286 | 20.88 |
| 20 | −27.007 | 0.50 | | |
| 21* | −54.849 | 2.00 | 1.53071 | 55.69 |
| 22 | 106.919 | 4.81 | | |
| 23 | −12.578 | 0.80 | 1.85135 | 40.10 |
| 24* | −31.258 | Variable | | |
| 25 | ∞ | 4.00 | 1.51633 | 64.14 |
| 26 | ∞ | 1.00 | | |
| Image plane (Image pickup surface) | ∞ | | | |

Aspherical surface data

4th surface k = 0.000
A4 = 2.65935e−06, A6 = 2.58636e−08, A8 = −1.43797e−10

5th surface k = 0.000
A4 = −7.67951e−06, A6 = 6.98003e−08

9th surface k = 0.000
A4 = 1.61068e−05, A6 = 3.21198e−09

12th surface k = 0.000
A4 = −3.61258e−05, A6 = 9.64754e−08, A8 = −3.60710e−10

13th surface k = 0.000
A4 = 5.10546e−05, A6 = −4.63312e−08

17th surface k = 0.000
A4 = −5.18700e−07, A6 = 3.60189e−08, A8 = 9.28612e−11

18th surface k = 0.000
A4 = 8.85449e−05, A6 = 1.14899e−07, A8 = 2.05052e−10

21th surface k = 0.000
A4 = 7.76872e−05, A6 = 3.15103e−07

24th surface k = 0.000
A4 = 3.17750e−06, A6 = 1.87972e−07

-continued

| Unit mm | | | |
|---|---|---|---|
| Zoom data Zoom ratio 2.88 | | | |
| | WE | ST | TE |
| Focal length | 12.40 | 21.04 | 35.71 |
| Fno. | 1.80 | 2.20 | 2.42 |
| Angle of view 2ω | 91.78 | 54.52 | 33.61 |
| Image height | 11.00 | 11.00 | 11.00 |
| FB(in air) | 4.14 | 10.10 | 21.08 |
| Lens total length (in air) | 72.30 | 81.90 | 91.64 |
| d3 | 0.50 | 9.37 | 13.48 |
| d8 | 3.50 | 4.04 | 3.50 |
| d10 | 8.78 | 4.08 | 0.85 |
| d18 | 3.16 | 2.09 | 0.50 |
| d24 | 0.50 | 6.46 | 17.45 |

Unit focal length f1 = 79.49   f2 = −21.00   f3 = −38.00   f4 = 16.28   f5 = −27.83

Example 5

| Unit mm | | | | |
|---|---|---|---|---|
| Surface data | | | | |
| Surface no. | r | d | nd | vd |
| Object plane | ∞ | ∞ | | |
| 1 | 48.222 | 1.20 | 1.92286 | 20.88 |
| 2 | 38.174 | 5.51 | 1.72916 | 54.68 |
| 3 | 497.836 | Variable | | |
| 4 | 328.273 | 0.70 | 1.80610 | 40.92 |
| 5 | 14.018 | 5.32 | | |
| 6* | 77.529 | 0.70 | 1.85135 | 40.10 |
| 7* | 22.181 | 0.90 | | |
| 8 | 29.124 | 2.84 | 1.94595 | 17.98 |
| 9 | −656.103 | Variable | | |
| 10* | −16.079 | 0.70 | 1.85135 | 40.10 |
| 11 | −33.500 | Variable | | |
| 12(Stop) | ∞ | 1.20 | | |
| 13* | 20.113 | 7.00 | 1.74320 | 49.34 |
| 14* | −32.515 | 1.75 | | |
| 15 | 24.856 | 6.15 | 1.59201 | 67.02 |
| 16 | −17.819 | 0.70 | 1.92286 | 20.88 |
| 17 | −188.178 | 2.95 | | |
| 18 | −70.650 | 0.70 | 1.85135 | 40.10 |
| 19 | 14.828 | 6.24 | 1.58313 | 59.38 |
| 20* | −17.279 | Variable | | |
| 21 | −35.139 | 2.94 | 1.94595 | 17.98 |
| 22 | −17.515 | 1.99 | | |
| 23 | −13.833 | 0.80 | 1.85135 | 40.10 |
| 24* | −67.837 | Variable | | |
| 25 | ∞ | 4.00 | 1.51633 | 64.14 |
| 26 | ∞ | 1.00 | | |
| Image plane (Image pickup surface) | ∞ | | | |

Aspherical surface data

6th surface k = 0.000
A4 = −2.81467e−05, A6 = 3.09834e−07, A8 = −9.63665e−10
7th surface k = 0.000
A4 = −4.86669e−05, A6 = 3.31061e−07, A8 = −1.34659e−09
10th surface k = 0.000
A4 = 1.15730e−05, A6 = 2.74006e−08

-continued

| Unit mm |
|---|

13th surface k = 0.000
A4 = −1.70391e−05, A6 = 3.30338e−08, A8 = −7.73732e−11
14th surface k = 0.000
A4 = 2.69949e−05, A6 = −2.00715e−08
20th surface k = 0.000
A4 = 9.98703e−05, A6 = 2.72487e−08, A8 = 2.46088e−09
24th surface k = 0.000
A4 = −5.15230e−05, A6 = 6.99408e−08

| Zoom data Zoom ratio 2.88 | | | |
|---|---|---|---|
| | WE | ST | TE |
| Focal length | 12.40 | 21.00 | 35.71 |
| Fno. | 1.80 | 2.20 | 2.42 |
| Angle of view 2ω | 91.78 | 54.92 | 33.61 |
| Image height | 11.00 | 11.00 | 11.00 |
| FB (in air) | 4.14 | 10.14 | 21.32 |
| Lens total length (in air) | 76.64 | 82.82 | 91.64 |
| d3 | 0.50 | 9.21 | 13.74 |
| d9 | 7.82 | 4.71 | 3.50 |
| d11 | 8.82 | 4.70 | 0.85 |
| d20 | 5.06 | 3.77 | 1.93 |
| d24 | 0.50 | 6.50 | 17.68 |

Unit focal length f1 = 78.48   f2 = −22.85   f3 = −37.00   f4 = 16.60   f5 = −53.55

Example 6

| Unit mm | | | | |
|---|---|---|---|---|
| Surface data | | | | |
| Surface no. | r | d | nd | vd |
| Object plane | ∞ | ∞ | | |
| 1 | 37.936 | 1.20 | 1.92286 | 20.88 |
| 2 | 26.744 | 6.97 | 1.72916 | 54.68 |
| 3 | 246.381 | Variable | | |
| 4* | 2438.306 | 0.70 | 1.85135 | 40.10 |
| 5* | 12.762 | 5.83 | | |
| 6 | −75.676 | 0.70 | 1.85135 | 40.10 |
| 7 | 25.739 | 3.27 | 1.94595 | 17.98 |
| 8 | −51.365 | Variable | | |
| 9* | −16.000 | 0.70 | 1.85135 | 40.10 |
| 10 | −32.294 | Variable | | |
| 11* | 18.489 | 6.35 | 1.74320 | 49.34 |
| 12* | −27.460 | 1.31 | | |
| 13(Stop) | ∞ | 1.50 | | |
| 14 | 248.146 | 0.70 | 1.92286 | 20.88 |
| 15 | 15.000 | 3.75 | 1.58313 | 59.38 |
| 16 | −264.844 | 6.57 | | |
| 17 | 74.110 | 3.99 | 1.53071 | 55.69 |
| 18* | −16.014 | Variable | | |
| 19 | −29.733 | 1.94 | 1.92286 | 20.88 |
| 20 | −21.084 | 2.98 | | |
| 21 | −21.736 | 0.80 | 1.85135 | 40.10 |
| 22* | 88.298 | Variable | | |

-continued

| Unit mm | | | | |
|---|---|---|---|---|
| 23 | ∞ | 4.00 | 1.51633 | 64.14 |
| 24 | ∞ | 1.00 | | |
| Image plane (Image pickup surface) | ∞ | | | |

Aspherical surface data

4th surface k = 0.000
A4 = 1.55519e−05, A6 = −2.01240e−08, A8 = −1.90590e−11

5th surface k = 0.000
A4 = −9.23342e−06, A6 = 4.57495e−08

9th surface k = 0.000
A4 = 1.42525e−05, A6 = 8.27230e−08

11th surface k = 0.000
A4 = −3.61365e−05, A6 = 7.84645e−08, A8 = −2.68654e−10

12th surface k = 0.000
A4 = 4.68876e−05, A6 = −3.50232e−08

18th surface k = 0.000
A4 = 9.79441e−05, A6 = −8.38976e−08, A8 = 1.34820e−09

22th surface k = 0.000
A4 = −3.65371e−05, A6 = 1.20843e−07

Zoom data
Zoom ratio 2.88

| | WE | ST | TE |
|---|---|---|---|
| Focal length | 12.40 | 21.04 | 35.71 |
| Fno. | 1.80 | 2.20 | 2.42 |
| Angle of view 2ω | 91.78 | 54.97 | 33.61 |
| Image height | 11.00 | 11.00 | 11.00 |
| FB (in air) | 4.41 | 11.74 | 23.52 |
| Lens total length (in air) | 72.74 | 81.03 | 91.64 |
| d3 | 0.50 | 7.39 | 12.17 |
| d8 | 3.50 | 4.26 | 3.50 |
| d10 | 9.31 | 4.41 | 1.35 |
| d18 | 5.76 | 3.96 | 1.83 |
| d22 | 0.77 | 8.10 | 19.88 |

Unit focal length f1 = 69.04   f2 = −20.72   f3 = −38.00   f4 = 18.13   f5 = −29.17

Example 7

| Unit mm | | | | |
|---|---|---|---|---|
| Surface data | | | | |
| Surface no. | r | d | nd | vd |
| Object plane | ∞ | ∞ | | |
| 1 | 38.579 | 1.20 | 1.92286 | 20.88 |
| 2 | 28.391 | 6.77 | 1.72916 | 54.68 |
| 3 | 260.742 | Variable | | |
| 4* | −254.753 | 0.70 | 1.85135 | 40.10 |
| 5* | 13.117 | 5.89 | | |
| 6 | 173.291 | 3.20 | 1.94595 | 17.98 |
| 7 | −27.008 | 0.70 | 1.83481 | 42.71 |
| 8 | −185.400 | Variable | | |
| 9* | −16.000 | 0.70 | 1.85135 | 40.10 |
| 10 | −33.170 | Variable | | |
| 11* | 20.732 | 7.00 | 1.74320 | 49.34 |
| 12* | −31.687 | 1.00 | | |
| 13(Stop) | ∞ | 1.00 | | |
| 14 | 22.248 | 6.39 | 1.58313 | 59.38 |
| 15 | −16.656 | 0.70 | 1.92286 | 20.88 |
| 16 | 177.449 | 2.00 | | |
| 17 | −9100.541 | 0.70 | 1.85135 | 40.10 |
| 18 | 18.293 | 7.00 | 1.58313 | 59.38 |
| 19* | −17.226 | Variable | | |
| 20 | −23.885 | 2.38 | 1.94595 | 17.98 |
| 21 | −17.364 | 1.39 | | |
| 22 | −42.826 | 1.80 | 1.63493 | 23.89 |
| 23 | −21.908 | 1.46 | | |
| 24 | −14.714 | 0.80 | 1.85135 | 40.10 |
| 25* | −240.607 | Variable | | |
| 26 | ∞ | 4.00 | 1.51633 | 64.14 |
| 27 | ∞ | 1.00 | | |
| Image plane (Image pickup surface) | ∞ | | | |

Aspherical surface data

4th surface k = 0.000
A4 = 1.94028e−05, A6 = −3.65147e−08, A8 = 2.42880e−11

5th surface k = 0.000
A4 = −5.45404e−06, A6 = 4.40518e−08

9th surface k = 0.000
A4 = 1.36061e−05, A6 = 9.16295e−08

11th surface k = 0.000
A4 = −1.03446e−05, A6 = 2.17942e−08, A8 = −3.82013e−11

12th surface k = 0.000
A4 = 2.94461e−05, A6 = −2.63599e−08

19th surface k = 0.000
A4 = 1.29530e−04, A6 = 4.40349e−08, A8 = 1.17715e−09

25th surface k = 0.000
A4 = −6.86053e−05, A6 = 1.48065e−07

Zoom data
Zoom ratio 2.88

| | WE | ST | TE |
|---|---|---|---|
| Focal length | 12.40 | 21.65 | 35.71 |
| Fno. | 1.80 | 2.20 | 2.42 |
| Angle of view 2ω | 91.78 | 53.89 | 33.79 |
| Image height | 11.00 | 11.00 | 11.00 |
| FB (in air) | 4.14 | 10.74 | 20.96 |
| Lens total length (in air) | 75.85 | 82.52 | 90.78 |
| d3 | 0.50 | 8.07 | 11.80 |
| d8 | 5.49 | 4.17 | 3.50 |
| d10 | 9.28 | 4.43 | 0.85 |
| d19 | 3.67 | 2.34 | 0.89 |
| d25 | 0.50 | 7.10 | 17.33 |

Unit focal length f1 = 68.33   f2 = −21.00   f3 = −37.00   f4 = 16.59   f5 = −47.63

Example 8

Unit mm

Surface data

| Surface no. | r | d | nd | vd |
|---|---|---|---|---|
| Object plane | ∞ | ∞ | | |
| 1 | 46.908 | 1.20 | 1.92286 | 20.88 |
| 2 | 43.931 | 4.48 | 1.72916 | 54.68 |
| 3 | 642.947 | Variable | | |
| 4* | −118.552 | 0.70 | 1.85135 | 40.10 |
| 5* | 13.345 | 6.37 | | |
| 6* | 113.708 | 2.56 | 2.00170 | 20.60 |
| 7* | −51.181 | Variable | | |
| 8* | −18.250 | 1.11 | 1.85135 | 40.10 |
| 9 | −60.808 | Variable | | |
| 10(Stop) | ∞ | 1.20 | | |
| 11* | 18.951 | 6.62 | 1.74320 | 49.34 |
| 12* | −50.870 | 3.85 | | |
| 13 | 27.994 | 6.42 | 1.59201 | 67.02 |
| 14 | −14.905 | 0.70 | 1.92286 | 20.88 |
| 15 | −69.043 | 1.86 | | |
| 16 | −78.909 | 0.70 | 1.85135 | 40.10 |
| 17 | 14.281 | 6.36 | 1.58313 | 59.38 |
| 18* | −18.294 | Variable | | |
| 19 | −66.732 | 3.55 | 1.94595 | 17.98 |
| 20 | −18.436 | 0.81 | | |
| 21 | −15.123 | 0.80 | 1.85135 | 40.10 |
| 22* | −179.930 | Variable | | |
| 23 | ∞ | 4.00 | 1.51633 | 64.14 |
| 24 | ∞ | 1.00 | | |
| Image plane (Image pickup surface) | ∞ | | | |

Aspherical surface data

4th surface k = 0.000
A4 = 3.39711e−05, A6 = −1.17508e−07, A8 = 1.57393e−10

5th surface k = 0.000
A4 = 5.97555e−06, A6 = 1.30513e−07

6th surface k = 0.000
A4 = −3.25517e−06, A6 = −6.64755e−09, A8 = 3.15978e−10

7th surface k = 0.000
A4 = −9.90464e−06, A6 = −6.80720e−08

8th surface k = 0.000
A4 = 1.28033e−05, A6 = 6.52437e−08

11th surface k = 0.000
A4 = −1.22332e−05, A6 = 8.69958e−09, A8 = 7.15023e−12

12th surface k = 0.000
A4 = 2.27748e−05, A6 = −2.40824e−08

18th surface k = 0.000
A4 = 1.02765e−04, A6 = −2.95451e−08, A8 = 2.16311e−09

22th surface k = 0.000
A4 = −5.61994e−05, A6 = 7.26066e−08

Unit mm

Zoom data
Zoom ratio 2.88

| | WE | ST | TE |
|---|---|---|---|
| Focal length | 12.40 | 21.04 | 35.71 |
| Fno. | 1.80 | 2.20 | 2.42 |
| Angle of view 2ω | 91.78 | 54.69 | 33.61 |
| Image height | 11.00 | 11.00 | 11.00 |
| FB (in air) | 4.14 | 12.68 | 23.70 |
| Lens total length (in air) | 76.64 | 83.69 | 91.64 |
| d3 | 0.50 | 7.93 | 12.44 |
| d7 | 3.50 | 4.31 | 3.50 |
| d9 | 13.21 | 6.29 | 0.85 |
| d18 | 5.99 | 3.18 | 1.86 |
| d22 | 0.50 | 9.04 | 20.06 |

Unit focal length f1 = 70.21   f2 = −35.26   f3 = −31.00   f4 = 18.17   f5 = −78.19

Example 9

Unit mm

Surface data

| Surface no. | r | d | nd | vd |
|---|---|---|---|---|
| Object plane | ∞ | ∞ | | |
| 1 | 35.584 | 5.45 | 1.49700 | 81.61 |
| 2 | 337.853 | Variable | | |
| 3* | 95.496 | 0.70 | 1.85135 | 40.10 |
| 4* | 12.588 | 7.63 | | |
| 5 | −34.254 | 0.70 | 1.83481 | 42.71 |
| 6 | −972.836 | 2.29 | 1.94595 | 17.98 |
| 7 | −32.533 | Variable | | |
| 8* | −16.000 | 0.70 | 1.85135 | 40.10 |
| 9 | −33.171 | Variable | | |
| 10(Stop) | ∞ | 1.20 | | |
| 11* | 21.932 | 6.55 | 1.74320 | 49.34 |
| 12* | −31.482 | 0.50 | | |
| 13 | 16.592 | 7.00 | 1.49700 | 81.61 |
| 14 | −21.663 | 0.70 | 1.84666 | 23.78 |
| 15 | 86.054 | 2.00 | | |
| 16 | −4928.515 | 0.70 | 1.85135 | 40.10 |
| 17 | 11.226 | 7.00 | 1.58313 | 59.38 |
| 18* | −20.445 | Variable | | |
| 19 | −43.014 | 3.25 | 1.92286 | 20.88 |
| 20 | −17.608 | 1.85 | | |
| 21 | −13.818 | 0.80 | 1.85135 | 40.10 |
| 22* | −56.995 | Variable | | |
| 23 | ∞ | 4.00 | 1.51633 | 64.14 |
| 24 | ∞ | 1.00 | | |
| Image plane (Image pickup surface) | ∞ | | | |

Aspherical surface data

3rd surface k = 0.000
A4 = 7.07752e−06, A6 = −1.37255e−08, A8 = −1.48761e−11

4th surface k = 0.000
A4 = 1.81161e−06, A6 = 7.45026e−08

8th surface k = 0.000
A4 = 1.87518e−05, A6 = 9.16393e−08

-continued

Unit mm

11th surface k = 0.000
A4 = −5.56716e−06, A6 = 2.79877e−08, A8 = −4.45588e−11

12th surface k = 0.000
A4 = 2.98246e−05, A6 = −1.94313e−08

18th surface k = 0.000
A4 = 8.01803e−05, A6 = 1.45857e−07, A8 = 9.98590e−10

22th surface k = 0.000
A4 = −4.46427e−05, A6 = −2.33168e−08

Zoom data
Zoom ratio 2.88

|  | WE | ST | TE |
|---|---|---|---|
| Focal length | 12.20 | 20.70 | 35.14 |
| Fno. | 1.80 | 2.20 | 2.42 |
| Angle of view 2ω | 92.17 | 56.76 | 34.54 |
| Image height | 11.00 | 11.00 | 11.00 |
| FB (in air) | 4.14 | 11.41 | 24.01 |
| Lens total length (in air) | 75.50 | 84.23 | 94.64 |
| d2 | 0.50 | 10.19 | 15.03 |
| d7 | 6.68 | 4.48 | 3.50 |
| d9 | 8.36 | 4.46 | 0.85 |
| d18 | 6.81 | 4.68 | 2.23 |
| d22 | 0.50 | 7.77 | 20.38 |

Unit focal length f1 = 79.55    f2 = −21.00    f3 = −37.00    f4 = 16.29    f5 = −80.00

Example 10

Unit mm
Surface data

| Surface no. | r | d | nd | νd |
|---|---|---|---|---|
| Object plane | ∞ | ∞ | | |
| 1 | 38.843 | 1.20 | 1.92286 | 20.88 |
| 2 | 27.649 | 6.73 | 1.72916 | 54.68 |
| 3 | 224.046 | Variable | | |
| 4* | 102.187 | 0.70 | 1.85135 | 40.10 |
| 5* | 11.666 | 5.31 | | |
| 6 | 557.012 | 0.70 | 1.85135 | 40.10 |
| 7 | 19.420 | 2.94 | 1.94595 | 17.98 |
| 8 | −479.574 | Variable | | |
| 9* | −16.000 | 0.70 | 1.85135 | 40.10 |
| 10 | −32.293 | Variable | | |
| 11(Stop) | ∞ | 1.20 | | |
| 12* | 19.204 | 6.90 | 1.74320 | 49.34 |
| 13* | −35.869 | 1.61 | | |
| 14 | 29.056 | 6.22 | 1.61772 | 49.81 |
| 15 | −15.477 | 0.70 | 1.92286 | 20.88 |
| 16 | 64.476 | 3.20 | | |
| 17* | 124.430 | 4.11 | 1.53071 | 55.69 |
| 18* | −18.090 | Variable | | |
| 19 | −46.065 | 3.50 | 1.92286 | 20.88 |
| 20 | −20.920 | 2.98 | | |
| 21 | −17.617 | 0.80 | 1.85135 | 40.10 |
| 22* | 2147.238 | Variable | | |
| 23 | ∞ | 4.00 | 1.51633 | 64.14 |
| 24 | ∞ | 1.00 | | |
| Image plane (Image pickup surface) | ∞ | | | |

Aspherical surface data

4th surface k = 0.000
A4 = 6.55986e−06, A6 = −8.11138e−09, A8 = −4.75807e−11

5th surface k = 0.000
A4 = −5.19027e−06, A6 = 4.10342e−08

9th surface k = 0.000
A4 = 1.81775e−05, A6 = 8.44383e−08

12th surface k = 0.000
A4 = −1.23181e−05, A6 = 3.20050e−08, A8 = −9.59551e−12

13th surface k = 0.000
A4 = 3.06649e−05, A6 = −3.23801e−08

17th surface k = 0.000
A4 = −1.31977e−05, A6 = −9.89665e−08

18th surface k = 0.000
A4 = 1.01527e−04, A6 = −8.28177e−08, A8 = 2.67680e−09

22th surface k = 0.000
A4 = −3.40514e−05, A6 = 8.35220e−08

Zoom data
Zoom ratio 2.88

|  | WE | ST | TE |
|---|---|---|---|
| Focal length | 12.40 | 21.04 | 35.71 |
| Fno. | 1.80 | 2.20 | 2.42 |
| Angle of view 2ω | 91.77 | 55.16 | 33.72 |
| Image height | 11.00 | 11.00 | 11.00 |
| FB (in air) | 4.14 | 11.36 | 24.31 |
| Lens total length (in air) | 72.99 | 81.72 | 91.64 |
| d3 | 0.50 | 8.82 | 12.44 |
| d8 | 4.09 | 3.90 | 3.50 |
| d10 | 8.58 | 4.32 | 0.85 |
| d18 | 6.18 | 3.84 | 1.04 |
| d22 | 0.50 | 7.72 | 20.67 |

Unit focal length f1 = 72.13    f2 = −18.91    f3 = −38.00    f4 = 16.37    f5 = −47.43

Example 11

Unit mm
Surface data

| Surface no. | r | d | nd | νd |
|---|---|---|---|---|
| Object plane | ∞ | ∞ | | |
| 1 | 44.447 | 1.20 | 1.92286 | 20.88 |
| 2 | 32.825 | 6.11 | 1.72916 | 54.68 |
| 3 | 338.148 | Variable | | |

-continued

Unit mm

| | | | | |
|---|---|---|---|---|
| 4* | 151.424 | 0.70 | 1.85135 | 40.10 |
| 5* | 12.784 | 5.56 | | |
| 6 | 2001.102 | 0.70 | 1.83481 | 42.71 |
| 7 | 24.980 | 2.87 | 1.94595 | 17.98 |
| 8 | −206.033 | Variable | | |
| 9* | −16.048 | 0.70 | 1.85135 | 40.10 |
| 10 | −33.370 | Variable | | |
| 11(Stop) | ∞ | 1.20 | | |
| 12* | 19.596 | 6.67 | 1.74320 | 49.34 |
| 13* | −31.442 | 1.72 | | |
| 14 | 35.539 | 5.59 | 1.58313 | 59.38 |
| 15 | −16.056 | 0.70 | 1.92286 | 20.88 |
| 16 | −466.910 | 3.62 | | |
| 17 | −225.182 | 0.70 | 1.85135 | 40.10 |
| 18 | 29.127 | 4.46 | 1.58313 | 59.38 |
| 19* | −17.634 | Variable | | |
| 20 | −28.396 | 2.54 | 1.94595 | 17.98 |
| 21 | −17.821 | 3.24 | | |
| 22 | −14.575 | 0.80 | 1.85135 | 40.10 |
| 23* | −58.395 | Variable | | |
| 24 | ∞ | 4.00 | 1.51633 | 64.14 |
| 25 | ∞ | 1.00 | | |
| Image plane (Image pickup surface) | ∞ | | | |

Aspherical surface data

4th surface k = 0.000
A4 = 8.34146e−06, A6 = −1.00017e−08, A8 = −4.26973e−11

5th surface k = 0.000
A4 = −1.35875e−06, A6 = 9.16672e−08

9th surface k = 0.000
A4 = 2.00032e−05, A6 = 7.65388e−08

12th surface k = 0.000
A4 = −1.70494e−05, A6 = 4.69254e−08, A8 = −8.85739e−11

13th surface k = 0.000
A4 = 3.29567e−05, A6 = −3.76456e−08

19th surface k = 0.000
A4 = 8.88706e−05, A6 = 1.05712e−07, A8 = 2.16724e−09

23th surface k = 0.000
A4 = −3.81725e−05, A6 = 4.56495e−08

Zoom data
Zoom ratio 2.88

| | WE | ST | TE |
|---|---|---|---|
| Focal length | 12.40 | 21.04 | 35.71 |
| Fno. | 1.80 | 2.20 | 2.42 |
| Angle of view 2ω | 91.78 | 55.60 | 33.77 |
| Image height | 11.00 | 11.00 | 11.00 |
| FB (in air) | 4.14 | 11.21 | 22.68 |
| Lens total length (in air) | 74.12 | 80.44 | 91.64 |
| d3 | 0.50 | 7.51 | 13.33 |
| d8 | 5.66 | 4.01 | 3.50 |
| d10 | 8.83 | 4.28 | 0.85 |
| d19 | 5.91 | 4.34 | 2.20 |
| d23 | 0.50 | 7.57 | 19.04 |

Unit focal length f1 = 77.37   f2 = −21.00   f3 = −37.00   f4 = 16.62   f5 = −49.24

Example 12

Unit mm

Surface data

| Surface no. | r | d | nd | vd |
|---|---|---|---|---|
| Object plane | ∞ | ∞ | | |
| 1 | 57.828 | 0.80 | 1.85026 | 32.27 |
| 2 | 40.397 | 3.00 | 1.49700 | 81.54 |
| 3 | 131.245 | Variable | | |
| 4 | −1143.650 | 1.00 | 1.72903 | 54.04 |
| 5 | 12.308 | 4.13 | | |
| 6 | 14.638 | 2.28 | 1.63493 | 23.90 |
| 7 | 23.825 | Variable | | |
| 8* | 10.979 | 3.35 | 1.74320 | 49.34 |
| 9* | 140.486 | 1.00 | | |
| 10 (Stop) | ∞ | 1.00 | | |
| 11 | 36.575 | 0.80 | 1.90366 | 31.32 |
| 12 | 7.739 | 4.11 | 1.49700 | 81.61 |
| 13 | −11.792 | Variable | | |
| 14* | −20.401 | 2.58 | 1.63493 | 23.90 |
| 15* | −11.697 | 2.50 | | |
| 16* | −8.584 | 1.00 | 1.53071 | 55.69 |
| 17* | 40.689 | Variable | | |
| 18 | ∞ | 3.00 | 1.51633 | 64.14 |
| 19 | ∞ | 1.00 | | |
| Image plane (Image pickup surface) | ∞ | | | |

Aspherical surface data

8th surface k = 0.000
A4 = −2.69474e−05, A6 = 1.34978e−07

9th surface k = 0.225
A4 = 1.34693e−04, A6 = 8.09853e−07

14th surface k = 0.000
A4 = 9.07844e−05, A6 = 1.71338e−06

15th surface k = 0.000
A4 = 1.53936e−04, A6 = −1.18712e−06, A8 = −2.23432e−09

16th surface k = 0.000
A4 = 8.22560e−06, A6 = −3.19814e−06

17th surface k = 0.000
A4 = −1.39032e−04, A6 = 8.36251e−07

Zoom data
Zoom ratio 2.82

| | WE | ST | TE |
|---|---|---|---|
| Focal length | 14.75 | 24.77 | 41.59 |
| Fno. | 3.60 | 4.80 | 5.80 |
| Angle of view 2ω | 81.03 | 48.95 | 29.59 |
| Image height | 11.15 | 11.15 | 11.15 |
| FB (in air) | 5.56 | 16.89 | 26.16 |
| Lens total length (in air) | 52.48 | 58.51 | 66.75 |
| d3 | 0.70 | 4.20 | 10.46 |
| d7 | 12.99 | 8.06 | 0.70 |
| d13 | 5.69 | 1.81 | 1.88 |
| d17 | 2.58 | 13.92 | 23.18 |

Unit focal length f1 = 435.38   f2 = −25.49   f3 = 14.50   f4 = −20.75

Example 13

Unit mm

Surface data

| Surface no. | r | d | nd | νd |
|---|---|---|---|---|
| Object plane | ∞ | ∞ | | |
| 1 | 105.621 | 0.70 | 1.94595 | 17.98 |
| 2 | 28.115 | 3.88 | 1.72916 | 54.68 |
| 3 | −111.239 | Variable | | |
| 4 | −91.283 | 0.70 | 1.91082 | 35.25 |
| 5 | 15.638 | 4.06 | | |
| 6* | 222.881 | 0.70 | 1.80610 | 40.92 |
| 7* | 41.464 | 0.50 | | |
| 8 | 21.455 | 3.92 | 1.92286 | 20.88 |
| 9 | −45.762 | Variable | | |
| 10* | −18.557 | 0.90 | 1.74320 | 49.34 |
| 11 | 297.270 | Variable | | |
| 12 | 14.303 | 2.38 | 1.55332 | 71.68 |
| 13 | −46.278 | 0.50 | | |
| 14 | 13.467 | 2.65 | 1.49700 | 81.61 |
| 15 | −21.031 | 0.70 | 1.90366 | 31.32 |
| 16 | 79.439 | 1.00 | | |
| 17 (Stop) | ∞ | 3.12 | | |
| 18* | 21.799 | 4.50 | 1.58313 | 59.38 |
| 19 | −8.227 | 1.20 | 1.80400 | 46.57 |
| 20 | −47.738 | Variable | | |
| 21 | −7.628 | 0.70 | 1.72916 | 54.68 |
| 22 | −17.465 | Variable | | |
| 23 | ∞ | 3.50 | 1.51633 | 64.14 |
| 24 | ∞ | 1.00 | | |
| Image plane (Image pickup surface) | ∞ | | | |

Aspherical surface data

6th surface  
k = 0.000  
A4 = −2.86787e−05, A6 = 6.42771e−07, A8 = 1.41627e−10  
7th surface  
k = 0.000  
A4 = −3.62299e−05, A6 = 5.99754e−07  
10th surface  
k = 0.000  
A4 = −8.77871e−06, A6 = 1.62821e−07  
18th surface  
k = 0.000  
A4 = −4.75946e−05, A6 = 5.71600e−07, A8 = −1.37680e−08, A10 = 8.46515e−10

Zoom data  
Zoom ratio 2.88

| | WE | ST | TE |
|---|---|---|---|
| Focal length | 14.40 | 24.10 | 41.47 |
| Fno. | 3.63 | 4.60 | 5.78 |
| Angle of view 2ω | 79.30 | 48.44 | 29.21 |
| Image height | 11.00 | 11.00 | 11.00 |
| FB(in air) | 3.81 | 9.87 | 20.76 |
| Lens total length(in air) | 59.81 | 62.79 | 71.81 |
| d3 | 0.50 | 2.46 | 3.65 |
| d9 | 4.06 | 4.85 | 5.70 |
| d11 | 10.35 | 4.95 | 1.50 |
| d20 | 8.99 | 8.56 | 8.09 |
| d22 | 0.50 | 6.56 | 17.46 |

Unit focal length f1 = 128.45  f2 = −387.63  f3 = −23.47  f4 = 14.27  f5 = −19.15

Example 14

Unit mm

Surface data

| Surface no. | r | d | nd | νd |
|---|---|---|---|---|
| Object plane | ∞ | ∞ | | |
| 1 | 41.908 | 1.20 | 1.92286 | 20.88 |
| 2 | 31.848 | 6.19 | 1.72916 | 54.68 |
| 3 | 264.433 | Variable | | |
| 4* | 286.522 | 0.70 | 1.85135 | 40.10 |
| 5* | 12.657 | 5.86 | | |
| 6 | −59.905 | 0.70 | 1.83481 | 42.71 |
| 7 | 33.678 | 2.46 | 1.94595 | 17.98 |
| 8 | −82.685 | Variable | | |
| 9* | −17.000 | 0.70 | 1.85135 | 40.10 |
| 10 | −86.064 | 0.50 | | |
| 11 | 116.906 | 1.56 | 1.90366 | 31.32 |
| 12 | −73.180 | Variable | | |
| 13 (Stop) | ∞ | 1.20 | | |
| 14* | 18.074 | 6.66 | 1.74320 | 49.34 |
| 15* | −43.085 | 2.36 | | |
| 16 | 31.719 | 5.36 | 1.58313 | 59.38 |
| 17 | −17.702 | 0.70 | 1.92286 | 20.88 |
| 18 | 263.171 | 0.58 | | |
| 19 | −173.828 | 0.70 | 1.85135 | 40.10 |
| 20 | 27.138 | 6.81 | 1.58313 | 59.38 |
| 21* | −15.157 | Variable | | |
| 22 | −34.349 | 4.60 | 1.94595 | 17.98 |
| 23 | −20.534 | 1.01 | | |
| 24* | −22.657 | 0.80 | 1.85135 | 40.10 |
| 25* | 327.601 | Variable | | |
| 26 | ∞ | 4.00 | 1.51633 | 64.14 |
| 27 | ∞ | 1.00 | | |
| Image plane (Image pickup surface) | ∞ | | | |

Aspherical surface data

4th surface  
k = 0.000  
A4 = 1.48792e−05, A6 = −1.30631e−08, A8 = −3.69361e−11  
5th surface  
k = 0.000  
A4 = −7.24730e−06, A6 = 1.03720e−07  
9th surface  
k = 0.000  
A4 = −4.15466e−06, A6 = 1.45187e−08  
14th surface  
k = 0.000  
A4 = −1.00368e−05, A6 = 1.36206e−09, A8 = 6.60413e−11  
15th surface  
k = 0.000  
A4 = 3.34876e−05, A6 = −2.98206e−08  
21th surface  
k = 0.000  
A4 = 1.58836e−04, A6 = −4.75860e−07, A8 = 4.52794e−09  
24th surface  
k = 0.000  
A4 = −8.26162e−05, A6 = −2.59457e−07  
25th surface  
k = 0.000  
A4 = −1.24181e−04, A6 = 2.75686e−07

-continued

| Unit mm |
|---|

| Zoom data Zoom ratio 2.88 | | | |
|---|---|---|---|
| | WE | ST | TE |
| Focal length | 12.40 | 21.04 | 35.71 |
| Fno. | 1.80 | 2.20 | 2.42 |
| Angle of view 2ω | 91.78 | 55.68 | 33.61 |
| Image height | 11.00 | 11.00 | 11.00 |
| FB (in air) | 13.64 | 19.86 | 29.51 |
| Lens total length (in air) | 83.12 | 89.97 | 101.64 |
| d3 | 0.50 | 8.97 | 16.64 |
| d8 | 8.00 | 4.78 | 3.50 |
| d12 | 9.07 | 4.61 | 0.85 |
| d21 | 1.27 | 1.11 | 0.50 |
| d25 | 10.00 | 16.23 | 25.87 |

| Unit focal length |
|---|
| f1 = 74.29  f2 = −16.26  f3 = −53.15  f4 = 17.01  f5 = −48.99 |

Example 15

| Unit mm | | | | |
|---|---|---|---|---|
| Surface data | | | | |
| Surface no. | r | d | nd | vd |
| Object plane | ∞ | ∞ | | |
| 1 | 40.392 | 1.20 | 1.92286 | 20.88 |
| 2 | 28.702 | 6.51 | 1.72916 | 54.68 |
| 3 | 241.745 | Variable | | |
| 4* | 96.396 | 0.70 | 1.85135 | 40.10 |
| 5* | 11.676 | 4.42 | | |
| 6 | 41.677 | 0.70 | 1.85135 | 40.10 |
| 7 | 15.694 | 2.45 | 1.94595 | 17.98 |
| 8 | 36.533 | Variable | | |
| 9 | −68.807 | 1.39 | 1.92286 | 20.88 |
| 10 | −28.545 | 0.94 | | |
| 11* | −16.000 | 0.70 | 1.85135 | 40.10 |
| 12 | −49.642 | Variable | | |
| 13 (Stop) | ∞ | 1.20 | | |
| 14* | 18.434 | 6.67 | 1.74320 | 49.34 |
| 15* | −39.884 | 1.65 | | |
| 16 | 27.347 | 5.80 | 1.61772 | 49.81 |
| 17 | −15.853 | 0.70 | 1.92286 | 20.88 |
| 18 | 54.043 | 2.48 | | |
| 19* | 139.350 | 4.50 | 1.53071 | 55.69 |
| 20* | −18.042 | Variable | | |
| 21 | −42.071 | 3.39 | 1.92286 | 20.88 |
| 22 | −20.169 | 2.90 | | |
| 23 | −16.690 | 0.80 | 1.85135 | 40.10 |
| 24* | −319.860 | Variable | | |
| 25 | ∞ | 4.00 | 1.51633 | 64.14 |
| 26 | ∞ | 1.00 | | |
| Image plane (Image pickup surface) | ∞ | | | |

| Aspherical surface data |
|---|
| 4th surface |
| k = 0.000 |
| A4 = 1.82413e−06, A6 = −3.18040e−09, A8 = −2.89705e−11 |
| 5th surface |
| k = 0.000 |
| A4 = −3.38058e−06, A6 = 7.71621e−09 |
| 11th surface |
| k = 0.000 |
| A4 = 2.94045e−05, A6 = 1.29390e−07 |

-continued

| Unit mm |
|---|
| 14th surface |
| k = 0.000 |
| A4 = −1.09203e−05, A6 = 3.27818e−08, A8 = 2.32571e−12 |
| 15th surface |
| k = 0.000 |
| A4 = 3.25035e−05, A6 = −3.94221e−08 |
| 19th surface |
| k = 0.000 |
| A4 = −1.88641e−05, A6 = −2.39225e−07 |
| 20th surface |
| k = 0.000 |
| A4 = 1.01467e−04, A6 = −1.50773e−07, A8 = 3.16271e−09 |
| 24th surface |
| k = 0.000 |
| A4 = −3.20227e−05, A6 = 8.74368e−08 |

| Zoom data Zoom ratio 2.88 | | | |
|---|---|---|---|
| | WE | ST | TE |
| Focal length | 12.40 | 21.04 | 35.71 |
| Fno. | 1.80 | 2.20 | 2.42 |
| Angle of view 2ω | 91.78 | 55.10 | 33.71 |
| Image height | 11.00 | 11.00 | 11.00 |
| FB (in air) | 4.14 | 11.25 | 24.35 |
| Lens total length (in air) | 73.07 | 81.65 | 91.64 |
| d3 | 0.50 | 8.92 | 12.72 |
| d8 | 4.19 | 3.95 | 3.50 |
| d12 | 8.74 | 4.28 | 0.85 |
| d20 | 6.42 | 4.16 | 1.12 |
| d24 | 0.50 | 7.62 | 20.72 |

| Unit focal length |
|---|
| f1 = 74.60  f2 = −15.53  f3 = −61.33  f4 = 16.21  f5 = −47.59 |

Example 16

| Unit mm | | | | |
|---|---|---|---|---|
| Surface data | | | | |
| Surface no. | r | d | nd | vd |
| Object plane | ∞ | ∞ | | |
| 1 | 39.968 | 1.20 | 1.92286 | 20.88 |
| 2 | 31.467 | 6.29 | 1.72916 | 54.68 |
| 3 | 214.592 | Variable | | |
| 4* | 193.367 | 0.70 | 1.85135 | 40.10 |
| 5* | 11.616 | 6.91 | | |
| 6 | −58.037 | 0.70 | 1.83481 | 42.71 |
| 7 | 52.279 | 3.46 | 1.94595 | 17.98 |
| 8 | −40.732 | Variable | | |
| 9* | −16.000 | 0.70 | 1.85135 | 40.10 |
| 10 | −33.170 | Variable | | |
| 11 (Stop) | ∞ | 1.20 | | |
| 12* | 17.935 | 6.55 | 1.74320 | 49.34 |
| 13* | −42.043 | 2.39 | | |
| 14 | 37.515 | 5.57 | 1.58313 | 59.38 |
| 15 | −15.643 | 0.70 | 1.92286 | 20.88 |
| 16 | 210.160 | 0.68 | | |
| 17 | −2190.331 | 0.70 | 1.85135 | 40.10 |
| 18 | 31.667 | 5.98 | 1.58313 | 59.38 |
| 19* | −16.363 | Variable | | |
| 20 | −28.878 | 3.95 | 1.94595 | 17.98 |
| 21 | −18.301 | 1.92 | | |
| 22* | −19.306 | 0.80 | 1.85135 | 40.10 |

-continued

| Unit mm | | | | |
|---|---|---|---|---|
| 23* | −89.476 | Variable | | |
| 24 | ∞ | 4.00 | 1.51633 | 64.14 |
| 25 | ∞ | 1.00 | | |
| Image plane (Image pickup surface) | ∞ | | | |

Aspherical surface data

4th surface k = 0.000
A4 = 1.12228e−05, A6 = −3.01217e−09, A8 = −4.98725e−11
5th surface k = 0.000
A4 = −1.11534e−05, A6 = 8.30052e−08
9th surface k = 0.000
A4 = 1.95366e−05, A6 = 1.35081e−07
12th surface k = 0.000
A4 = −1.14615e−05, A6 = 1.46739e−08, A8 = 3.41441e−11
13th surface k = 0.000
A4 = 3.51478e−05, A6 = −4.11266e−08
19th surface k = 0.000
A4 = 1.26189e−04, A6 = −1.57920e−07, A8 = 3.27032e−09
22th surface k = 0.000
A4 = −7.20692e−05, A6 = −8.40782e−08
23th surface k = 0.000
A4 = −1.02605e−04, A6 = 2.38304e−07

Zoom data
Zoom ratio 2.88

| | WE | ST | TE |
|---|---|---|---|
| Focal length | 12.40 | 21.04 | 35.71 |
| Fno. | 1.80 | 2.20 | 2.42 |
| Angle of view 2ω | 91.78 | 55.63 | 33.61 |
| Image height | 11.00 | 11.00 | 11.00 |
| FB (in air) | 13.64 | 20.20 | 30.00 |
| Lens total length (in air) | 81.46 | 89.29 | 101.64 |
| d3 | 0.50 | 8.88 | 16.40 |
| d8 | 5.13 | 3.68 | 3.50 |
| d10 | 10.60 | 5.10 | 0.85 |
| d19 | 1.21 | 1.04 | 0.50 |
| d23 | 10.00 | 16.56 | 26.36 |

Unit focal length f1 = 72.02   f2 = −20.76   f3 = −37.00   f4 = 17.03   f5 = −77.32

Example 17

| Unit mm | | | | |
|---|---|---|---|---|
| Surface data | | | | |
| Surface no. | r | d | nd | vd |
| Object plane | ∞ | ∞ | | |
| 1 | 38.618 | 1.20 | 1.92286 | 20.88 |
| 2 | 29.205 | 6.45 | 1.72916 | 54.68 |

-continued

| Unit mm | | | | |
|---|---|---|---|---|
| 3 | 205.845 | Variable | | |
| 4* | −778.609 | 0.70 | 1.85135 | 40.10 |
| 5* | 13.624 | 5.55 | | |
| 6 | 52.000 | 1.80 | 1.94595 | 17.98 |
| 7 | 107.069 | Variable | | |
| 8* | −15.232 | 0.70 | 1.74320 | 49.34 |
| 9 | −339.259 | 1.68 | 1.92286 | 20.88 |
| 10 | −32.126 | Variable | | |
| 11 (Stop) | ∞ | 1.20 | | |
| 12* | 16.916 | 6.63 | 1.74320 | 49.34 |
| 13* | −70.558 | 3.78 | | |
| 14 | 31.517 | 5.73 | 1.61772 | 49.81 |
| 15 | −13.890 | 0.70 | 1.92286 | 20.88 |
| 16 | 47.878 | 1.13 | | |
| 17* | 63.683 | 5.30 | 1.53071 | 55.69 |
| 18* | −17.946 | Variable | | |
| 19 | −69.750 | 3.01 | 1.92286 | 20.88 |
| 20 | −21.079 | 1.48 | | |
| 21 | −18.252 | 0.80 | 1.85135 | 40.10 |
| 22* | 183.245 | Variable | | |
| 23 | ∞ | 4.00 | 1.51633 | 64.14 |
| 24 | ∞ | 1.00 | | |
| Image plane (Image pickup surface) | ∞ | | | |

Aspherical surface data 4 4th surface k = 0.000
A4 = 2.21273e−05, A6 = −2.85973e−08, A8 = 1.08543e−11
5th surface k = 0.000
A4 = −6.17294e−06, A6 = 8.78619e−08
8th surface k = 0.000
A4 = 7.74790e−06, A6 = 3.81038e−08
12th surface k = 0.000
A4 = −9.99971e−06, A6 = 6.18210e−09, A8 = 5.25518e−11
13th surface k = 0.000
A4 = 2.65402e−05, A6 = −2.45205e−08
17th surface k = 0.000
A4 = −4.85902e−05, A6 = −2.59755e−07
18th surface k = 0.000
A4 = 8.54609e−05, A6 = −2.67967e−07, A8 = 4.65433e−09
22th surface k = 0.000
A4 = −2.71331e−05, A6 = 1.85901e−08

Zoom data
Zoom ratio 2.88

| | WE | ST | TE |
|---|---|---|---|
| Focal length | 12.40 | 20.96 | 35.71 |
| Fno. | 1.80 | 2.20 | 2.42 |
| Angle of view 2ω | 91.78 | 55.33 | 33.61 |
| Image height | 11.00 | 11.00 | 11.00 |
| FB (in air) | 4.14 | 11.50 | 24.20 |
| Lens total length (in air) | 76.30 | 83.46 | 91.64 |

-continued

| Unit mm | | | |
|---|---|---|---|
| d3 | 0.50 | 8.21 | 12.96 |
| d7 | 4.80 | 6.33 | 4.80 |
| d10 | 11.93 | 4.88 | 0.85 |
| d18 | 7.10 | 4.70 | 1.00 |
| d22 | 0.50 | 7.86 | 20.57 |

Unit focal length f1 = 70.90   f2 = −19.51   f3 = −53.18   f4 = 17.85   f5 = −53.94

Next, values of conditional expressions (1) to (9) in each example are given below. '-' (hyphen) indicates that there is no corresponding value.

| Conditional expression | Example 1 | Example 2 | Example 3 | Example 4 |
|---|---|---|---|---|
| (1) $(\beta_{lt}/\beta_{lw})/(f_t/f_w)$ | 0.520 | 0.483 | 0.467 | 0.529 |
| (2) $D_{aiw}/(\tan\omega_t \times f_t)$ | 3.913 | 4.000 | 3.221 | 3.930 |
| (3) $|S_t|$ | 2.837 | 2.735 | 2.796 | 2.771 |
| (4) $f_t/f_w$ | −2.281 | −3.566 | −3.616 | −2.245 |
| (5) $EXP_w/(\tan\omega_t \times f_t)$ | 1.989 | 2.595 | 2.054 | 1.985 |
| (6) $\beta_{lw}$ | 1.197 | 1.096 | 1.071 | 1.161 |
| (7) $(r_{lf} + r_{lb})/(r_{lf} - r_{lb})$ | −3.213 | −1.584 | −1.066 | −2.347 |
| (8) $(r_{ff} + r_{fb})/(r_{ff} - r_{fb})$ | −2.733 | −2.864 | −2.864 | −2.964 |
| (9) $(\beta_{lt}/\beta_{lw})$ | 1.497 | 1.391 | 1.344 | 1.524 |

| Conditional expression | Example 5 | Example 6 | Example 7 | Example 8 |
|---|---|---|---|---|
| (1) $(\beta_{lt}/\beta_{lw})/(f_t/f_w)$ | 0.451 | 0.545 | 0.462 | 0.430 |
| (2) $D_{aiw}/(\tan\omega_t \times f_t)$ | 3.985 | 3.130 | 3.207 | 4.114 |
| (3) $|S_t|$ | 2.674 | 2.688 | 2.733 | 2.541 |
| (4) $f_t/f_w$ | −4.319 | −2.352 | −3.841 | −6.306 |
| (5) $EXP_w/(\tan\omega_t \times f_t)$ | 2.545 | 1.852 | 2.108 | 3.164 |
| (6) $\beta_{lw}$ | 1.073 | 1.151 | 1.073 | 1.055 |
| (7) $(r_{lf} + r_{lb})/(r_{lf} - r_{lb})$ | −1.512 | −0.605 | −1.130 | −1.184 |
| (8) $(r_{ff} + r_{fb})/(r_{ff} - r_{fb})$ | −2.846 | −2.964 | −2.864 | −1.858 |
| (9) $(\beta_{lt}/\beta_{lw})$ | 1.299 | 1.569 | 1.329 | 1.237 |

| Conditional expression | Example 9 | Example 10 | Example 11 | Example 12 |
|---|---|---|---|---|
| (1) $(\beta_{lt}/\beta_{lw})/(f_t/f_w)$ | 0.430 | 0.487 | 0.469 | 0.631 |
| (2) $D_{aiw}/(\tan\omega_t \times f_t)$ | 4.014 | 3.964 | 3.935 | 2.208 |
| (3) $|S_t|$ | 3.100 | 2.826 | 2.828 | — |
| (4) $f_t/f_w$ | −6.557 | −3.825 | −3.971 | −1.407 |
| (5) $EXP_w/(\tan\omega_t \times f_t)$ | 2.848 | 2.315 | 2.510 | 1.128 |
| (6) $\beta_{lw}$ | 1.039 | 1.056 | 1.071 | 1.275 |
| (7) $(r_{lf} + r_{lb})/(r_{lf} - r_{lb})$ | −1.640 | −0.984 | −1.665 | −0.728 |
| (8) $(r_{ff} + r_{fb})/(r_{ff} - r_{fb})$ | −2.864 | −2.964 | −2.853 | — |
| (9) $(\beta_{lt}/\beta_{lw})$ | 1.239 | 1.403 | 1.352 | 1.778 |

| Conditional expression | Example 13 | Example 14 | Example 15 | Example 16 |
|---|---|---|---|---|
| (1) $(\beta_{lt}/\beta_{lw})/(f_t/f_w)$ | 0.596 | 0.432 | 0.486 | 0.408 |
| (2) $D_{aiw}/(\tan\omega_t \times f_t)$ | 2.174 | 4.362 | 3.882 | 4.325 |
| (3) $|S_t|$ | 4.614 | 1.903 | 1.979 | 2.683 |
| (4) $f_t/f_w$ | −1.330 | −3.951 | −3.838 | −6.235 |
| (5) $EXP_w/(\tan\omega_t \times f_t)$ | 1.154 | 3.239 | 2.231 | 3.463 |
| (6) $\beta_{lw}$ | 1.237 | 1.329 | 1.062 | 1.210 |
| (7) $(r_{lf} + r_{lb})/(r_{lf} - r_{lb})$ | 2.551 | −0.871 | −1.110 | −1.550 |
| (8) $(r_{ff} + r_{fb})/(r_{ff} - r_{fb})$ | −0.882 | −1.492 | −1.951 | −2.864 |
| (9) $(\beta_{lt}/\beta_{lw})$ | 1.716 | 1.244 | 1.400 | 1.175 |

| Conditional expression | Example 17 |
|---|---|
| (1) $(\beta_{lt}/\beta_{lw})/(f_t/f_w)$ | 0.469 |
| (2) $D_{aiw}/(\tan\omega_t \times f_t)$ | 3.927 |
| (3) $|S_t|$ | 1.597 |
| (4) $f_t/f_w$ | −4.350 |
| (5) $EXP_w/(\tan\omega_t \times f_t)$ | 2.390 |
| (6) $\beta_{lw}$ | 1.057 |
| (7) $(r_{lf} + r_{lb})/(r_{lf} - r_{lb})$ | −0.819 |
| (8) $(r_{ff} + r_{fb})/(r_{ff} - r_{fb})$ | −1.094 |
| (9) $(\beta_{lt}/\beta_{lw})$ | 1.352 |

Figure 35:
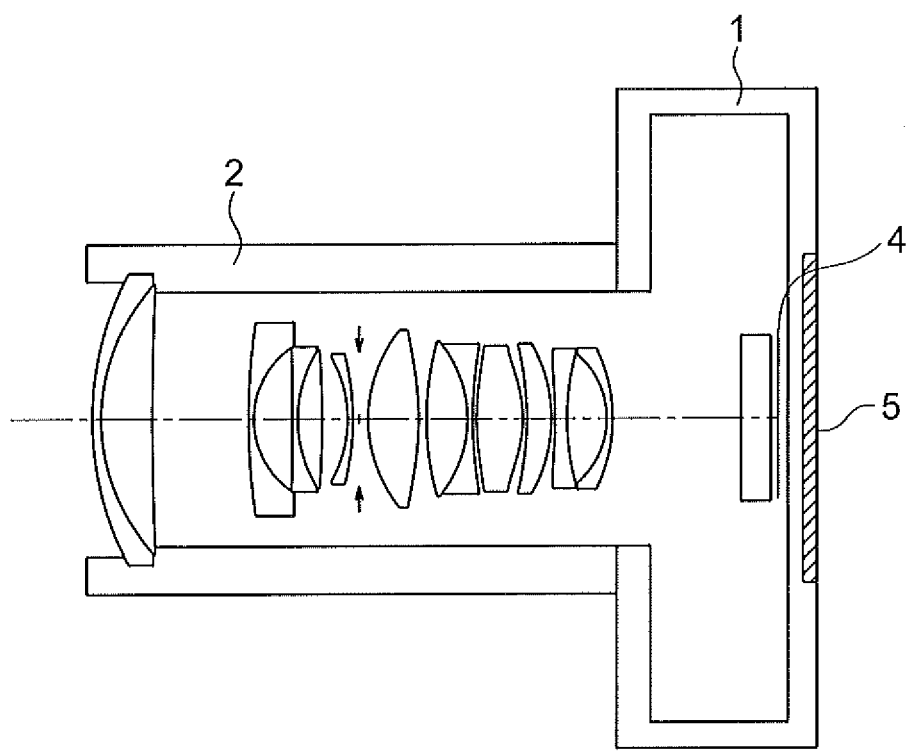
FIG. 35 is a cross-sectional view of a compact camera in which the zoom lens according to the present example is used.

FIG. 35 is a cross-sectional view of a compact camera as an electronic image pickup apparatus. In FIG. 13, a photographic optical system 2 is disposed inside a lens barrel of a compact camera 1. Moreover, an image pickup element surface 4 and a back monitor 5 are disposed in a body. As an image pickup element, an element such as a small-size CCD (charge coupled device) or a CMOS (complementary metal-oxide semiconductor) is to be used.

Here, it is possible to let the photographic optical system 2 to be detachable from a single-lens mirrorless camera by providing a mounting portion to the lens barrel. As the mounting portion, for example, a screw type mount or bayonet type mount could be used.

Moreover, as the photographic optical system 2 of the compact camera 1, the zoom lens described in any one of the examples from the first example to the seventeenth example is to be used for instance.

Figure 36:
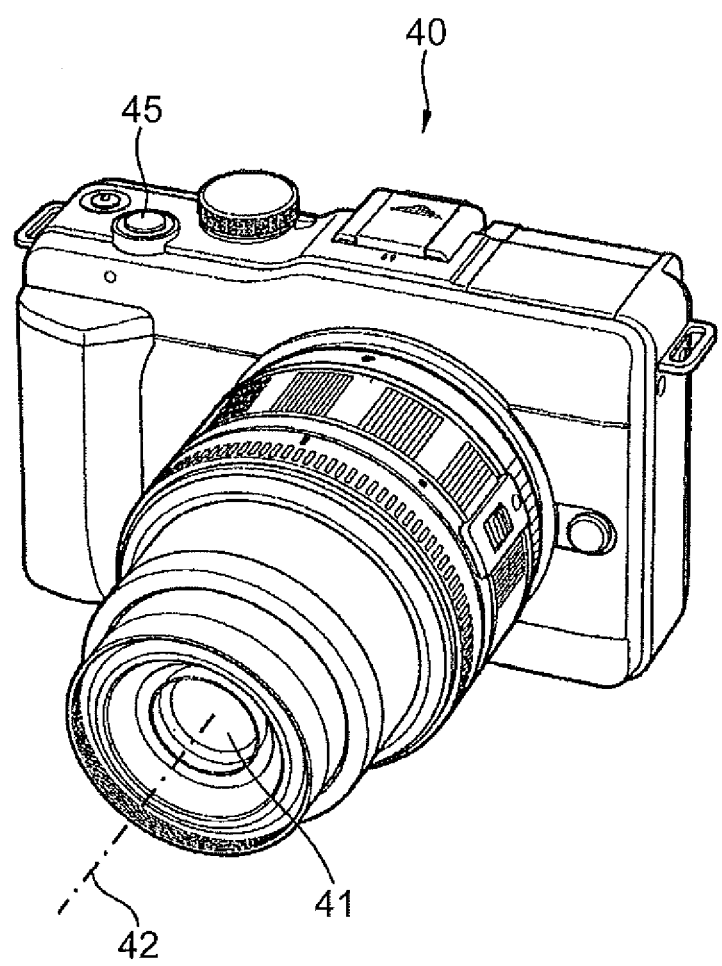
FIG. 36 is a front perspective view showing an appearance of a digital camera according to the present example.
Figure 37:
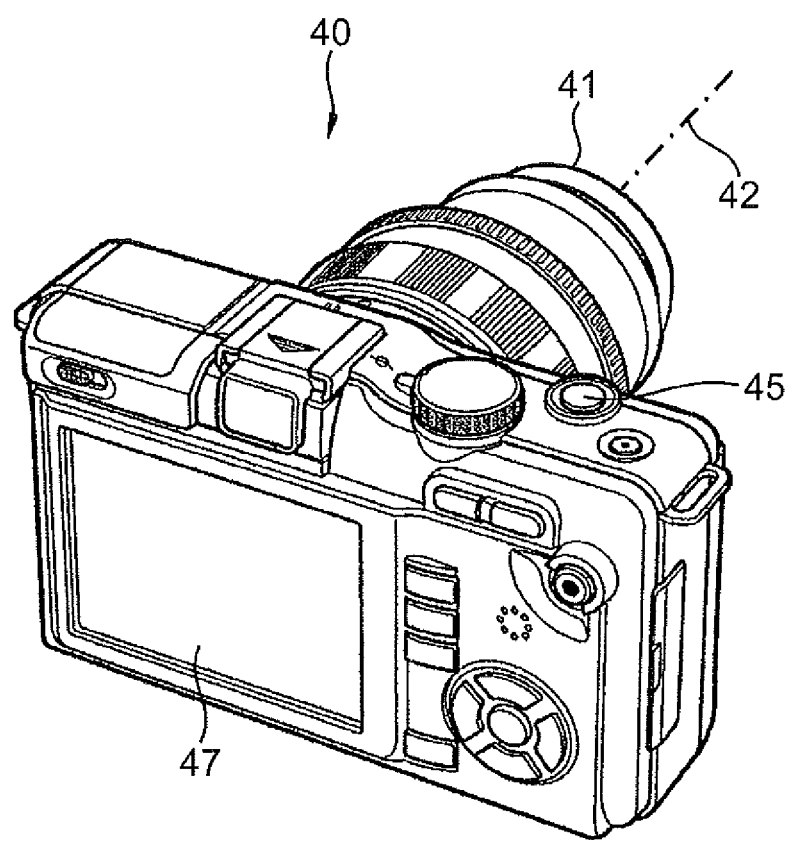
FIG. 37 is a rear perspective view of the digital camera in FIG. 36.

FIG. 36 and FIG. 37 are conceptual diagrams of an arrangement of the image pickup apparatus according to the present embodiment. FIG. 36 is a front perspective view showing an appearance of a digital camera 40 as the image pickup apparatus, and FIG. 37 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example, for instance. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

FIG. 38 is a structural block diagram of an internal circuit of main components of the digital camera 40. In the following description, the processing means described above includes for instance, a CDS/ADC section 24, a temporary storage memory 17, and an image processing section 18, and a storage means consists of a storage medium section 19 for example.

As shown in FIG. 38, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the zoom lens according to the present invention as the photographic optical system 41, it is possible to let the digital camera 40 configured to be an image pickup apparatus in which various aberrations are corrected favorably and the overall length of the optical system is short, even in a case in which an image pickup element of a large size is used.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit. In each of the examples described above, it is possible to make an arrangement such that the zoom lens includes four lens units practically.

According to the present invention, it is possible to provide a zoom lens in which various aberrations are corrected favorably, and of which, the total length is short, and an image pickup apparatus using such zoom lens.

As described heretofore, the present invention is suitable for a zoom lens in which, various aberrations are corrected favorably, and of which, the total length is short, and an image pickup apparatus using such zoom lens.

What is claimed is:
1. A zoom lens comprising;
a plurality of lens units, wherein
the plurality of lens units comprises in order from an object side:
a first lens unit having a positive refractive power;
a second lens unit having a negative refractive power;
a third lens unit having a negative refractive power; and
a rearmost lens unit having a negative refractive power which is disposed on an image side of the third lens unit; wherein the rearmost lens unit is positioned nearest to an image in the plurality of lens units, and further comprises an aperture stop, and at the time of zooming from a wide angle end to a telephoto end, distances between the lens units change, and the first lens unit and the aperture stop move toward the object side, and at the time of focusing from an infinite object point to an object point at a close distance, only the third lens unit moves, and the following conditional expressions are satisfied $$0.2<(\beta_{lt}/\beta_{lw})/(f_t/f_w)<0.7$$

$$2.15<D_{aiw}/(\tan\omega_t\times f_t)<6.0$$

$$1.4<|S_t|<7$$

$$-6.6<f_l/f_w<-0.8$$

where, $\beta_{lt}$ denotes a lateral magnification of the rearmost lens unit at the telephoto end, $\beta_{lw}$ denotes a lateral magnification of the rearmost lens unit at the wide angle end, $f_t$ denotes a focal length of the overall zoom lens system at the telephoto end, $f_w$ denotes a focal length of the overall zoom lens system at the wide angle end, $D_{aiw}$ denotes a distance between the aperture stop and an image plane at the wide angle end, $\omega_t$ denotes a half angle of view at the telephoto end, $S_t$ is denoted by $S_t=(1-\beta_{3t}\times\beta_{3t})\times\beta_{ct}\times\beta_{ct}$ where, $\beta_{3t}$ denotes a lateral magnification of the third lens unit at the telephoto end, $\beta_{ct}$ denotes a combined lateral magnification of all lens units positioned on the image side of the third lens unit at the telephoto end, and $f_l$ denotes a focal length of the rearmost lens unit.

2. The zoom lens according to claim 1, wherein the following conditional expression is satisfied:

$$1.05<EXP_w/(\tan\omega_t\times f_t)<5.2$$

where, $EXP_w$ denotes a distance between an image plane and an exit pupil at the wide angle end, $\omega_t$ denotes the half angle of view at the telephoto end, and $f_t$ denotes the focal length of the overall zoom lens system at the telephoto end.

3. The zoom lens according to claim 1, wherein the following conditional expression is satisfied $$1.0<\beta_{lw}<1.5$$

where, $\beta_{lw}$ denotes the lateral magnification of the rearmost lens unit at the wide angle end.

4. The zoom lens according to claim 1, wherein a lens positioned nearest to an image in the rearmost lens unit satisfies the following conditional expression:

$$-9<(r_{lf}+r_{lb})/(r_{lf}-r_{lb})<-0.1$$

where, $r_{lf}$ denotes a radius of curvature of an object-side lens surface of the lens positioned nearest to the image in the rearmost lens unit, and $r_{lb}$ denotes a radius of curvature of an image-side lens surface of the lens positioned nearest to the image in the rearmost lens unit.

5. The zoom lens according to claim 1, wherein a negative lens which is positioned nearest to an object in negative lenses in the third lens unit is a negative lens having a concave surface directed toward the object side, and the following conditional expression is satisfied:

$$-5<(r_{ff}+r_{fb})/(r_{ff}-r_{fb})<-0.1$$

where, $r_{ff}$ denotes a radius of curvature of an object-side lens surface of the negative lens having the concave surface directed toward the object side, and $r_{fb}$ denotes a radius of curvature of an image-side lens surface of the negative lens having the concave surface directed toward the object side.

6. The zoom lens according to claim 1, wherein the following conditional expression is satisfied $$1.1<(\beta_{lt}/\beta_{lw})<2.8$$

where, $\beta_{lt}$ denotes the lateral magnification of the rearmost lens unit at the telephoto end, and $\beta_{lw}$ denotes the lateral magnification of the rearmost lens unit at the wide angle end.

7. The zoom lens according to claim 1, wherein a lens which is disposed nearest to an image in the rearmost lens unit has a negative refractive power.

8. The zoom lens according to claim 1, wherein at the time of zooming from the wide angle end to the telephoto end, the rearmost lens unit moves toward the object side.

9. The zoom lens according to claim 1, wherein the aperture stop is disposed between two lenses, and one of the two lenses is positioned nearest to an image in the second lens unit, and the other lens of the two lenses is positioned nearest to an object in the rearmost lens unit.

10. The zoom lens according to claim 1, wherein the total number of lens units in the zoom lens is five, and the plurality of lens units includes a fourth lens unit having a positive refractive power between the third lens unit and the rearmost lens unit, and the rearmost lens unit is a fifth lens unit, and the aperture stop is disposed between a lens positioned nearest to an image in the third lens unit and an image plane, and at the time of zooming from the wide angle end to the telephoto end, the fifth lens unit moves toward the object side.

11. An image pickup apparatus comprising:

a zoom lens according to claim 1; and an image pickup element which has an image pickup surface.

12. A zoom lens comprising;

a plurality of lens units, wherein the plurality of lens units where the total number of lens units is five, comprising in order from an object side:

a first lens unit having a positive refractive power;

a second lens unit having a negative refractive power;

a third lens unit having a negative refractive power;

a fourth lens unit having a positive refractive power; and a rearmost lens unit having a negative refractive power, wherein the rearmost lens unit is positioned nearest to an image in the plurality of lens units, and the rearmost lens unit is a fifth lens unit, and
further comprises an aperture stop, and
the aperture stop is disposed between a lens positioned nearest to an image in the third lens unit and an image plane, and
at the time of zooming from a wide angle end to a telephoto end, distances between the lens units change, and
the first lens unit moves toward the object side, the aperture stop moves toward the object side, and the fifth lens unit moves toward the object side, and
the following conditional expressions are satisfied:

$0.2<(\beta_{lt}/\beta_{lw})/(f_t/f_w)<0.7$ $2.15<D_{aiw}/(\tan \omega_t \times f_t)<6.0$ $-6.6<f_l/f_w<-0.8$ where,
$\beta_{lt}$ denotes a lateral magnification of the rearmost lens unit at the telephoto end,
$\beta_{lw}$ denotes a lateral magnification of the rearmost lens unit at the wide angle end,
$f_t$ denotes a focal length of the overall zoom lens system at the telephoto end,
$f_w$ denotes a focal length of the overall zoom lens system at the wide angle end,
$D_{aiw}$ denotes a distance between the aperture stop and an image plane at the wide angle end,
$\omega_t$ denotes a half angle of view at the telephoto end, and
$f_l$ denotes a focal length of the rearmost lens unit.

13. The zoom lens according to claim 12, wherein the following conditional expression is satisfied:

$1.05<EXP_w/(\tan \omega_t \times f_t)<5.2$ where,
$EXP_w$ denotes a distance between an image plane and an exit pupil at the wide angle end,
$\omega_t$ denotes the half angle of view at the telephoto end, and
$f_t$ denotes the focal length of the overall zoom lens system at the telephoto end.

14. The zoom lens according to claim 12, wherein the following conditional expression is satisfied:

$1.0<\beta_{lw}<1.5$ where,
$\beta_{lw}$ denotes the lateral magnification of the rearmost lens unit at the wide angle end.

15. An image pickup apparatus comprising:
a zoom lens according to claim 12; and
an image pickup element which has an image pickup surface.

16. A zoom lens comprising;
a plurality of lens units, wherein
the plurality of lens units comprises in order from an object side:
a first lens unit having a positive refractive power;
a second lens unit having a negative refractive power;
a third lens unit having a negative refractive power; and
a rearmost lens unit having a negative refractive power which is disposed on an image side of the third lens unit; wherein
the rearmost lens unit is disposed nearest to an image in the plurality of lens units, and
further comprises an aperture stop, and
at the time of zooming from a wide angle end to a telephoto end, distances between the lens units change, and
the first lens unit and the aperture stop move toward the object side, and
at the time of focusing from an infinite object point to an object point at a close distance, only the third lens unit moves, and
the following conditional expressions are satisfied:

$0.2<(\beta_{lt}/\beta_{lw})/(f_t/f_w)<0.7$ $2.15<D_{aiw}/(\tan \omega_t \times f_t)<6.0$ $1.4<|S_t|<7$ $1.1<(\beta_{lt}/\beta_{lw})<2.8$ where,
$\beta_{lt}$ denotes a lateral magnification of the rearmost lens unit at the telephoto end,
$\beta_{lw}$ denotes a lateral magnification of the rearmost lens unit at the wide angle end,
$f_t$ denotes a focal length of the overall zoom lens system at the telephoto end,
$f_w$ denotes a focal length of the overall zoom lens system at the wide angle end,
$D_{aiw}$ denotes a distance between the aperture stop and an image plane at the wide angle end,
$\omega_t$ denotes a half angle of view at the telephoto end,
$S_t$ is denoted by $S_t=(1-\beta_{3t}\times\beta_{3t})\times\beta_{ct}\times\beta_{ct}$
where,
$\beta_{3t}$ denotes a lateral magnification of the third lens unit at the telephoto end, and
$\beta_{ct}$ denotes a combined lateral magnification of all lens units positioned on the image side of the third lens unit at the telephoto end.

17. The zoom lens according to claim 16, wherein the following conditional expression is satisfied:

$-6.6<f_l/f_w<-0.8$ where,
$f_l$ denotes a focal length of the rearmost lens unit, and
$f_w$ denotes the focal length of the overall zoom lens system at the wide angle end.

18. The zoom lens according to claim 16, wherein the following conditional expression is satisfied:

$1.0<\beta_{lw}<1.5$ where,
$\beta_{lw}$ denotes the lateral magnification of the rearmost lens unit at the wide angle end.

19. The zoom lens according to claim 16, wherein the following conditional expression is satisfied:

$1.05<EXP_w/(\tan \omega_t \times f_t)<5.2$ where,
$EXP_w$ denotes a distance between an image plane and an exit pupil at the wide angle end,
$\omega_t$ denotes the half angle of view at the telephoto end, and
$f_t$ denotes the focal length of the overall zoom lens system at the telephoto end.

20. An image pickup apparatus comprising:
a zoom lens according to claim 16; and
an image pickup element which has an image pickup surface.

* * * * *